US012807433B2

(12) United States Patent
Kubota et al.

(10) Patent No.: US 12,807,433 B2
(45) Date of Patent: Nov. 24, 2026

(54) LUGGAGE STOWING DEVICE

(71) Applicant: KABUSHIKI KAISHA TOYOTA JIDOSHOKKI, Kariya (JP)

(72) Inventors: Hiroshi Kubota, Kariya (JP); Masanori Furuhashi, Kariya (JP); Wataru Nagai, Kariya (JP); Tadakatsu Yamaguchi, Tokyo (JP); Hisayoshi Saisu, Kariya (JP); Yuta Kimura, Tokyo (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 601 days.

(21) Appl. No.: 18/034,601

(22) PCT Filed: Oct. 27, 2021

(86) PCT No.: PCT/JP2021/039682

§ 371 (c)(1), (2) Date: Apr. 28, 2023

(87) PCT Pub. No.: WO2022/097556

PCT Pub. Date: May 12, 2022

(65) Prior Publication Data

US 2024/0327140 A1 Oct. 3, 2024

(30) Foreign Application Priority Data

Nov. 5, 2020 (JP) ................................ 2020-185046
Nov. 5, 2020 (JP) ................................ 2020-185049

(Continued)

(51) Int. Cl.
*B65G 65/00* (2006.01)

(52) U.S. Cl.
CPC .... *B65G 65/005* (2013.01); *B65G 2201/0264* (2013.01); *B65G 2203/0216* (2013.01)

(58) Field of Classification Search
CPC .......... B65G 65/005; B65G 2201/0264; B65G 2203/0216
See application file for complete search history.

(56) References Cited

U.S. PATENT DOCUMENTS 5,793,639 A 8/1998 Yamazaki
7,753,191 B2 7/2010 Lykkegaard et al.

(Continued)

FOREIGN PATENT DOCUMENTS

CN 101535151 A 9/2009
EP 3 157 814 B1 10/2019

(Continued)

OTHER PUBLICATIONS

European Search Report issued Mar. 11, 2024 in Application No. 21889109.1.

(Continued)

*Primary Examiner* — Kyle O Logan
(74) *Attorney, Agent, or Firm* — Sughrue Mion, PLLC

(57) ABSTRACT

A luggage stowing device includes a second hand luggage detection unit detecting information of pieces of hand luggage transported by a main conveyor, a stowing robot stowing pieces of the hand luggage transported by the main conveyor with respect to two containers, and a stowing computation unit and a stowing control unit controlling the stowing robot such that at least one of the order of priority of the containers for stowing pieces of the hand luggage and the order of stowing pieces of the hand luggage in the containers with respect to the order of transporting pieces of the hand luggage is adjusted on the basis of the information of pieces of the hand luggage detected by the second hand luggage detection unit.

30 Claims, 31 Drawing Sheets

(30) Foreign Application Priority Data

| | | |
|---|---|---|
| Nov. 5, 2020 | (JP) | 2020-185053 |
| Nov. 5, 2020 | (JP) | 2020-185057 |
| Nov. 5, 2020 | (JP) | 2020-185061 |

(56) References Cited

U.S. PATENT DOCUMENTS

| | | | | |
|---|---|---|---|---|
| 2010/0042249 | A1 | 2/2010 | Wada et al. | |
| 2011/0002761 | A1* | 1/2011 | Aimable-Lima | B64F 1/368 198/348 |
| 2012/0150342 | A1* | 6/2012 | Song | B07C 3/02 700/226 |
| 2017/0200248 | A1 | 7/2017 | Murphy | |
| 2020/0376662 | A1* | 12/2020 | Arase | B25J 9/1687 |

FOREIGN PATENT DOCUMENTS

| | | | | |
|---|---|---|---|---|
| JP | 5-246546 | A | 9/1993 | |
| JP | 08198452 | A * | 8/1996 | |
| JP | 9-118428 | A | 5/1997 | |
| JP | 2016-170791 | A | 9/2016 | |
| JP | 2019-94210 | A | 6/2019 | |
| WO | WO-2013076349 | A1 * | 5/2013 | B64F 1/368 |

OTHER PUBLICATIONS

International Preliminary Report on Patentability date of issuance May 8, 2023 in International Application No. PCT/JP2021/039682.
Communication dated Jun. 11, 2026, issued in European Application No. 26174424.7.
Extended European Search Report dated Jun. 22, 2026, issued in Application No. 26174427.0.

* cited by examiner (a)

(b)

LUGGAGE STOWING DEVICE

This Application is a National Stage of International Application No. PCT/JP2021/039682 filed Oct. 27, 2021, claiming priority based on Japanese Patent Application No. 2020-185046 filed Nov. 5, 2020, Japanese Patent Application No. 2020-185049 filed Nov. 5, 2020, Japanese Patent Application No. 2020-185053 filed Nov. 5, 2020, Japanese Patent No. 2020-185057 filed Nov. 5, 2020, and Japanese Patent Application No. 2020-185061 filed Nov. 5, 2020.

TECHNICAL FIELD

The present disclosure relates to a luggage stowing device.

BACKGROUND ART

For example, Patent Literature 1 discloses a stowing device stowing pieces of hand luggage in a container. The stowing device in Patent Literature 1 includes a hand luggage identification device identifying shapes and sizes of pieces of hand luggage loaded by a hand luggage loading conveyor, a hand luggage sorter sorting the pieces of hand luggage identified by the hand luggage identification device by shape and size and storing the sorted pieces of hand luggage in any of a robotic stowing stocker and a manual stowing stocker, a dispensing device dispensing the pieces of hand luggage stored in the robotic stowing stocker and the manual stowing stocker, and a robot stowing the pieces of hand luggage dispensed by the dispensing device in a robot stowing container.

CITATION LIST

Patent Literature

[Patent Literature 1] Japanese Unexamined Patent Publication No. H5-246546

SUMMARY OF INVENTION

Technical Problem

For example, when pieces of hand luggage such as suitcases are stowed into a container at an airport, it is required to reduce an empty space inside the container and improve a hand luggage stowage factor inside the container.

The present disclosure has been made in order to resolve the foregoing problem, and an object thereof is to provide a luggage stowing device in which a luggage stowage factor inside a container can be improved.

Solution to Problem

A luggage stowing device according to an aspect of the present disclosure includes a luggage detection unit detecting information of pieces of luggage transported by a transportation unit, a stowing unit stowing pieces of the luggage transported by the transportation unit with respect to a plurality of containers, and a control unit controlling the stowing unit such that at least one of the order of priority of the containers for stowing pieces of the luggage and the order of stowing pieces of the luggage in the containers with respect to the order of transporting pieces of the luggage is adjusted on the basis of the information detected by the luggage detection unit.

In this luggage stowing device, the stowing unit is controlled such that at least one of the order of priority of the containers for stowing pieces of the luggage and the order of stowing pieces of the luggage in the containers with respect to the order of transporting pieces of the luggage is adjusted on the basis of the information of pieces of the luggage detected by the luggage detection unit. For this reason, even if pieces of luggage are randomly transported regardless of dimensions, materials, and the like, luggage stowage factors inside the containers can be improved.

The information may be information related to dimensions of pieces of the luggage. The control unit may control the stowing unit such that pieces of the luggage are preferentially stowed in different containers on the basis of the dimensions of pieces of the luggage detected by the luggage detection unit. In this case, even if pieces of luggage are randomly transported regardless of the dimensions, pieces of the luggage are preferentially stowed in an appropriate container corresponding to the dimensions. Therefore, pieces of luggage are efficiently stowed in the containers, and thus empty spaces inside the containers are reduced. Accordingly, regardless of the order of transporting pieces of luggage, stable luggage stowage factors are secured in the containers.

The containers may include a first container and a second container. The control unit may control the stowing unit such that first luggage is preferentially stowed in the first container and may control the stowing unit such that second luggage having smaller dimensions than the first luggage is preferentially stowed in the second container. In such a constitution, even if the first luggage and the second luggage having different dimensions are randomly transported, the first luggage is preferentially and efficiently stowed in the first container, and the second luggage is preferentially and efficiently stowed in the second container.

A first far side accommodation area and a first near side accommodation area positioned on a near side with respect to the first far side accommodation area in the first container may be set inside the first container. A second far side accommodation area and a second near side accommodation area positioned on a near side with respect to the second far side accommodation area in the second container are set inside the second container. The control unit may control the stowing unit such that the first luggage is stowed in the first far side accommodation area and then the second near side accommodation area in that order and may control the stowing unit such that the second luggage is stowed in the second far side accommodation area and then the first near side accommodation area in that order. In such a constitution, for example, even when the first luggage having larger dimensions cannot be stowed in two rows in a depth direction of the container, the first luggage and the second luggage are efficiently stowed in the first container and the second container.

A cut portion having a structure realized by cutting a lower side corner portion of the container may be provided on one of left and right sides of the first container and the second container. A first auxiliary accommodation area adjacent to the first far side accommodation area and the first near side accommodation area in a lateral direction of the first container may be set at a position corresponding to the cut portion inside the first container. A second auxiliary accommodation area adjacent to the second far side accommodation area and the second near side accommodation area in a lateral direction of the second container may be set at a position corresponding to the cut portion inside the second container. The control unit may control the stowing unit such that third luggage having smaller dimensions than the second luggage is stowed in the first auxiliary accommodation area and the second auxiliary accommodation area. In such a constitution, even if the first luggage, the second luggage, and the third luggage having different dimensions are randomly transported, the first luggage, the second luggage, and the third luggage are efficiently stowed in the first container and the second container.

The control unit may control the stowing unit such that the first luggage is stowed from a side opposite to the cut portion toward the cut portion side when the first luggage is stowed in the first far side accommodation area and the second near side accommodation area, and may control the stowing unit such that the second luggage is stowed from a side opposite to the cut portion toward the cut portion side when the second luggage is stowed in the second far side accommodation area and the first near side accommodation area. In such a constitution, the third luggage can be stowed in the first auxiliary accommodation area before the first luggage and the second luggage are stowed at positions in the vicinity of the first auxiliary accommodation area in the first far side accommodation area and the first near side accommodation area, and the third luggage can be stowed in the second auxiliary accommodation area before the first luggage and the second luggage are stowed at positions in the vicinity of the second auxiliary accommodation area in the second far side accommodation area and the second near side accommodation area. Therefore, even when the third luggage is stowed in the first container and the second container together with the first luggage and the second luggage, the third luggage can be reliably stowed in the first container and the second container.

The transportation unit may have a stock conveyor for temporarily stocking pieces of the luggage transported by the transportation unit. The control unit may adjust the order of stowing pieces of the luggage in the containers by temporarily stocking pieces of the luggage in the stock conveyor and then stowing pieces of the luggage stocked in the stock conveyor. The stowing order is easily adjusted by temporarily stocking pieces of luggage in the stock conveyor.

The control unit may adjust the order of stowing pieces of the luggage in the containers such that a height difference between pieces of the luggage constituting the same stage inside the containers becomes equal to or smaller than a predetermined threshold. In this case, since the height difference between pieces of the luggage stacked on a lower stage side can be restricted, a height difference between pieces of the luggage occurring on an upper stage side can be curbed, and thus collapse of pieces of luggage can be curbed.

The control unit may cause pieces of the luggage to be taken out from the stock conveyor such that a height difference between a plurality of pieces of the luggage in the containers is minimized when the stock conveyor is full. In this case, while the height difference between pieces of the luggage in the same stage is restricted, an empty space can be formed in the stock conveyor.

The control unit may impart an order of priority to each of locations in the transportation unit and may control the stowing unit such that the luggage is taken out from a location having a higher order of priority. Since the stowing unit takes out luggage from a location having a higher order of priority, a cycle time of stowing work can be reduced.

The luggage detection unit may detect materials of pieces of the luggage as the information. The control unit may adjust the order of stowing pieces of the luggage in the containers such that pieces of the luggage detected to have a soft material are stowed on an upper stage side. In this case, stowing of pieces of luggage which are likely to collapse on the lower stage side is curbed, and thus occurrence of collapse of pieces of luggage can be curbed.

The luggage stowing device may further include a tag information acquisition unit acquiring tag information of pieces of the luggage, and a tag information updating unit associating stowing data including stowing positions of pieces of the luggage with the tag information acquired by the tag information acquisition unit. In this case, since the tag information of pieces of luggage is acquired when pieces of the luggage are transported toward the containers by the transportation unit, there is no need for a worker to read the tag information of pieces of the luggage using a barcode reader or the like before pieces of the luggage are stowed in the containers. In addition, since the stowing data including the stowing positions of pieces of luggage is associated with the tag information, there is no need for a worker to attach a tag sticker onto a container list, for example, after pieces of the luggage are stowed in the containers. Accordingly, manual work of a worker is reduced. Since occurrence of work mistakes of a worker is curbed due to reduction of manual work, reliability related to stowing of pieces of luggage in the containers is improved.

An address may be set in advance inside the containers. The tag information updating unit may associate stowing data including addresses of the stowing positions of pieces of the luggage with the tag information. In such a constitution, the stowing data including the addresses of the stowing positions of pieces of luggage stowed into the containers is associated with the tag information. Therefore, it is easy to ascertain the positions where pieces of luggage are stowed inside the containers from the tag information of pieces of the luggage.

A plurality of accommodation areas corresponding to dimensions of pieces of the luggage may be set inside the containers. The address may be set for each of the accommodation areas. The control unit may control the stowing unit such that pieces of the luggage are stowed in the accommodation area corresponding to the dimensions of pieces of the luggage. In such a constitution, even if pieces of luggage having different dimensions are randomly transported by the transportation unit, pieces of the luggage are stowed at appropriate positions corresponding to the dimensions of pieces of the luggage inside the containers. Therefore, since pieces of luggage do not have to be rearranged in accordance with the dimensions of pieces of the luggage, manual work of a worker is further reduced.

The luggage stowing device may further include a rotary table disposed on a downstream side of the transportation unit and having pieces of the luggage placed thereon, a first drive unit moving pieces of the luggage transported by the transportation unit to the rotary table, a movement control unit controlling driving of the first drive unit, and a rotation control unit controlling rotation of the rotary table. The luggage detection unit may detect orientations of pieces of the luggage placed on the rotary table. The rotation control unit may control the rotary table such that the orientations of pieces of the luggage become uniform on the basis of the orientations of pieces of the luggage detected by the luggage detection unit. In such a constitution, when pieces of luggage are transported by the transportation unit, even if the orientations of pieces of the luggage vary, the orientations of pieces of the luggage become uniform in the rotary table. Therefore, even if pieces of luggage are not transported such that the orientations of pieces of the luggage become always uniform, pieces of the luggage are stowed into the containers with the same orientation by the stowing unit. Accordingly, manual work of a worker is further reduced.

The luggage stowing device may further include a placement unit disposed on a downstream side of the rotary table and having pieces of the luggage placed thereon, a second drive unit moving pieces of the luggage from the rotary table to the placement unit, a position setting unit positionally setting pieces of the luggage placed on the placement unit with respect to a direction perpendicular to an array direction of the rotary table and the placement unit, and a position control unit controlling the second drive unit and the position setting unit such that pieces of the luggage are positionally set on the placement unit after the rotary table is controlled such that the orientations of pieces of the luggage become uniform. In such a constitution, in a state in which pieces of luggage placed on the placement unit are positionally set with respect to a direction perpendicular to the array direction of the rotary table and the placement unit, pieces of the luggage are held by a holding unit of the stowing unit. Therefore, control until pieces of luggage are held by the holding unit can be simplified.

The luggage detection unit may detect kinds of pieces of the luggage. The movement control unit may control the first drive unit such that pieces of the luggage move to the rotary table when it is judged that pieces of the luggage are stowing targets to be stowed into the containers by the stowing unit on the basis of the kinds of pieces of the luggage detected by the luggage detection unit. In such a constitution, when pieces of luggage are not stowing targets to be stowed in the containers by the stowing unit, pieces of the luggage are no longer supplied to the rotary table. Therefore, stowing of pieces of luggage which are not stowing targets in the containers is prevented at an early stage.

The luggage stowing device may further include a stowing robot having a robot hand for holding pieces of the luggage; a drive unit performing at least one of a motion of moving the robot hand in three axes directions and a motion of turning the robot hand around three axes; and a control unit executing first control processing of controlling the robot hand such that the robot hand holds pieces of the luggage, executing second control processing of controlling the drive unit such that the robot hand moves into the containers after the first control processing is executed, and executing third control processing of controlling the robot hand such that pieces of the luggage held by the robot hand are stowed into the containers after the second control processing is executed. The robot hand may have a first conveyor unit having pieces of the luggage placed thereon and moving pieces of the luggage, and a second conveyor unit disposed in an L-shape with respect to the first conveyor unit, having pieces of the luggage placed thereon, and moving pieces of the luggage. The control unit may perform control such that at least one of the first conveyor unit and the second conveyor unit is driven to a base end side of the robot hand when the first control processing is executed, and may perform control such that at least one of the first conveyor unit and the second conveyor unit is driven to a tip side of the robot hand when the third control processing is executed.

In this case, pieces of luggage can be easily stowed into the containers from a lateral side of the containers by the first conveyor unit and the second conveyor unit transferring pieces of luggage from the robot hand to the containers. In addition, the second conveyor unit is disposed in an L-shape with respect to the first conveyor unit. For this reason, for example, the postures of pieces of luggage can be changed by 90 degrees by the drive unit turning the robot hand around an axis parallel to drive directions of the first conveyor unit and the second conveyor unit. Therefore, pieces of luggage can be stowed not only in a horizontal placement state, but pieces of luggage can also be stowed in a vertical placement state. Accordingly, empty spaces inside the containers can be reduced, and thus the luggage stowage factors inside the containers can be improved.

The drive unit may have a first drive unit moving the robot hand in three axes directions, and a second drive unit turning the robot hand around three axes. The control unit may control the first drive unit such that the robot hand moves into the containers when the second control processing is executed, and may control the second drive unit such that the robot hand is turned around an axis parallel to drive directions of the first conveyor unit and the second conveyor unit in a case of changing postures of pieces of the luggage when the third control processing is executed. In such a constitution, the postures of pieces of luggage can be changed by 90 degrees by the second drive unit turning the robot hand around an axis parallel to the drive directions of the first conveyor unit and the second conveyor unit. Therefore, pieces of luggage can be easily and reliably stowed in any of the horizontal placement state and the vertical placement state.

A wall portion for positionally setting pieces of the luggage in the drive directions of the first conveyor unit and the second conveyor unit with respect to the first conveyor unit and the second conveyor unit may be provided on the base end side of the robot hand. The control unit may perform control such that at least one of the first conveyor unit and the second conveyor unit is driven to the wall portion side when the first control processing is executed, and may perform control such that at least one of the first conveyor unit and the second conveyor unit is driven to a side opposite to the wall portion when the third control processing is executed. In such a constitution, pieces of luggage held by the robot hand are positionally set based on the wall portion with respect to the first conveyor unit and the second conveyor unit by causing pieces of the luggage placed on the first conveyor unit or the second conveyor unit to bump into the wall portion. Accordingly, pieces of luggage can be stowed at the stowing positions within the conveyor with high accuracy.

The control unit may control the second drive unit such that the robot hand is turned in a state in which the wall portion is positioned on a lower side when the first control processing is executed. In such a constitution, even in a state in which pieces of luggage are roughly placed on the first conveyor unit or the second conveyor unit, since the robot hand tilts in a state in which the wall portion is positioned on the lower side, pieces of the luggage bump into the wall portion due to dead weights of pieces of the luggage. Therefore, pieces of luggage held by the robot hand are easily positionally set in the drive directions of the first conveyor unit and the second conveyor unit.

The control unit may control the second drive unit such that the robot hand is turned in a state in which pieces of the luggage placed on one of the first conveyor unit and the second conveyor unit hit the other of the first conveyor unit and the second conveyor unit when the first control processing is executed. In such a constitution, pieces of luggage held by the robot hand are positionally set not only in the drive directions of the first conveyor unit and the second conveyor unit but also in a direction perpendicular to the drive directions with respect to the first conveyor unit and the second conveyor unit. Accordingly, pieces of luggage can be stowed at the stowing positions inside the containers with higher accuracy.

The control unit may perform control such that the first conveyor unit and the second conveyor unit are simultaneously driven in the same direction when the first control processing and the third control processing are executed. In such a constitution, for example, when pieces of luggage placed on the first conveyor unit move in a state of abutting the second conveyor unit, pieces of the luggage are prevented from being scratched by the second conveyor unit.

A width dimension of the first conveyor unit may be larger than a width dimension of the second conveyor unit. In such a constitution, while the robot hand is miniaturized, pieces of luggage having rectangular parallelepiped shapes can be easily stowed into the containers in a horizontal placement state and a vertical placement state.

The luggage stowing device may further include a stowing robot having an L-shaped robot hand for holding pieces of the luggage; a movement drive unit moving the robot hand in three axes directions; and a control unit executing first control processing of controlling the movement drive unit such that pieces of the luggage held by the robot hand are temporarily placed at an approach position offset from stowing positions inside the containers, and executing second control processing of controlling the movement drive unit such that pieces of the luggage temporarily placed at the approach position are pushed toward the stowing positions by the robot hand after the first control processing is executed. In such a constitution, first, pieces of luggage held by the robot hand are temporarily placed at the approach position offset from the stowing positions inside the containers. Further, pieces of luggage arrive at the stowing positions when pieces of the luggage temporarily placed at the approach position are pushed toward the stowing positions by the robot hand. Accordingly, pieces of luggage are accurately stowed at the stowing positions inside the containers.

The approach position may be a position offset from the stowing positions to a near side in the containers. The control unit may control the movement drive unit such that pieces of the luggage are pushed to a far side in the containers by the robot hand when the second control processing is executed. In such a constitution, pieces of luggage are accurately stowed at the stowing positions inside the containers with respect to the depth direction of the containers.

The approach position may be a position offset from the stowing positions to a near side in the containers and one side in the lateral direction. The control unit may control the movement drive unit such that pieces of the luggage are pushed to the far side in the containers and the other side in the lateral direction by the robot hand when the second control processing is executed. In such a constitution, pieces of luggage are accurately stowed at the stowing positions inside the containers with respect to the depth direction and the lateral direction of the containers.

The control unit may first control the movement drive unit such that pieces of the luggage are pushed to the far side in the containers by the robot hand when the second control processing is executed and then may control the movement drive unit such that pieces of the luggage are pushed to the other side in the lateral direction by the robot hand. In such a constitution, when pieces of luggage are pushed to the far side in the containers by the robot hand, side surfaces of pieces of the luggage are prevented from interfering with inner wall surfaces of the containers or existing pieces of luggage.

The luggage stowing device may further include a turning drive unit turning the robot hand around three axes. The control unit may control the movement drive unit such that pieces of the luggage are pushed to the other side in the lateral direction by the robot hand after controlling the turning drive unit such that a posture of the robot hand is changed by 90 degrees in accordance with spaces in the lateral direction in the containers around the stowing position when the second control processing is executed. In such a constitution, a position where pieces of luggage are pushed by the robot hand changes in accordance with the spaces in the lateral direction in the containers around the stowing position. Therefore, even when the spaces in the lateral direction in the containers around the stowing position are narrow, pieces of luggage can be accurately stowed at the stowing positions inside the containers with respect to the lateral direction of the containers.

The control unit may control the movement drive unit such that a plurality of pieces of the luggage are collectively pushed to the far side in the containers or the other side in the lateral direction by the robot hand when the second control processing is executed. In such a constitution, since a plurality of pieces of luggage are simultaneously pushed to the far side in the containers or the other side in the lateral direction, a part of control processing in which pieces of luggage are pushed to the far side in the containers or the other side in the lateral direction is omitted. Therefore, a time for stowing pieces of luggage into the containers is shortened.

The control unit may control the movement drive unit such that a plurality of pieces of the luggage are collectively pushed to the far side in the containers or the other side in the lateral direction by the robot hand in a state in which pieces of the luggage are held by the robot hand when the second control processing is executed. In such a constitution, regarding pieces of luggage held by the robot hand when a plurality of pieces of luggage are collectively pushed by the robot hand, pieces of the luggage do not have to be temporarily placed at the approach position. Therefore, a time for stowing pieces of luggage into the containers is further shortened.

Advantageous Effects of Invention

According to the present disclosure, a luggage stowage factor inside a container can be improved.

DESCRIPTION OF EMBODIMENTS

Hereinafter, embodiments of the present disclosure will be described in detail with reference to the drawings.

First Embodiment

Figure 1:
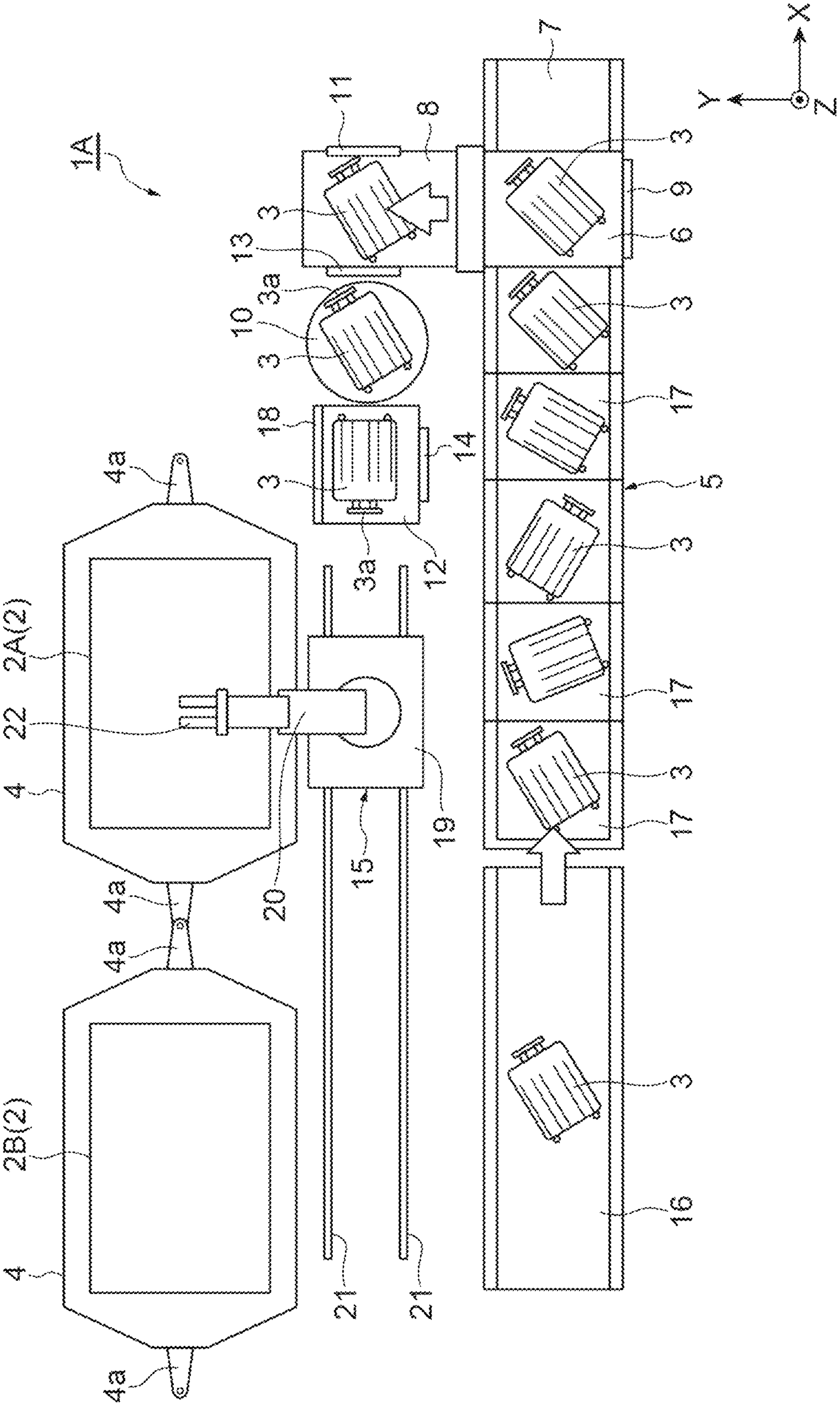
FIG. 1 is a view of a schematic constitution illustrating a luggage stowing device according to a first embodiment of the present disclosure.

FIG. 1 is a view of a schematic constitution illustrating a luggage stowing device according to a first embodiment of the present disclosure. In FIG. 1, for example, a luggage stowing device 1A of the first embodiment is installed in a stowing site in a backyard at an airport. The luggage stowing device 1A is a device stowing pieces of hand luggage 3 (luggage) of passengers in a plurality of containers 2 to be loaded on an airplane. Here, pieces of the hand luggage 3 stowed in the containers 2 are suitcases.

The containers 2 are placed on a plurality of (here, two) carriages 4 towed by a towing tractor (not illustrated). Couplers 4*a* are respectively provided at a front end and a rear end of the carriages 4. The carriages 4 are coupled to each other by the couplers 4*a*.

The luggage stowing device 1A simultaneously stows pieces of the hand luggage 3 with respect to a plurality of (here, two in the front and the rear) containers 2. A door (not illustrated) is provided on one side surface of each of the containers 2. The luggage stowing device 1A stows pieces of the hand luggage 3 into the containers 2 from a lateral side of the containers 2 in a state in which the doors of the containers 2 are opened. The container 2 positioned on the front side of the towing tractor will be referred to as a preceding container 2A (first container), and the container 2 positioned on the rear side of the towing tractor will be referred to as a following container 2B (second container). The preceding container 2A and the following container 2B are disposed side by side.

The luggage stowing device 1A includes a main conveyor 5, a sorting conveyor 6, a withdrawal conveyor 7, a luggage reception conveyor 8, a pusher 9, a turntable 10, a pusher 11, a buffer conveyor 12, a pusher 13, a pusher 14, and a stowing robot 15.

The main conveyor 5, the sorting conveyor 6, and the withdrawal conveyor 7 are arrayed in an array direction (X axis direction) of the containers 2. The luggage reception conveyor 8, the turntable 10, and the buffer conveyor 12 are arrayed in the X axis direction at positions closer to the containers 2 than the main conveyor 5 in a direction (Y axis direction) perpendicular to the X axis direction. The buffer conveyor 12 is disposed at a position closer to the containers 2 than the luggage reception conveyor 8 in the X axis direction.

The main conveyor 5 is a transportation unit transporting pieces of the hand luggage 3 received from an airport side conveyor 16 toward the containers 2. The airport side conveyor 16 transports pieces of the hand luggage 3 from a check-in counter installed in a terminal building at the airport to the stowing site in the backyard. The main conveyor 5 is constituted of a plurality of (here, five) progressive conveyors 17 progressively conveying pieces of the hand luggage 3 one at a time.

The sorting conveyor 6 is disposed on a downstream side of the main conveyor 5. The sorting conveyor 6 sends out the hand luggage 3 other than a stowing target, namely, the hand luggage 3 other than a suitcase which cannot be stowed in the containers 2 toward the withdrawal conveyor 7 by means of the stowing robot 15 (which will be described below). The withdrawal conveyor 7 transports the hand luggage 3 other than a stowing target to a designated place.

The luggage reception conveyor 8 is disposed in a manner of branching with respect to the withdrawal conveyor 7 on a downstream side of the sorting conveyor 6. The hand luggage 3 (suitcase) which is a stowing target to be stowed in the container 2 by means of the stowing robot 15 is placed on the luggage reception conveyor 8. The pusher 9 pushes and moves the hand luggage 3 (stowing target) from the sorting conveyor 6 toward the luggage reception conveyor 8.

The turntable 10 is disposed on a downstream side of the luggage reception conveyor 8. The hand luggage 3 (stowing target) is placed on the turntable 10. The pusher 11 pushes and moves the hand luggage 3 (stowing target) from the luggage reception conveyor 8 toward the turntable 10. The pushers 9 and 11 move the hand luggage 3 transported by the main conveyor 5 to the turntable 10.

The buffer conveyor 12 is disposed on a downstream side of the turntable 10. The hand luggage 3 (stowing target) is placed on the buffer conveyor 12. A positional setting wall portion 18 is provided in an end portion of the buffer conveyor 12 on a side of the containers 2 in the Y axis direction. The pusher 13 pushes and moves the hand luggage 3 (stowing target) from the turntable 10 toward the buffer conveyor 12.

The pusher 14 pushes the hand luggage 3 (stowing target) placed on the buffer conveyor 12 such that it bumps into the wall portion 18. The pusher 14 and the wall portion 18 positionally set the hand luggage 3 placed on the buffer conveyor 12 with respect to a direction (Y axis direction) perpendicular to the array direction (X axis direction) of the turntable 10 and the buffer conveyor 12.

The stowing robot 15 is a stowing unit for stowing pieces of the hand luggage 3 (stowing targets) in the containers 2. The stowing robot 15 has a traveling carriage 19 and a robot arm 20 attached to this traveling carriage 19.

The traveling carriage 19 travels along rails 21 extending in a parallel manner in the array direction (X axis direction) of the containers 2. The rails 21 are installed on a front surface side (door side) of the containers 2. Namely, the rails 21 are disposed between the containers 2 and the main conveyor 5.

The robot arm 20 can move in three axes (XYZ axes) directions and can turn around three axes. The Z axis direction is a height direction perpendicular to the X axis direction and the Y axis direction. A robot hand 22 for holding the hand luggage 3 (stowing target) placed on the buffer conveyor 12 is provided in a tip portion of the robot arm 20.

Figure 2:
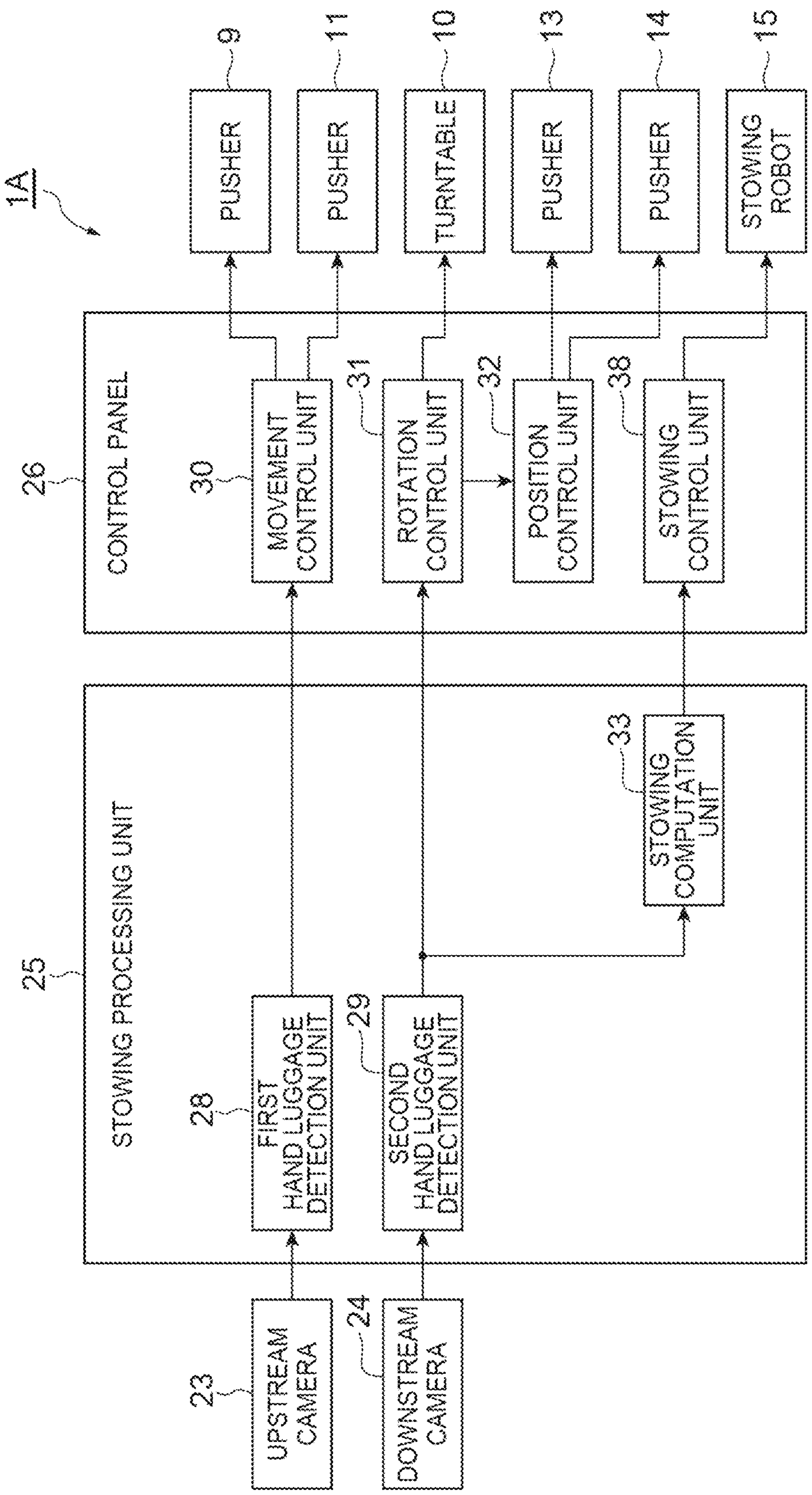
FIG. 2 is a view of a constitution of a control system of the luggage stowing device illustrated in FIG. 1.

FIG. 2 is a view of a constitution of a control system of the luggage stowing device 1A. As illustrated in FIG. 2, the luggage stowing device 1A includes an upstream camera 23, a downstream camera 24, a stowing processing unit 25, and a control panel 26.

The upstream camera 23 is disposed above the progressive conveyor 17 positioned on the farthest upstream side in the main conveyor 5. The upstream camera 23 captures images of pieces of the hand luggage 3 placed on the main conveyor 5 and acquires the captured images of pieces of the hand luggage 3. The downstream camera 24 is disposed above the turntable 10. The downstream camera 24 captures an image of the hand luggage 3 placed on the turntable 10 and acquires the captured image of the hand luggage 3.

The stowing processing unit 25 is constituted of a CPU, a RAM, a ROM, an input/output interface, and the like. The stowing processing unit 25 acquires captured images of pieces of the hand luggage 3 obtained by the upstream camera 23 and the downstream camera 24, executes predetermined processing, and outputs detection data and a control signal to the control panel 26.

The stowing processing unit 25 has a first hand luggage detection unit 28, a second hand luggage detection unit 29, and a stowing computation unit 33.

The first hand luggage detection unit 28 detects the kinds of pieces of the hand luggage 3 transported by the main conveyor 5 on the basis of the captured images of pieces of the hand luggage 3 acquired by the upstream camera 23. The first hand luggage detection unit 28 detects the kinds of pieces of the hand luggage 3 in cooperation with the upstream camera 23.

The second hand luggage detection unit 29 detects the dimensions and the orientation of the hand luggage 3 placed on the turntable 10 on the basis of the captured image of the hand luggage 3 acquired by the downstream camera 24. The second hand luggage detection unit 29 detects the dimensions and the orientation of the hand luggage 3 in cooperation with the downstream camera 24. The downstream camera 24 and the second hand luggage detection unit 29 constitute a luggage detection unit for detecting the dimensions of the hand luggage 3 transported by the main conveyor 5.

The stowing computation unit 33 obtains a control signal for preferentially stowing pieces of the hand luggage 3 having different dimensions in the different containers 2 on the basis of the dimensions of pieces of the hand luggage 3 detected by the second hand luggage detection unit 29. At this time, the stowing computation unit 33 obtains a control signal for preferentially stowing pieces of large-sized hand luggage 3A (refer to FIG. 3) in the preceding container 2A and preferentially stowing pieces of medium-sized hand luggage 3B (refer to FIG. 3) in the following container 2B.

The control panel 26 is installed in the stowing site in the backyard, for example. The control panel 26 is constituted of a CPU, a RAM, a ROM, an input/output interface, and the like. The control panel 26 controls the pushers 9 and 11, the turntable 10, the pushers 13 and 14, and the stowing robot 15 on the basis of detection data and a control signal from the stowing processing unit 25.

The control panel 26 has a movement control unit 30, a rotation control unit 31, a position control unit 32, and a stowing control unit 38.

When it is judged that the hand luggage 3 is a stowing target (suitcase) on the basis of detection data of the first hand luggage detection unit 28, the movement control unit 30 controls the pushers 9 and 11 such that the hand luggage 3 is moved to the turntable 10.

The rotation control unit 31 controls the turntable 10 such that the orientation of the hand luggage 3 placed on the turntable 10 becomes uniform on the basis of the orientations of pieces of the hand luggage 3 detected by the second hand luggage detection unit 29. At this time, the rotation control unit 31 obtains a rotation direction and a rotation amount of the turntable 10 such that a handle 3*a* of the hand luggage 3 (refer to FIG. 1) faces the downstream side (buffer conveyor 12 side) of the turntable 10, and performs control such that the turntable 10 rotates in accordance with the rotation direction and the rotation amount.

After the turntable 10 is controlled such that the orientation of the hand luggage 3 becomes uniform, the position control unit 32 controls the pushers 13 and 14 such that the hand luggage 3 is positionally set with respect to the Y axis direction in the buffer conveyor 12.

The stowing control unit 38 controls the stowing robot 15 in accordance with a control signal obtained by the stowing computation unit 33. The stowing control unit 38 constitutes a control unit for controlling the stowing robot 15 such that pieces of the hand luggage 3 having different dimensions are preferentially stowed in the different containers 2 in cooperation with the stowing computation unit 33.

A luggage stowing method in which pieces of the hand luggage 3 are stowed in the containers 2 using the luggage stowing device 1A constituted as described above will be specifically described.

Figure 3:
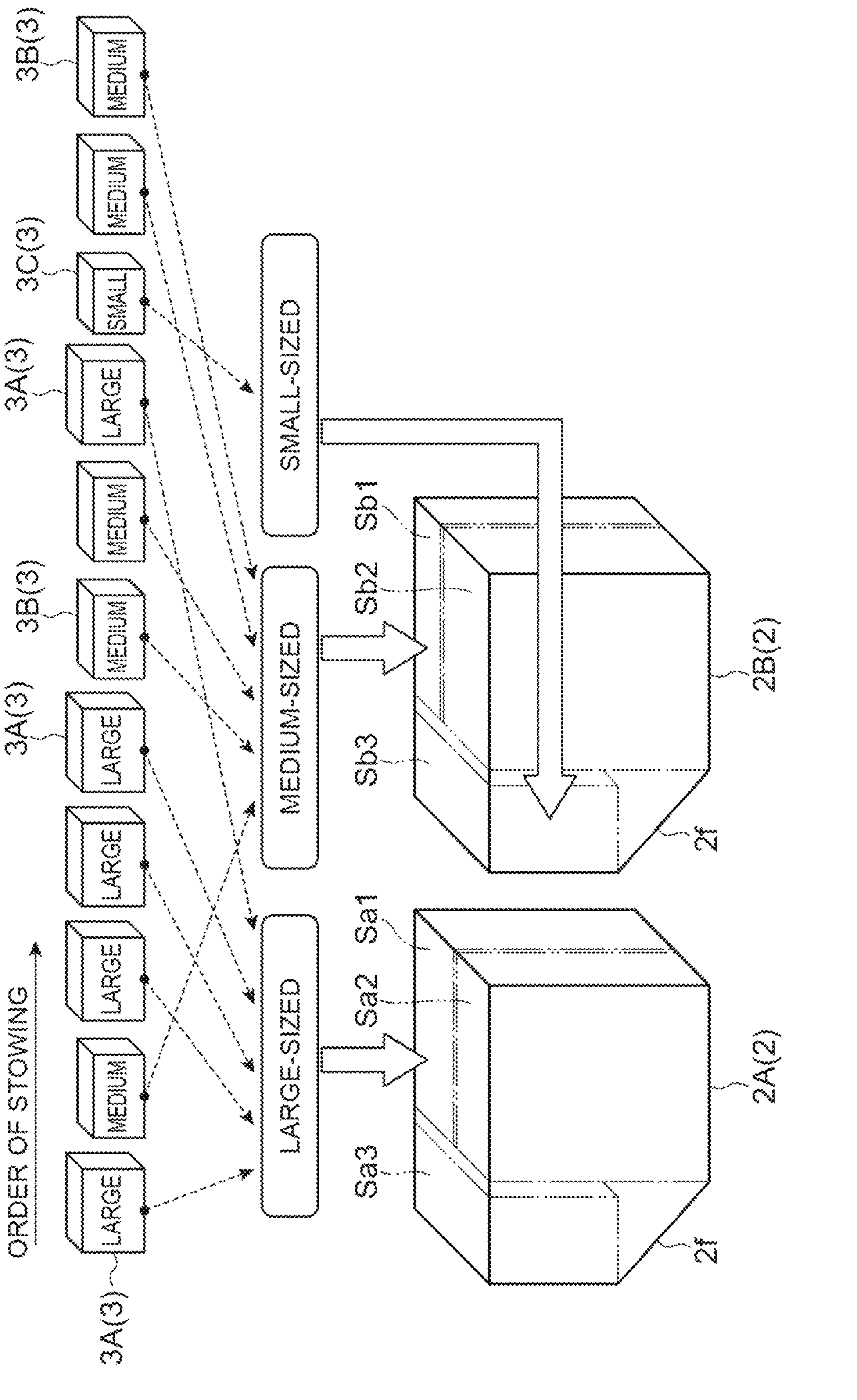
FIG. 3 is a view illustrating a plurality of accommodation areas set inside containers together with an example of the order of stowing pieces of hand luggage.

As illustrated in FIG. 3, a cut portion 2*f* is provided on one of the left and right sides (here, on the left side) of each container 2 when viewed from the door side (not illustrated) of the container 2. The cut portion 2*f* has a structure realized by cutting a lower side corner portion of the container 2 in a tapered shape. A plurality of (here, three) accommodation areas corresponding to the dimensions of pieces of the hand luggage 3 are set inside the container 2.

Specifically, inside the preceding container 2A, a far side accommodation area Sa1 (first far side accommodation area) positioned on a far side in a main region of the preceding container 2A, a near side accommodation area Sa2 (first near side accommodation area) positioned on a near side in the main region of the preceding container 2A, and an auxiliary accommodation area Sa3 (first auxiliary accommodation area) positioned in a region corresponding to the cut portion 2*f* in the preceding container 2A are set.

The main region of the preceding container 2A is a region excluding a region corresponding to the cut portion 2*f* in the preceding container 2A. The near side accommodation area Sa2 is positioned on a near side with respect to the far side accommodation area Sa1 in the preceding container 2A. The auxiliary accommodation area Sa3 is adjacent to the far side accommodation area Sa1 and the near side accommodation area Sa2 in a lateral direction of the preceding container 2A. An auxiliary table 36 having the hand luggage 3 placed thereon is provided in the auxiliary accommodation area Sa3 (refer to FIG. 4).

Pieces of the large-sized hand luggage 3A are stowed in the far side accommodation area Sa1. Pieces of the medium-sized hand luggage 3B are stowed in the near side accommodation area Sa2. Mainly, pieces of small-sized hand luggage 3C are stowed in the auxiliary accommodation area Sa3. Here, pieces of the small-sized hand luggage 3C and pieces of the large-sized hand luggage 3A are stowed in the auxiliary accommodation area Sa3.

Inside the following container 2B, a far side accommodation area Sb1 (second far side accommodation area) positioned on a far side in a main region of the following container 2B, a near side accommodation area Sb2 (second near side accommodation area) positioned on a near side in the main region of the following container 2B, and an auxiliary accommodation area Sb3 (second auxiliary accommodation area) positioned in a region corresponding to the cut portion 2*f* in the following container 2B are set.

The main region of the following container 2B is a region excluding a region corresponding to the cut portion 2*f* in the following container 2B. The near side accommodation area Sb2 is positioned on a near side with respect to the far side accommodation area Sb1 in the following container 2B. The auxiliary accommodation area Sb3 is adjacent to the far side accommodation area Sb1 and the near side accommodation area Sb2 in a lateral direction of the following container 2B. The auxiliary table 36 having the hand luggage 3 placed thereon is provided in the auxiliary accommodation area Sb3 (refer to FIG. 4).

Pieces of the medium-sized hand luggage 3B are stowed in the far side accommodation area Sb1. Pieces of the large-sized hand luggage 3A are stowed in the near side accommodation area Sb2. Mainly, pieces of the small-sized hand luggage 3C are stowed in the auxiliary accommodation area Sb3. Here, pieces of the small-sized hand luggage 3C and pieces of the large-sized hand luggage 3A are stowed in the auxiliary accommodation area Sb3.

Pieces of the large-sized hand luggage 3A are pieces of first luggage. Pieces of the medium-sized hand luggage 3B are pieces of second luggage having smaller dimensions than pieces of the hand luggage 3A. Pieces of the small-sized hand luggage 3C are pieces of third luggage having smaller dimensions than pieces of the hand luggage 3A and the hand luggage 3B. Pieces of the hand luggage 3A to the hand luggage 3C are classified by a range of the dimensions of pieces of the hand luggage 3. For example, the dimensions of pieces of the hand luggage 3 may be cubic contents or surface areas of pieces of the hand luggage 3 or may be the sums of lengths, widths, and heights of pieces of the hand luggage 3.

Figure 4:
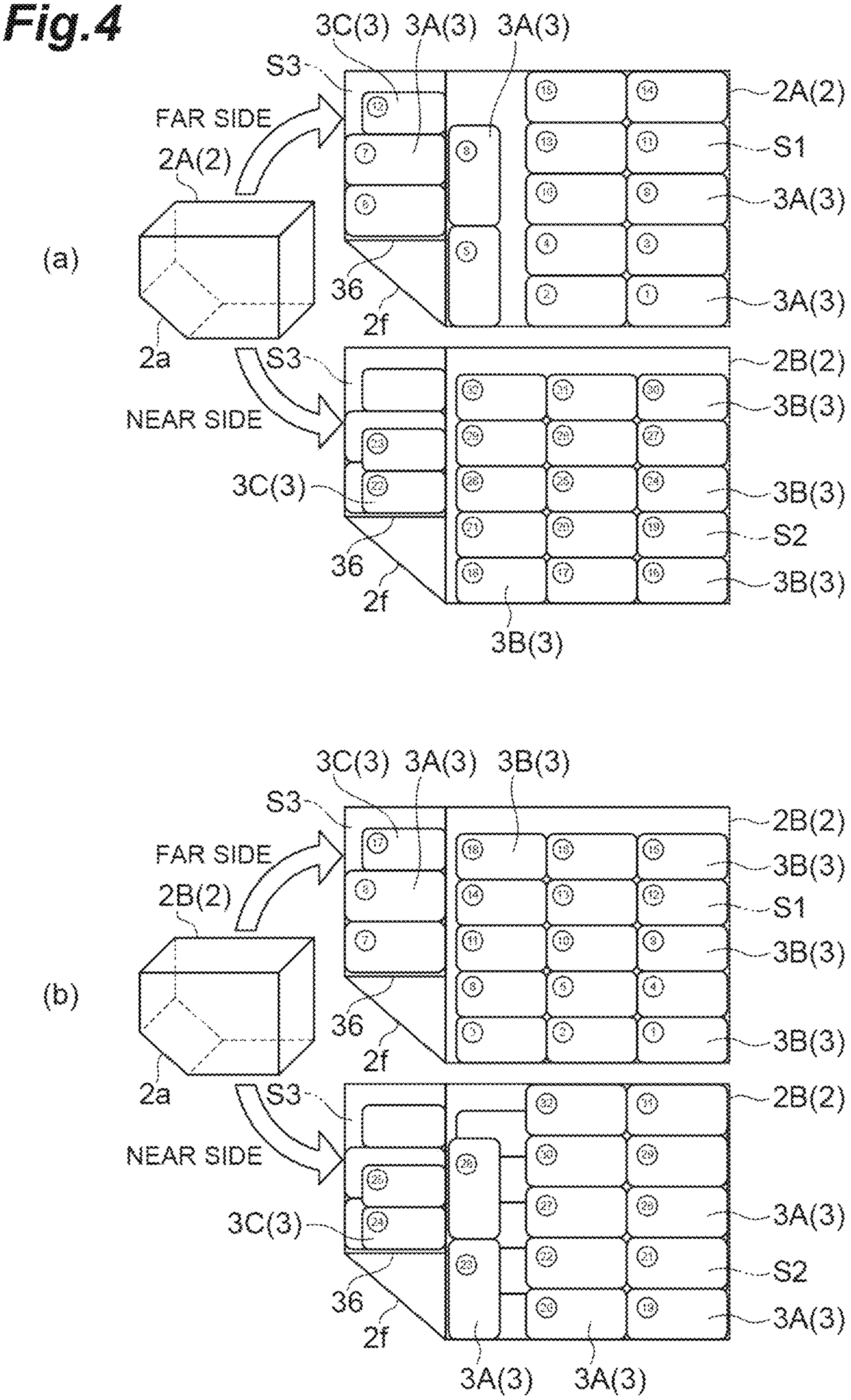
FIG. 4 is a view illustrating addresses set inside the containers together with the accommodation areas.

As illustrated in FIG. 4, inside the containers 2, addresses for designating stowing positions of pieces of the hand luggage 3 are set in advance. Inside the containers 2, addresses are set in order from the lower side toward the upper side and from the far side toward the near side. In addition, in the far side accommodation area Sa1 and the near side accommodation area Sa2 in the preceding container 2A, addresses are set in order from the right side (side opposite to the auxiliary accommodation area Sa3) toward the left side (auxiliary accommodation area Sa3 side). In the far side accommodation area Sb1 and the near side accommodation area Sb2 in the following container 2B, addresses are set in order from the right side (side opposite to the auxiliary accommodation area Sb3) toward the left side (auxiliary accommodation area Sb3 side).

The stowing computation unit 33 of the stowing processing unit 25 obtains a control signal for stowing pieces of the large-sized hand luggage 3A in the far side accommodation area Sa1 in the preceding container 2A and then the near side accommodation area Sb2 in the following container 2B in that order, a control signal for stowing pieces of the medium-sized hand luggage 3B in the far side accommodation area Sb1 in the following container 2B and then the near side accommodation area Sa2 in the preceding container 2A in that order, and a control signal for stowing pieces of the small-sized hand luggage 3C in the auxiliary accommodation area Sa3 in the preceding container 2A and then the auxiliary accommodation area Sb3 in the following container 2B in that order. Further, the stowing control unit 38 of the control panel 26 controls the stowing robot 15 in response to a control signal obtained from the stowing computation unit 33.

Figure 5:
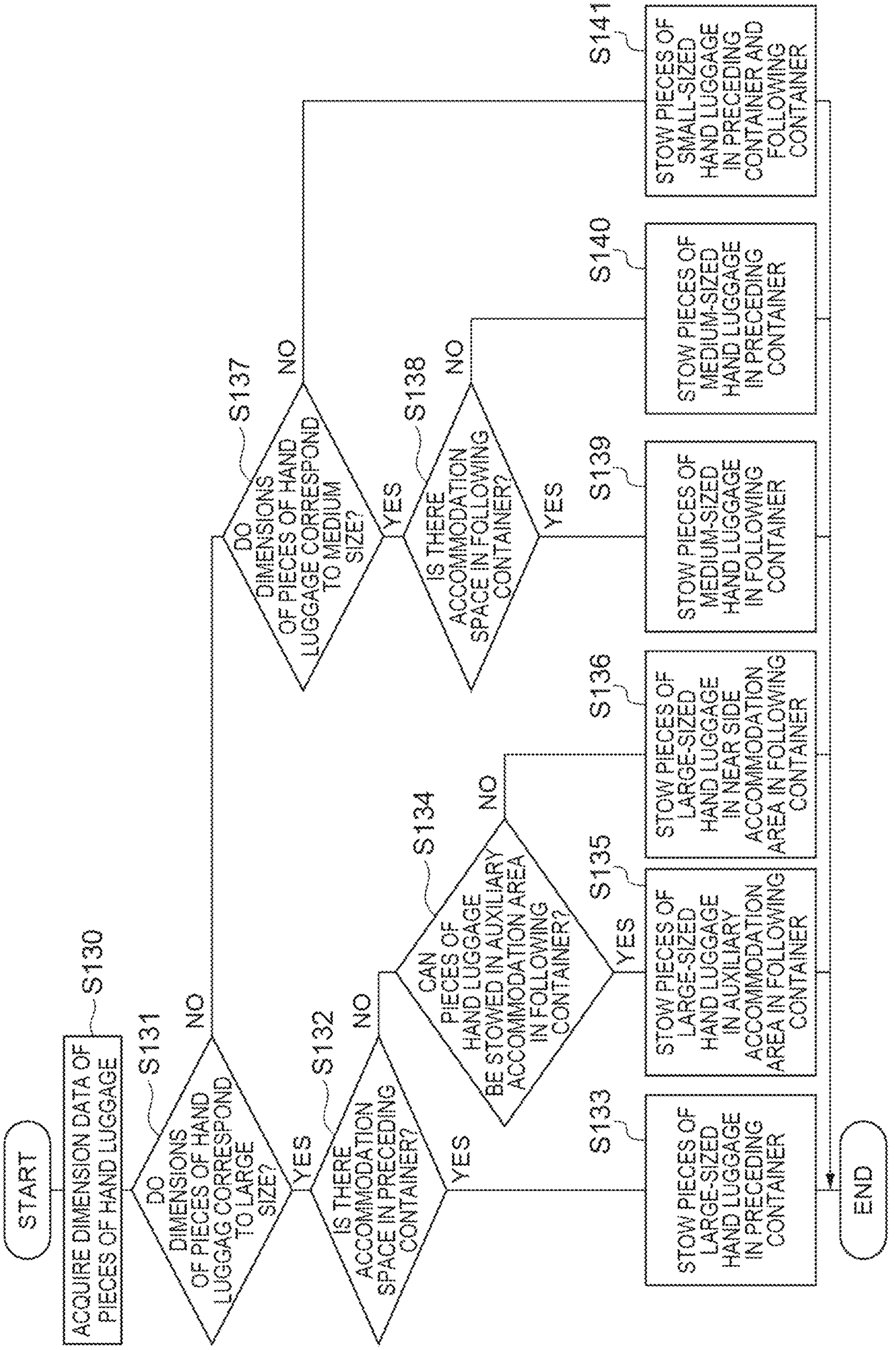
FIG. 5 is a flowchart showing details of a procedure of stowing computation processing executed by a stowing computation unit illustrated in FIG. 2.

FIG. 5 is a flowchart showing details of a procedure of stowing computation processing executed by the stowing computation unit 33. This processing shows a procedure of computation processing for each piece of the hand luggage 3. As illustrated in FIG. 3, pieces of the hand luggage 3 are randomly transported by the main conveyor 5 regardless of the dimensions. The stowing computation unit 33 executes computation processing of stowing pieces of the hand luggage 3 in the preceding container 2A and the following container 2B in the transporting order.

In FIG. 5, the stowing computation unit 33 first acquires dimension data of pieces of the hand luggage 3 detected by the second hand luggage detection unit 29 (Procedure S130). Further, the stowing computation unit 33 judges whether the dimensions of pieces of the hand luggage 3 correspond to a large size (Procedure S131).

When it is judged that the dimensions of pieces of the hand luggage 3 correspond to a large size, the stowing computation unit 33 judges whether there are spaces for accommodating pieces of the large-sized hand luggage 3A in the preceding container 2A (Procedure S132). At this time, when pieces of the hand luggage 3A have already been stowed at an address No. 15 in the preceding container 2A (refer to FIG. 4), the stowing computation unit 33 determines that there are no spaces for accommodating pieces of the hand luggage 3A in the preceding container 2A, and when pieces of the hand luggage 3A have not yet been stowed at the address No. 15 in the preceding container 2A, it determines that there are spaces for accommodating pieces of the hand luggage 3A in the preceding container 2A.

When it is judged that there are spaces for accommodating pieces of the hand luggage 3A in the preceding container 2A, the stowing computation unit 33 obtains a control signal for stowing pieces of the hand luggage 3A in the far side accommodation area Sa1 and the auxiliary accommodation area Sa3 in the preceding container 2A (Procedure S133). At this time, the stowing computation unit 33 obtains a control signal for stowing pieces of the hand luggage 3A in accordance with the order of address set in the far side accommodation area Sa1 and the auxiliary accommodation area Sa3 (refer to FIG. 4).

When it is judged that there are no spaces for accommodating pieces of the hand luggage 3A in the preceding container 2A, the stowing computation unit 33 judges whether pieces of the hand luggage 3A can be stowed in the auxiliary accommodation area Sb3 in the following container 2B (Procedure S134). When there are no spaces for accommodating pieces of the hand luggage 3A in the auxiliary accommodation area Sb3 in the following container 2B, pieces of the hand luggage 3A cannot be stowed. In addition, depending on the stowing circumstances of pieces of the medium-sized hand luggage 3B at positions closer to the auxiliary accommodation area Sb3 in the far side accommodation area Sb1 in the following container 2B, pieces of the large-sized hand luggage 3A cannot be stowed in the auxiliary accommodation area Sb3.

When it is judged that pieces of the hand luggage 3A can be stowed in the auxiliary accommodation area Sb3 in the following container 2B, the stowing computation unit 33 obtains a control signal for stowing pieces of the hand luggage 3A in the auxiliary accommodation area Sb3 in the following container 2B (Procedure S135). At this time, the stowing computation unit 33 obtains a control signal for stowing pieces of the hand luggage 3A in accordance with the order of address set in the auxiliary accommodation area Sb3.

When it is judged that pieces of the hand luggage 3A cannot be stowed in the auxiliary accommodation area Sb3 in the following container 2B, the stowing computation unit 33 obtains a control signal for stowing pieces of the hand luggage 3A in the near side accommodation area Sb2 in the following container 2B (Procedure S136). At this time, the stowing computation unit 33 obtains a control signal for stowing pieces of the hand luggage 3A in accordance with the order of address set in the near side accommodation area Sb2 (refer to FIG. 4).

When it is judged in Procedure S131 that the dimensions of pieces of the hand luggage 3 do not correspond to a large size, the stowing computation unit 33 judges whether the dimensions of pieces of the hand luggage 3 correspond to a medium size (Procedure S137). When it is judged that the dimensions of pieces of the hand luggage 3 correspond to a medium size, the stowing computation unit 33 judges whether there are spaces for accommodating pieces of the medium-sized hand luggage 3B in the following container 2B (Procedure S138). At this time, when pieces of the hand luggage 3B have already been stowed at an address No. 18 in the following container 2B (refer to FIG. 4), the stowing computation unit 33 determines that there are no spaces for accommodating pieces of the hand luggage 3B in the following container 2B, and when pieces of the hand luggage 3B have not yet been stowed at the address No. 18 in the following container 2B, it determines that there are spaces for accommodating pieces of the hand luggage 3B in the following container 2B.

When it is judged that there are spaces for accommodating pieces of the hand luggage 3B in the following container 2B, the stowing computation unit 33 obtains a control signal for stowing pieces of the hand luggage 3B in the far side accommodation area Sb1 in the following container 2B (Procedure S139). At this time, the stowing computation unit 33 obtains a control signal for stowing pieces of the hand luggage 3B in accordance with the order of address set in the far side accommodation area Sb1 (refer to FIG. 4).

When it is judged that there are no spaces for accommodating pieces of the hand luggage 3B in the following container 2B, the stowing computation unit 33 obtains a control signal for stowing pieces of the hand luggage 3B in the near side accommodation area Sa2 in the preceding container 2A (Procedure S140). At this time, the stowing computation unit 33 obtains a control signal for stowing pieces of the hand luggage 3B in accordance with the order of address set in the near side accommodation area Sa2 (refer to FIG. 4).

When it is judged in Procedure S137 that the dimensions of pieces of the hand luggage 3 do not correspond to a medium size, the stowing computation unit 33 obtains a control signal for stowing pieces of the small-sized hand luggage 3C in the auxiliary accommodation area Sa3 in the preceding container 2A and the auxiliary accommodation area Sb3 in the following container 2B (Procedure S141). At this time, the stowing computation unit 33 obtains a control signal for stowing pieces of the hand luggage 3C in accordance with the order of address set in the auxiliary accommodation areas Sa3 and Sb3 (refer to FIG. 4).

In the luggage stowing device 1A described above, if pieces of the hand luggage 3 are delivered from the airport side conveyor 16 to the main conveyor 5, pieces of the hand luggage 3 are transported toward the containers 2 by the main conveyor 5. At this time, an image of the hand luggage 3 placed in the progressive conveyor 17 of the main conveyor 5 on the farthest upstream side is captured by the upstream camera 23.

The captured image of the hand luggage 3 acquired by the upstream camera 23 is sent to the stowing processing unit 25, and the kind of the hand luggage 3 is detected on the basis of the captured image of the hand luggage 3.

When the hand luggage 3 is a stowing target, the hand luggage 3 (stowing target) moves from the sorting conveyor 6 to the luggage reception conveyor 8 by the pusher 9, and the hand luggage 3 (stowing target) further moves from the luggage reception conveyor 8 to the turntable 10 by the pusher 11.

An image of the hand luggage 3 (stowing target) placed on the turntable 10 is captured by the downstream camera 24. The captured image of the hand luggage 3 acquired by the downstream camera 24 is sent to the stowing processing unit 25, and the dimensions and the orientation of the hand luggage 3 are detected on the basis of the captured image of the hand luggage 3 (detecting step).

The turntable 10 rotates such that the handle 3*a* of the hand luggage 3 (stowing target) faces the buffer conveyor 12 side. The hand luggage 3 (stowing target) moves from the turntable 10 to the buffer conveyor 12 by the pusher 13. When the hand luggage 3 (stowing target) is pushed against the wall portion 18 by the pusher 14, the hand luggage 3 is positionally set with respect to the container 2 side in the Y axis direction.

Pieces of the hand luggage 3 (stowing targets) are stowed in the containers 2 by the stowing robot 15. Specifically, when the robot arm 20 moves in the three axes directions and turns around three axes in a state in which the hand luggage 3 placed on the buffer conveyor 12 is held by the robot hand 22, the hand luggage 3 is stowed in the accommodation area corresponding to the dimensions of pieces of the hand luggage 3 inside the containers 2 (stowing step).

Pieces of the large-sized hand luggage 3A are first stowed in the far side accommodation area Sa1 and the auxiliary accommodation area Sa3 in the preceding container 2A in the order of address and are subsequently stowed in the near side accommodation area Sb2 in the following container 2B in the order of address. Pieces of the medium-sized hand luggage 3B are first stowed in the far side accommodation area Sb1 in the following container 2B in the order of address and are subsequently stowed in the near side accommodation area Sa2 in the preceding container 2A in the order of address. Pieces of the small-sized hand luggage 3C are stowed in the auxiliary accommodation area Sa3 in the preceding container 2A and the auxiliary accommodation area Sb3 in the following container 2B in the order of address.

When the hand luggage 3 is stowed in the preceding container 2A, the traveling carriage 19 remains stopping at a position in front of the preceding container 2A (refer to FIG. 1). When the hand luggage 3 is stowed in the following container 2B, in a state in which the hand luggage 3 is held by the robot hand 22, the traveling carriage 19 travels to a position in front of the following container 2B along the rails 21. The hand luggage 3 is stowed in the container 2 in a state in which the handle 3*a* faces the near side in the container 2.

As described above, when pieces of the hand luggage 3 are randomly transported by the main conveyor 5 regardless of the dimensions, if pieces of the hand luggage 3 are stowed in one container 2 in the transporting order, the following problems occur.

That is, for example, when pieces of the hand luggage 3 are stowed from the far side in the containers 2 in a left-justified manner, the luggage stowage factors of the containers 2 change depending on the order of transporting pieces of the hand luggage 3. The luggage stowage factor of the container 2 is a proportion of the cubic content of pieces of the hand luggage 3 to the volume of the container 2. At this time, an empty space inside the container 2 may increase depending on the order of transporting pieces of the hand luggage 3 so that a stable luggage stowage factor may not be secured in the container 2. In addition, if pieces of the hand luggage 3 having larger dimensions are stowed on pieces of the hand luggage 3 having smaller dimensions, collapse of pieces of the hand luggage 3 is likely to occur. In order to prevent increase in empty space inside the containers 2 and collapse of pieces of the hand luggage 3, it is conceivable that pieces of the hand luggage 3 are rearranged by the dimensions. However, not only a burden on a worker increases, but also spaces for withdrawing pieces of the hand luggage 3 is required.

In regard to such problems, in the luggage stowing device 1A, pieces of the hand luggage 3 transported by the main conveyor 5 are stowed in the two containers 2 by the stowing robot 15 in the transporting order. At this time, the stowing robot 15 is controlled such that the dimensions of pieces of the hand luggage 3 are detected and pieces of the hand luggage 3 having different dimensions are preferentially stowed in the different containers 2. For this reason, even if pieces of the hand luggage 3 are randomly transported regardless of the dimensions, pieces of the hand luggage 3 are preferentially stowed in an appropriate container 2 corresponding to the dimensions. Therefore, pieces of the hand luggage 3 are efficiently stowed in the containers 2, and thus the empty spaces inside the containers 2 are reduced. Accordingly, regardless of the order of transporting pieces of the hand luggage 3, stable luggage stowage factors are secured in the containers 2. In addition, since pieces of the large-sized hand luggage 3A are not stowed on pieces of the medium-sized hand luggage 3B and pieces of the medium-sized hand luggage 3B and pieces of the large-sized hand luggage 3A are not stowed on pieces of the small-sized hand luggage 3C, collapse of pieces of the hand luggage 3 inside the containers 2 is prevented. As a result, pieces of the hand luggage 3 do not have to be rearranged in accordance with the dimensions of pieces of the hand luggage 3 before pieces of the hand luggage 3 are stowed in the containers 2. Therefore, a burden on a worker is reduced, and spaces for withdrawing pieces of the hand luggage 3 is not required.

In the present embodiment, pieces of the large-sized hand luggage 3A are preferentially stowed in the preceding container 2A, and pieces of the medium-sized hand luggage 3B are preferentially stowed in the following container 2B. For this reason, even if pieces of the hand luggage 3A and the hand luggage 3B having different dimensions are randomly transported, pieces of the hand luggage 3A are preferentially and efficiently stowed in the preceding container 2A, and pieces of the hand luggage 3B are preferentially and efficiently stowed in the following container 2B.

In the present embodiment, pieces of the large-sized hand luggage 3A are stowed in the far side accommodation area Sa1 in the preceding container 2A and then the near side accommodation area Sb2 in the following container 2B in that order, and pieces of the medium-sized hand luggage 3B are stowed in the far side accommodation area Sb1 in the following container 2B and then the near side accommodation area Sa2 in the preceding container 2A in that order. For this reason, for example, even when pieces of the large-sized hand luggage 3A cannot be stowed in two rows in a depth direction of the containers 2, pieces of the hand luggage 3A and the hand luggage 3B are efficiently stowed in the preceding container 2A and the following container 2B.

In the present embodiment, pieces of the small-sized hand luggage 3C are stowed the auxiliary accommodation area Sa3 corresponding to the cut portion 2*f* in the preceding container 2A and the auxiliary accommodation area Sb3 corresponding to the cut portion 2*f* in the following container 2B. For this reason, even if pieces of the hand luggage 3A to the hand luggage 3C having different dimensions are randomly transported, pieces of the hand luggage 3A to the hand luggage 3C are efficiently stowed in the preceding container 2A and the following container 2B.

In the present embodiment, when pieces of the large-sized hand luggage 3A are stowed in the far side accommodation area Sa1 in the preceding container 2A and the near side accommodation area Sb2 in the following container 2B, pieces of the hand luggage 3A are stowed from a side opposite to a cut portion 7*f* toward the cut portion 7*f* side, and when pieces of the medium-sized hand luggage 3B are stowed in the far side accommodation area Sb1 in the following container 2B and the near side accommodation area Sa2 in the preceding container 2A, pieces of the hand luggage 3B are stowed from a side opposite to the cut portion 2*f* toward the cut portion 2*f* side. For this reason, before pieces of the hand luggage 3A and the hand luggage 3B are stowed at positions in the vicinity of the auxiliary accommodation area Sa3 in the far side accommodation area Sa1 and the near side accommodation area Sa2, pieces of the small-sized hand luggage 3C can be stowed in the auxiliary accommodation area Sa3, and before pieces of the hand luggage 3A and the hand luggage 3B are stowed at positions in the vicinity of the auxiliary accommodation area Sb3 in the far side accommodation area Sb1 and the near side accommodation area Sb2, pieces of the hand luggage 3C can be stowed in the auxiliary accommodation area Sb3. Therefore, even when pieces of the hand luggage 3C are stowed in the preceding container 2A and the following container 2B together with pieces of the hand luggage 3A and the hand luggage 3B, pieces of the hand luggage 3C can be reliably stowed in the preceding container 2A and the following container 2B.

Various kinds of modifications can be applied to the present embodiment. In the present embodiment, pieces of the large-sized hand luggage 3A, pieces of the medium-sized hand luggage 3B, and pieces of the small-sized hand luggage 3C are stowed in each of the preceding container 2A and the following container 2B, but the embodiment is not particularly limited to such a form. For example, pieces of the large-sized hand luggage 3A and pieces of the small-sized hand luggage 3C may be stowed in the preceding container 2A, and pieces of the medium-sized hand luggage 3B and pieces of the small-sized hand luggage 3C may be stowed in the following container 2B.

In the present embodiment, regarding the dimensions of pieces of the hand luggage 3 to be stowed in the containers 2, there are three types including a large size, a medium size, and a small size, but the embodiment is not particularly limited to this form. Two types including a large size and a small size may be adopted. In this case, pieces of the large-sized hand luggage 3 may be preferentially stowed in one of the preceding container 2A and the following container 2B, and pieces of the small-sized hand luggage 3 may be preferentially stowed in the other of the preceding container 2A and the following container 2B.

In the present embodiment, a plurality of types of hand luggage 3 having different dimensions are stowed in the two containers 2 which are disposed side by side, but the embodiment is not particularly limited to this form. A plurality of types of hand luggage 3 having different dimensions may be stowed in the three or more containers 2 which are disposed side by side.

In the present embodiment, the control panel 26 has the movement control unit 30, the rotation control unit 31, the position control unit 32, and the stowing control unit 38, but the embodiment is not particularly limited to such a form. For example, when the control panel 26 is not installed, the movement control unit 30, the rotation control unit 31, the position control unit 32, and the stowing control unit 38 may be provided in the stowing processing unit 25.

In the present embodiment, pieces of the hand luggage 3 are stowed in the containers 2 provided with the cut portion 2*f* in one of the left and right lower side corner portions, but the present disclosure is not particularly limited to this form. For example, the present disclosure can also be applied to a luggage stowing device stowing pieces of luggage in rectangular parallelepiped containers which do not have the cut portion 2*f*. In addition, the present disclosure can also be applied to a luggage stowing device stowing pieces of luggage in containers for other than airplanes.

Second Embodiment

Figure 6:
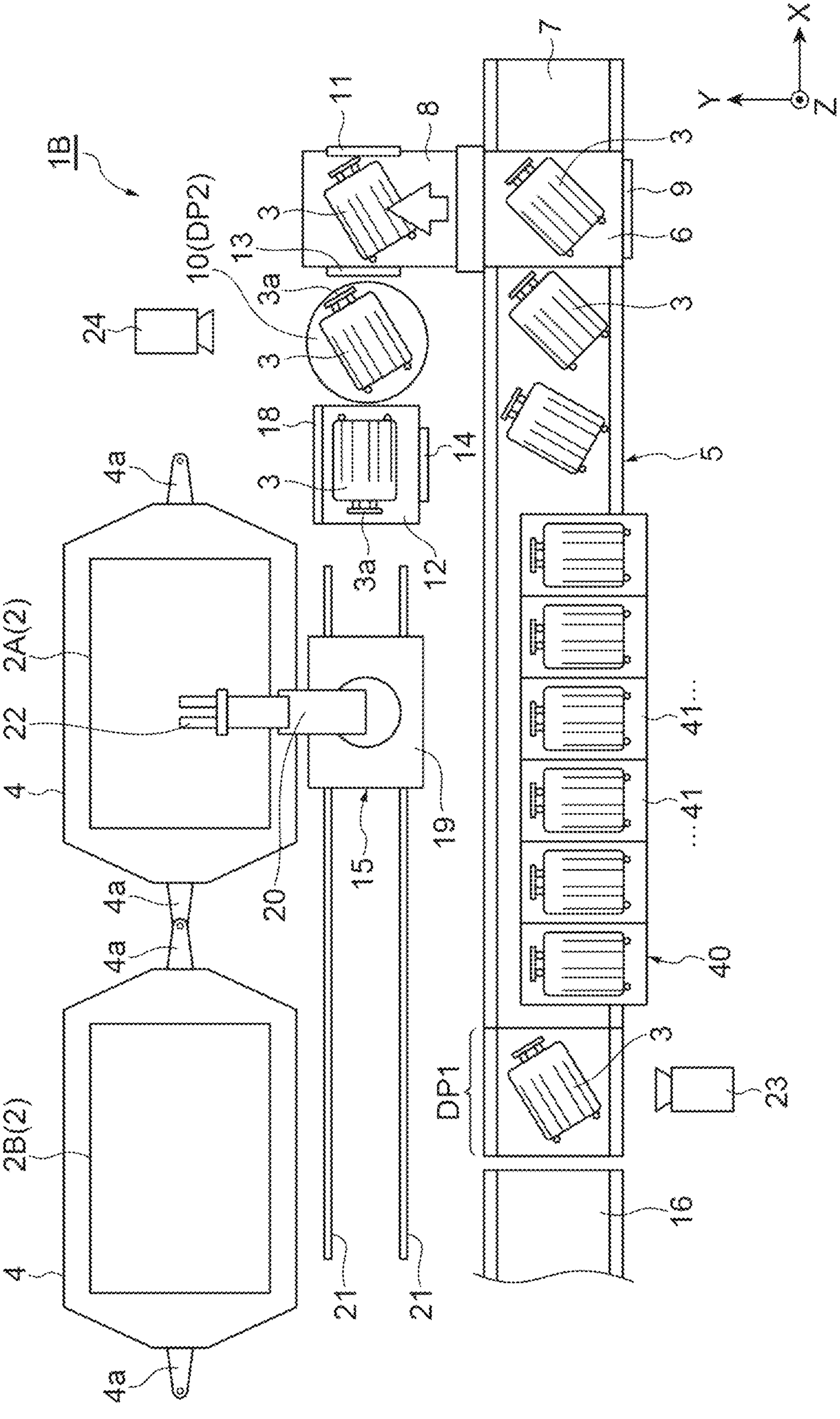
FIG. 6 is a view of a schematic constitution illustrating a luggage stowing device according to a second embodiment of the present disclosure.

FIG. 6 is a view of a schematic constitution illustrating a luggage stowing device according to a second embodiment of the present disclosure. As illustrated in FIG. 6, a luggage stowing device 1B according to the second embodiment differs from that of the first embodiment in that the main conveyor 5 has a stock conveyor 40 in place of the progressive conveyors 17. Other points are similar to those of the first embodiment.

The stock conveyor 40 is a conveyor for temporarily stocking pieces of the hand luggage 3 which have been transported. When the hand luggage 3 which has arrived at the buffer conveyor 12 should be stowed later, the stock conveyor 40 temporarily stocks the hand luggage 3 such that it can be stowed later.

The stock conveyor 40 is provided above the main conveyor 5. The stock conveyor 40 has a plurality of storage units 41 individually storing one piece of hand luggage 3. The plurality of storage units 41 are arrayed in a direction in which the main conveyor 5 extends, that is, the X axis direction. Rows of the storage units 41 may be provided in a plurality of stages in a vertical direction. In the storage units 41, the stowing robot 15 can have access (stock and take out the hand luggage 3) from the positive side in the Y axis direction.

In the present embodiment, in the main conveyor 5, the upstream camera 23 (luggage detection unit) capturing an image of the hand luggage 3 at the information detection place DP1 is disposed above a location adjacent to the airport side conveyor 16 (which may hereinafter be referred to as "an information detection place DP1"). In addition, the downstream camera 24 (luggage detection unit) capturing an image of the hand luggage 3 on the turntable 10 is disposed above the turntable 10 (which may hereinafter be referred to as "an information detection place DP2").

Figure 7:
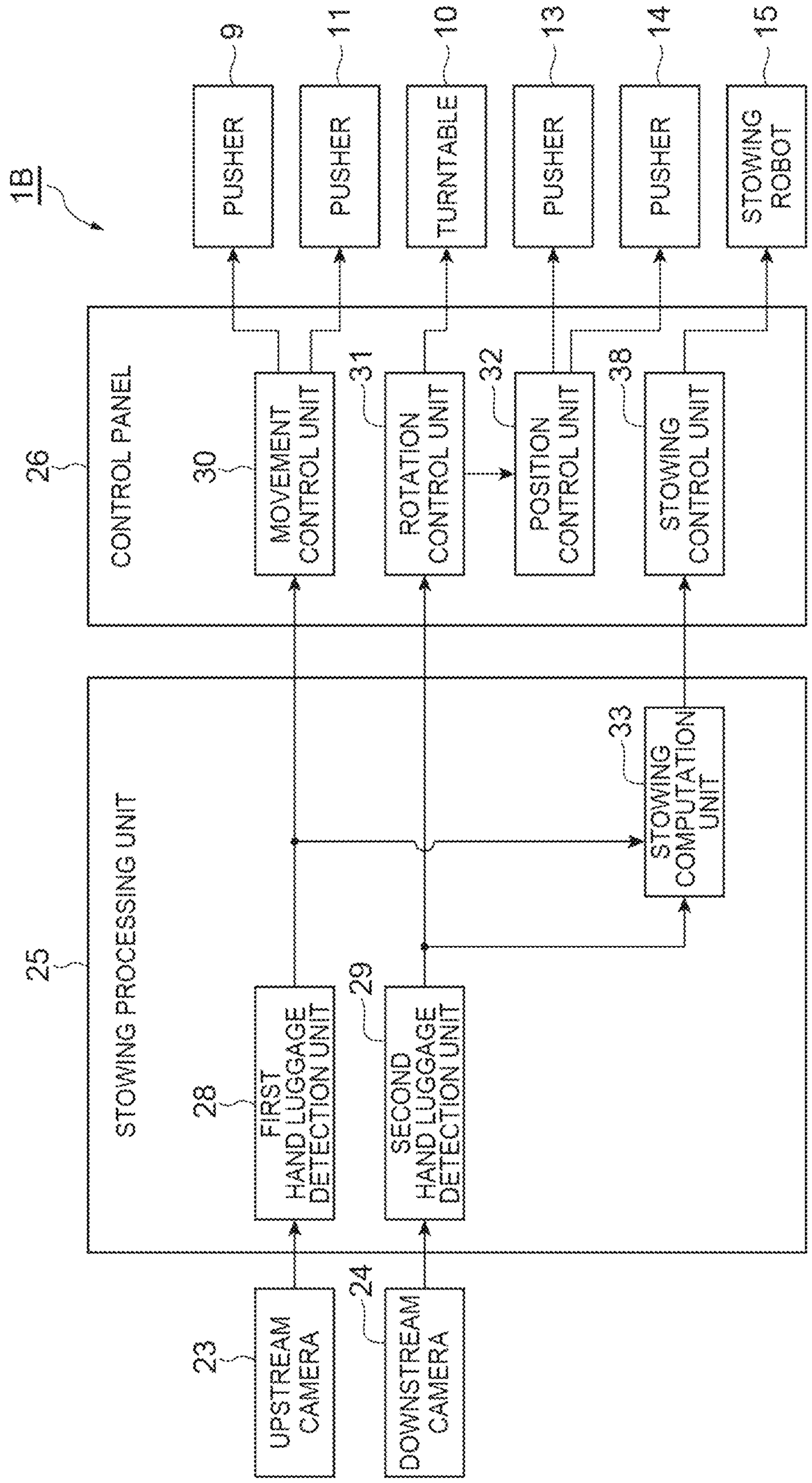
FIG. 7 is a view of a constitution of a control system of the luggage stowing device illustrated in FIG. 6.

FIG. 7 is a view of a constitution of a control system of the luggage stowing device 1B. As illustrated in FIG. 6, constituent elements of the control system in the luggage stowing device 1B are similar to those of the first embodiment.

For example, luggage information of pieces of the hand luggage 3 detected by the first hand luggage detection unit 28 and the second hand luggage detection unit 29 includes information such as dimensions of pieces of the hand luggage 3, kinds of pieces of the hand luggage 3, materials of pieces of the hand luggage 3, and orientations of pieces of the hand luggage 3. These pieces of information may be detected by any of the first hand luggage detection unit 28 and the second hand luggage detection unit 29. Here, the first hand luggage detection unit 28 on the upstream side detects the dimensions of pieces of the hand luggage 3, the kinds of pieces of the hand luggage 3, and the materials of pieces of the hand luggage 3, and the second hand luggage detection unit 29 detects the orientations of pieces of the hand luggage 3 immediately before being stowed.

Figure 8:
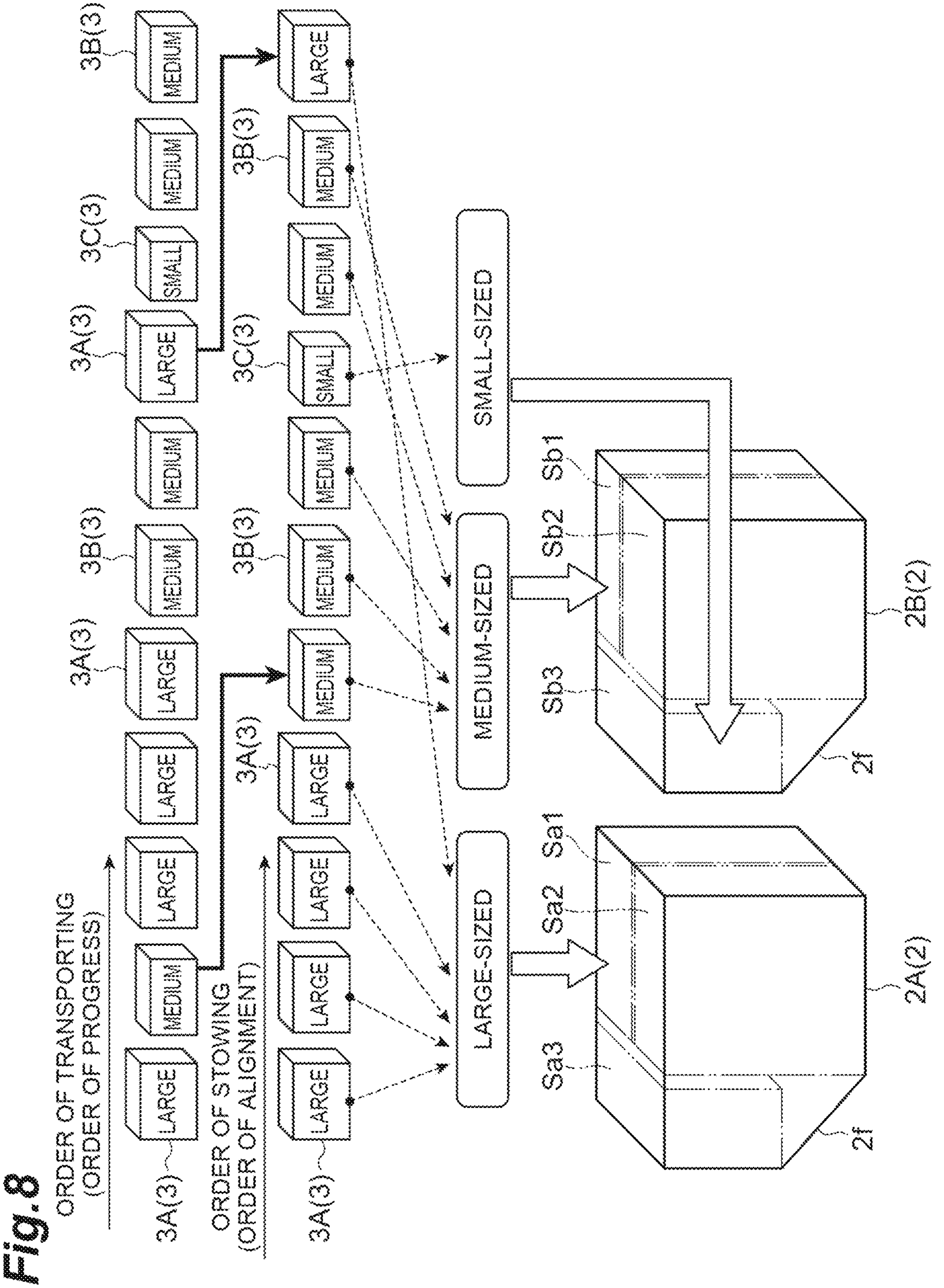
FIG. 8 is a view illustrating the plurality of accommodation areas set inside the containers together with an example of the order of stowing pieces of the hand luggage.
Figure 9A:
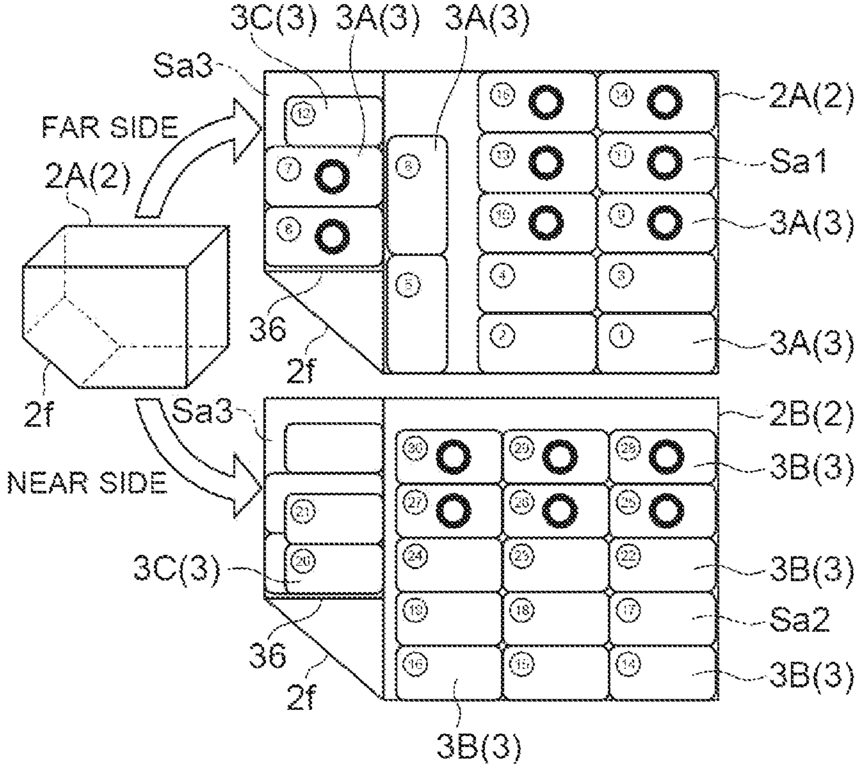
FIG. 9(*a*) and FIG. 9(*b*) are views illustrating addresses set inside the containers together with the accommodation areas.
Figure 9B:
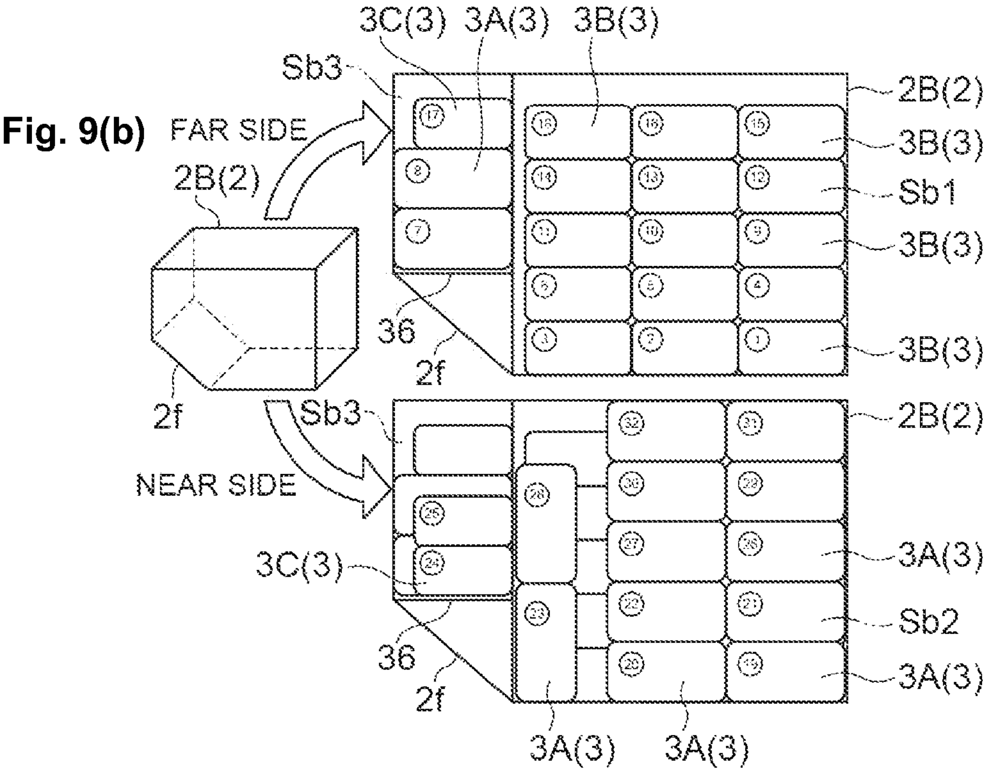

The stowing control unit 38 controls the stowing robot 15 on the basis of a basic logic stipulating basic motions of the stowing robot 15. In addition, the stowing control unit 38 controls the stowing robot 15 on the basis of an adjustment logic for adjusting the order of stowing pieces of the hand luggage 3 in the containers 2 with respect to the order of transporting pieces of the hand luggage 3. Control of the stowing robot 15 in the basic logic is similar to that of the first embodiment (refer to FIGS. 8 and 9). A control signal based on the basic logic or the adjustment logic is subjected to computation by the stowing computation unit 33. In the following description, when it is said that the stowing control unit 38 controls the stowing robot 15, it may denote that the stowing computation unit 33 computes a control signal and the stowing control unit 38 controls the stowing robot 15 on the basis of the control signal.

The adjustment logic is a logic for adjusting the stowing order of performing stowing by the stowing robot 15 with respect to the order of transporting pieces of the hand luggage 3 being transported from the transportation unit on the basis of the luggage information detected by the hand luggage detection units 28 and 29. In the present embodiment, five adjustment logics including a first adjustment logic to a fifth adjustment logic are set.

In the first adjustment logic, the stowing control unit 38 adjusts the stowing order by temporarily stocking the hand luggage 3 in the stock conveyor 40 and then stowing the hand luggage stocked in the stock conveyor 40. The stowing control unit 38 adjusts the stowing order to the order in which the stowing robot 15 easily performs stowing with respect to each of the containers 2A and 2B. In the example in FIG. 3, as the second in the transporting order, the medium-sized hand luggage 3B is transported between a plurality of pieces of the large-sized hand luggage 3A.

In this case, in the first adjustment logic, the stowing control unit 38 temporarily stocks the medium-sized hand luggage 3B in the stock conveyor 40 as the second in the transporting order. After four pieces of large-sized hand luggage 3A subsequent to the medium-sized hand luggage 3B are consecutively stowed, the stowing control unit 38 performs control such that the medium-sized hand luggage 3B is taken out from the stock conveyor 40 and stowed in the following container 2B as the fifth in the stowing order. The stowing robot 15 consecutively stows the four pieces of large-sized hand luggage 3A and then consecutively stows three pieces of the medium-sized hand luggage 3B.

The stowing control unit 38 temporarily stocks the large-sized hand luggage 3A in the stock conveyor 40 as the eighth in the transporting order. In addition, the stowing control unit 38 performs control such that the large-sized hand luggage 3A is taken out from the stock conveyor 40 and stowed in the preceding container 2A as the eleventh in the stowing order. The stowing robot 15 consecutively stows three pieces of the medium-sized hand luggage 3B, stows another piece of the small-sized hand luggage 3C and two pieces of the medium-sized hand luggage 3B, and then stows a piece of the large-sized hand luggage 3A.

Figure 10:
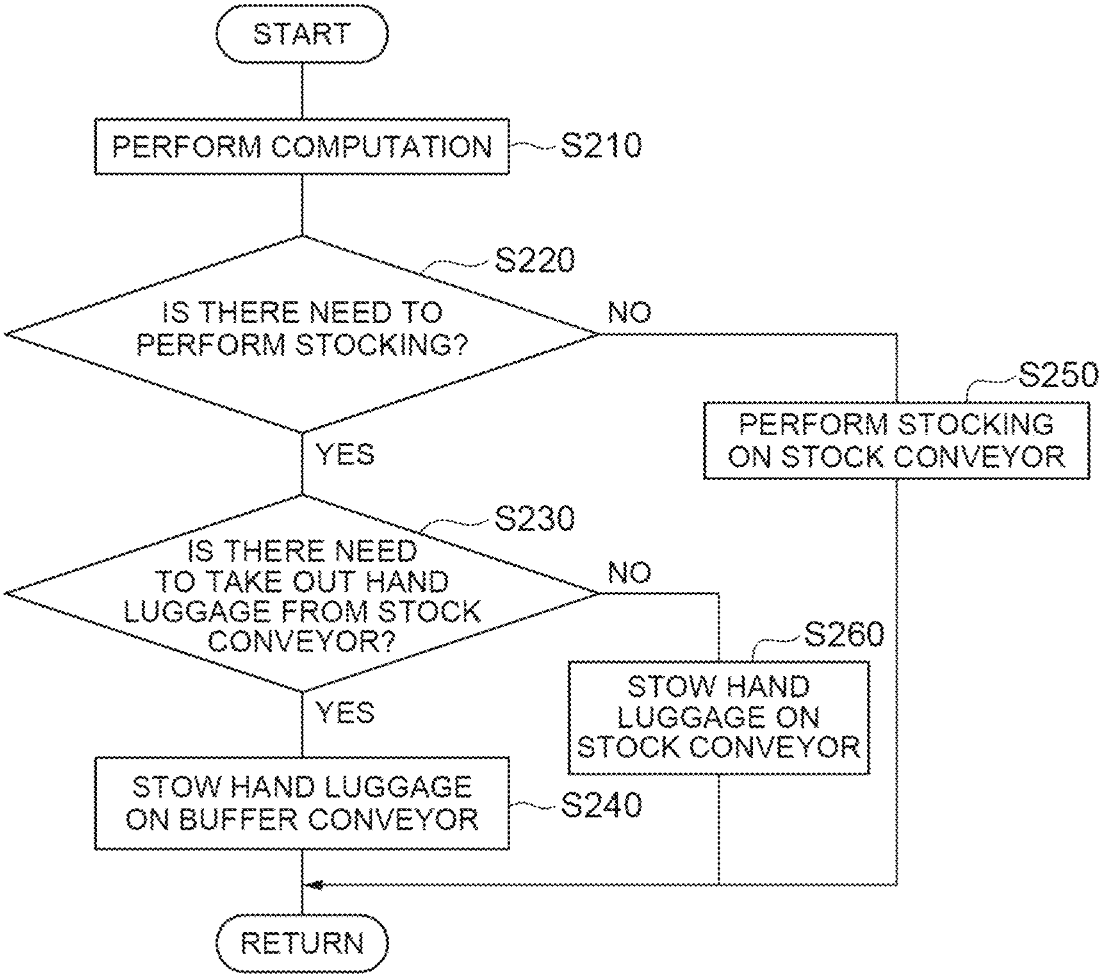
FIG. 10 is a flowchart showing a first adjustment logic.

FIG. 10 is a flowchart of the first adjustment logic. As shown in FIG. 10, the stowing computation unit 33 detects the luggage information of each piece of the hand luggage 3 from the hand luggage detection units 28 and 29 and computes the order of transporting pieces of the hand luggage and the order of stowing pieces of the hand luggage with respect to this on the basis of the luggage information (Step S210: luggage detecting step, stowing step). Since the stowing computation unit 33 can acquire the luggage information at the information detection place DP1 on the upstream side, all kinds of pieces of the hand luggage 3 present in the transportation unit and the transporting order thereof (circumstances of pieces of the hand luggage 3 illustrated in “the transporting order” in FIG. 8) can be computed. Therefore, the stowing computation unit 33 can compute the order of stowing pieces of the hand luggage (circumstances of pieces of the hand luggage 3 illustrated in “the stowing order” in FIG. 8).

Next, the stowing computation unit 33 determines whether or not there is a need to stock the hand luggage 3, which is currently present on the buffer conveyor 12, on the stock conveyor 40 (Step S220: stowing step). When the stowing computation unit 33 determines that there is a need to perform stocking, the stowing control unit 38 controls the stowing robot 15 to stock the hand luggage 3, which is on the buffer conveyor 12, on the stock conveyor 40 (Step S250: stowing step). After stocking on the stock conveyor 40 is completed, processing is executed again from Step S210.

When it is determined in Step S220 that there is no need to perform stocking, the stowing computation unit 33 determines whether or not there is a need to take out the hand luggage 3 which has been stocked on the stock conveyor 40 (Step S230: stowing step). When the stowing computation unit 33 determines in Step S230 that there is no need to take out the hand luggage 3 from the stock conveyor 40, the stowing control unit 38 controls the stowing robot 15 and stows the hand luggage 3 present on the buffer conveyor 12 in the container 2 (Step S240: stowing step).

When the stowing computation unit 33 determines in Step S230 that there is a need to take out the hand luggage 3 from the stock conveyor 40, the stowing control unit 38 controls the stowing robot 15 and stows the hand luggage 3 stocked on the stock conveyor 40 in the container 2 (Step S260: stowing step). After the processing of Steps S240 and S260 ends, the processing is executed again from Step S210.

Figure 11A:
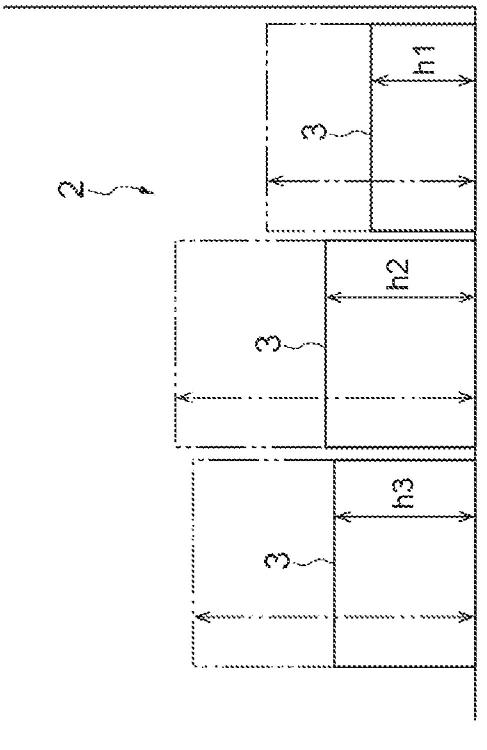
FIG. 11(*a*) and FIG. 11(*b*) are explanatory conceptual diagrams of heights of pieces of the hand luggage.
Figure 11B:
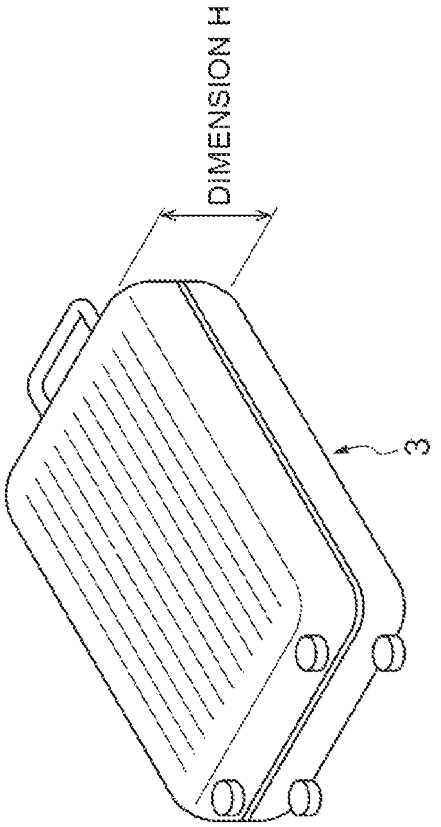

In the second adjustment logic, the stowing control unit 38 adjusts the stowing order such that the height difference between a plurality of pieces of the hand luggage 3 constituting the same stage inside the containers 2 becomes equal to or smaller than a predetermined threshold. For example, as illustrated in FIG. 11(*a*), when there is a difference between the heights of pieces of the hand luggage 3, a step is formed between upper surfaces of pieces of the hand luggage 3. In the first stage or the second stage, when there is a large height difference between pieces of the hand luggage 3, they are likely to collapse when pieces of the hand luggage 3 are further stacked thereon. Therefore, on a lower stage side such as the first stage or the second stage, there is a need to restrict the height difference between pieces of the hand luggage 3. The height dimension of the hand luggage 3 is expressed as “a dimension H” illustrated in FIG. 11(*b*).

Here, a height variable is defined as “height variable: h(max)−h(min)”. The factor h(max) is the highest height in the same stage. The factor h(min) is the lowest height in the same stage. In FIG. 11(*a*), “h2” corresponds to h(max), and “h1” corresponds to h(min). A predetermined threshold is set with respect to the height variable. Regarding the threshold, for example, 20 mm is set as an initial value. The threshold may be suitably changed in accordance with the circumstances. For example, when it is desired to more strictly curb collapse of pieces of the luggage, the threshold may be set to 15 mm or the like. The height variable is set based on the height dimension of the hand luggage 3 itself in the first stage and is set based on the stacking height of pieces of the hand luggage 3 (the height of two pieces of the hand luggage 3) from the container floor in the second stage. In FIG. 11(*a*), the hand luggage 3 in the second stage is indicated by an imaginary line, the height dimension of the hand luggage 3 in the second stage, that is, the total height dimension of the hand luggage 3 in the first stage and the hand luggage in the second stage are indicated by an arrow of an imaginary line. The second adjustment logic need only be applied to stowing in at least the first stage, and it may be applied to the third stage or higher without being applied to the second stage. However, since an effect of curbing collapse of pieces of the hand luggage 3 increases by reducing the difference between the heights in the first stage and the second stage, it is preferable to apply the second adjustment logic to the first stage and the second stage.

For example, when a new hand luggage 3 present on the buffer conveyor 12 is stowed as a second hand luggage 3 (height dimension h2), the stowing computation unit 33 computes a height variable with respect to a first hand luggage 3 (having a height dimension of h1) and determines whether the height variable is equal to or smaller than the threshold. When the height variable is equal to or smaller than the threshold, the stowing control unit 38 stows the hand luggage 3 on the buffer conveyor 12 in the container 2 as the second hand luggage 3. On the other hand, when the height variable is larger than the threshold, the stowing control unit 38 temporarily stocks the hand luggage 3, which is on the buffer conveyor 12, on the stock conveyor 40.

Figure 12:
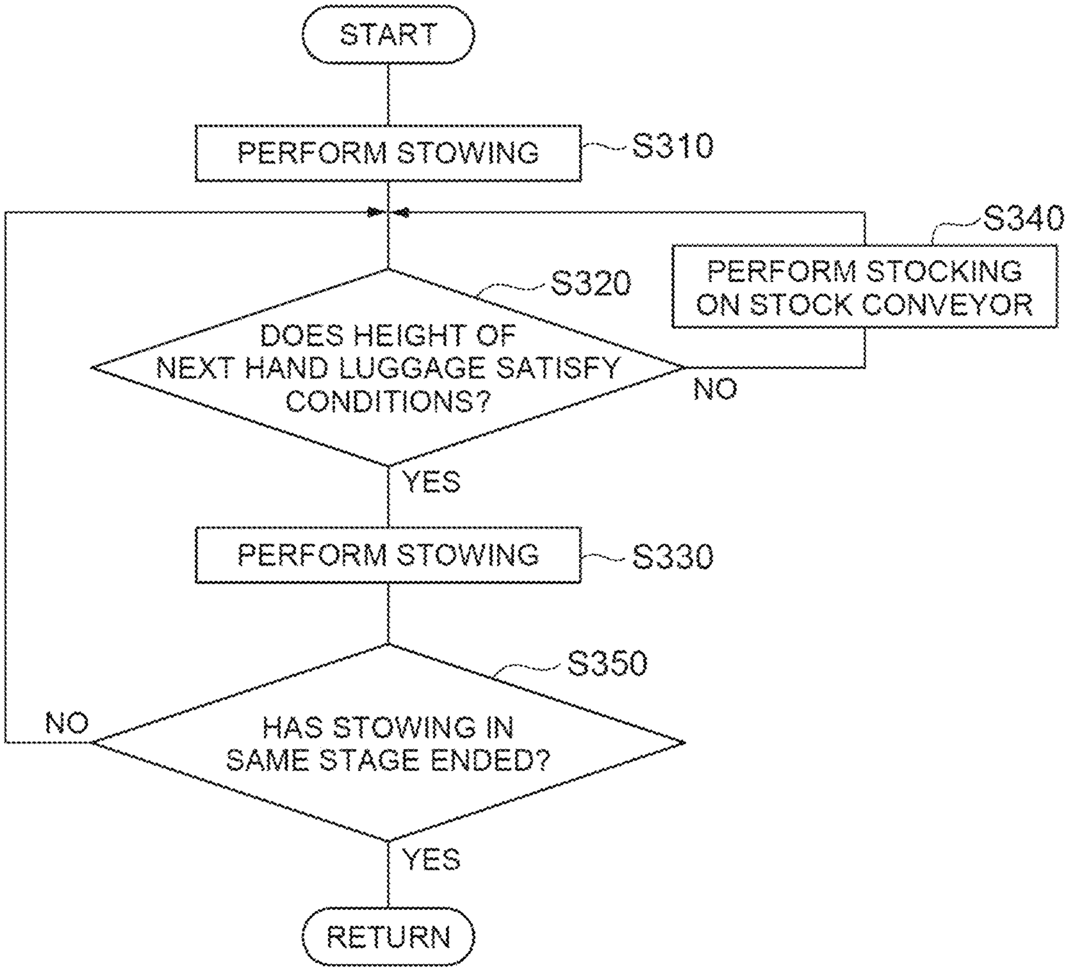
FIG. 12 is a flowchart showing a second adjustment logic.

FIG. 12 is a flowchart of the second adjustment logic. Here, as illustrated in FIG. 11(*a*), details of processing when the hand luggage 3 is stowed in the first stage will be described. First, the stowing control unit 38 controls the stowing robot 15 such that the first hand luggage 3 is stowed with respect to the first stage in the container 2 (Step S310: stowing step). At this time, the hand luggage 3 in the transportation unit advances to the downstream side by a distance corresponding to one piece thereof, and a new hand luggage 3 is disposed on the buffer conveyor 12.

Next, the stowing computation unit 33 detects the luggage information of a next hand luggage 3 (a hand luggage 3 newly disposed on the buffer conveyor 12) from the hand luggage detection units 28 and 29 and determines whether or not the height of the hand luggage 3 satisfies conditions (Step S320: luggage information detecting step, stowing step). The stowing computation unit 33 determines whether or not the height variable is included within a range equal to or smaller than the threshold when a new hand luggage 3 is input to the container 2 and determines that the conditions are satisfied when the height variable becomes equal to or smaller than the threshold.

When the stowing computation unit 33 determines in Step S320 that the conditions are not satisfied, the stowing control unit 38 controls the stowing robot 15 such that the hand luggage 3 on the buffer conveyor 12 is stocked on the stock conveyor 40 (Step S340: stowing step). Further, the processing is repeated from Step S320. On the other hand, when the stowing computation unit 33 determines in Step S320 that the conditions are satisfied, the stowing control unit 38 controls the stowing robot 15 such that the hand luggage 3 on the buffer conveyor 12 is stowed in the container 2 (Step S330: stowing step).

After Step S330, the stowing computation unit 33 determines whether or not stowing in the same stage has ended (Step S350: stowing step). In Step S350, when it is determined that stowing in the same stage has not ended, the processing is repeated from Step S320. In Step S350, when it is determined that stowing in the same stage has ended, the processing shown in FIG. 12 ends, and stowing in the next stage is performed.

When the second adjustment logic described above is performed, the stowing computation unit 33 may search for not only the hand luggage 3 present on the buffer conveyor 12 but also the hand luggage 3 satisfying the conditions of the height in consideration of all pieces of the hand luggage 3 present inside the transportation unit. In this case, the stowing control unit 38 may impart an order of priority to each of locations in the transportation unit as the third adjustment logic and may perform control such that the hand luggage 3 is taken out from a location having a higher order of priority. The order of priority is set from the higher conveyor in the order of the buffer conveyor 12, the stock conveyor 40, the luggage reception conveyor 8, the sorting conveyor 6, and the main conveyor 5 (a conveyor on the downstream side has a higher order of priority), for example.

Figure 13:
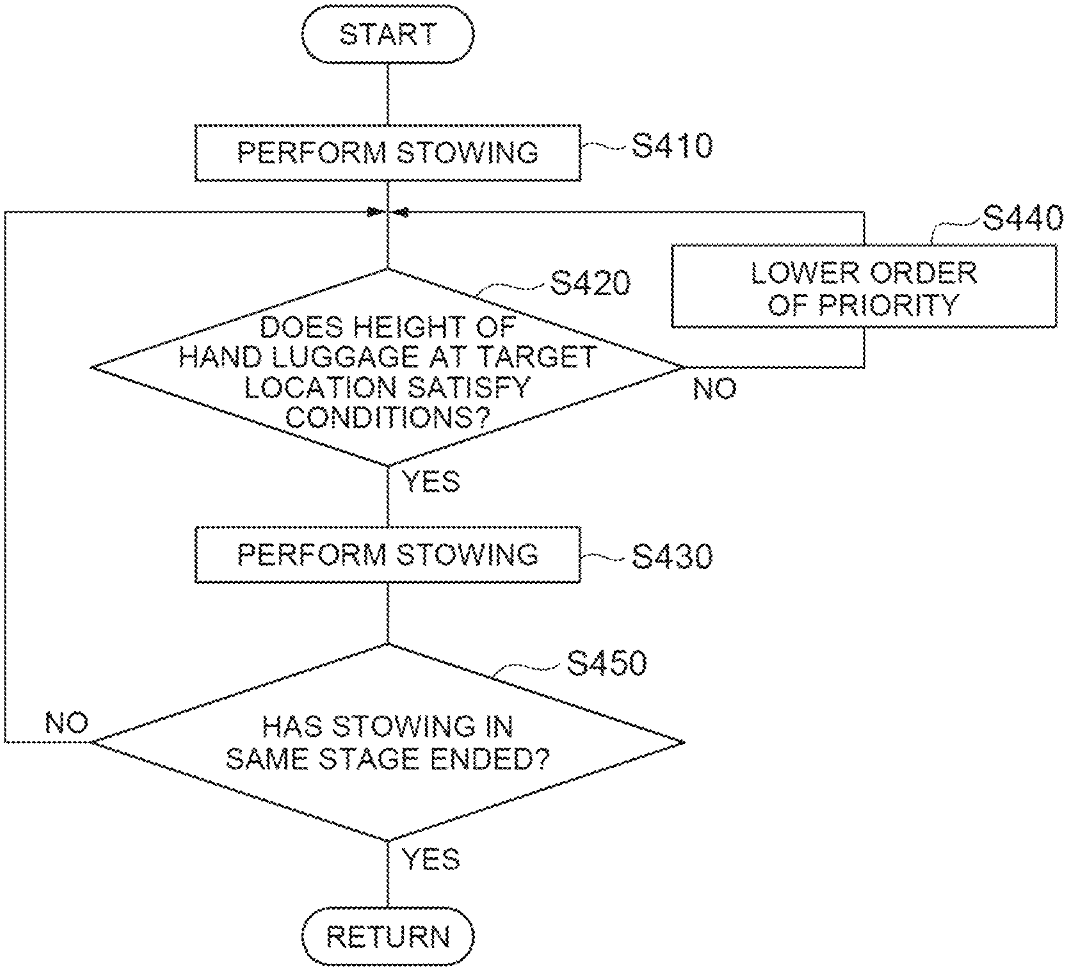
FIG. 13 is a flowchart showing a third adjustment logic.

FIG. 13 is a flowchart of the third adjustment logic. First, the stowing control unit 38 controls the stowing robot 15 such that the first hand luggage 3 is stowed with respect to the first stage in the container 2 (Step S410: stowing step). At this time, the hand luggage 3 in the transportation unit advances to the downstream side by a distance corresponding to one piece thereof, and a new hand luggage 3 is disposed on the buffer conveyor 12.

Next, the stowing computation unit 33 detects the luggage information of the hand luggage 3 at a target location from the hand luggage detection units 28 and 29 and determines whether or not the height of the hand luggage 3 satisfies the conditions (Step S420: luggage detecting step, stowing step). In Step S420 for the first time, the buffer conveyor 12 having the highest order of priority becomes the target location of determination. That is, the stowing computation unit 33 determines whether or not the height variable is included within a range equal to or smaller than the threshold when the hand luggage 3 on the buffer conveyor 12 is input to the container 2 and determines that the conditions are satisfied if the height variable becomes equal to or smaller than the threshold.

When the stowing computation unit 33 judges that the conditions are not satisfied, the stowing computation unit 33 lowers the order of priority of the target location of determination (Step S440: stowing step). Accordingly, the target location switches from the buffer conveyor 12 to the stock conveyor 40 having the second highest order of priority. Further, the processing is repeated from Step S420. When pieces of the hand luggage 3 are stored with respect to a plurality of storage units 41 of the stock conveyor 40, the order of priority with respect to the plurality of storage units 41 may not be particularly provided or may be provided.

When the stowing computation unit 33 determines that the conditions are satisfied, the stowing control unit 38 controls the stowing robot 15 such that the hand luggage 3 at the target location is stowed in the container 2 (Step S430: stowing step). For example, when the target location in Step S420 is the buffer conveyor 12, the stowing robot 15 stows the hand luggage 3 on the buffer conveyor 12 in the container 2, and when the target location is the stock conveyor 40, the stowing robot 15 stows the hand luggage 3 in any storage unit 41 of the stock conveyor 40 in the container 2.

After Step S430, the stowing computation unit 33 determines whether or not stowing in the same stage has ended (Step S450: stowing step). In Step S450, when it is determined that stowing in the same stage has not ended, the processing is repeated from Step S420. In Step S450, when it is determined that stowing in the same stage has ended, the processing shown in FIG. 13 ends, and stowing in the next stage is performed.

If Steps S320 and S340 shown in FIG. 12 are repeated, the stock conveyor 40 may become full. In addition, even if Steps S420 and S440 shown in FIG. 13 are repeated, the hand luggage 3 satisfying the conditions may not be seen inside the transportation unit. In this case, the hand luggage 3 on the buffer conveyor 12 may be stocked in the stock conveyor 40 and pieces of the hand luggage 3 in the transportation unit may be entirely moved downstream by a distance corresponding to one piece thereof, but the stock conveyor 40 may become full. For this reason, when the stock conveyor 40 is full, the stowing control unit 38 may execute the fourth adjustment logic for taking out the hand luggage 3 from the stock conveyor 40 such that the height difference between a plurality of pieces of the hand luggage 3 is minimized in the containers 2.

In the fourth adjustment logic, for example, when the height of the hand luggage 3 inside the transportation unit is excessively lower than pieces of the hand luggage 3 stacked in the first stage in the container 2, the stowing control unit 38 takes out the hand luggage 3 having the largest height dimension from a plurality of pieces of the hand luggage 3 stocked on the stock conveyor 40. When the height of the hand luggage 3 inside the transportation unit is excessively higher than pieces of the hand luggage 3 stacked in the first stage in the container 2, the stowing control unit 38 takes out the hand luggage 3 having the smallest height dimension from a plurality of pieces of the hand luggage 3 stocked on the stock conveyor 40. When the fourth adjustment logic is executed, the processing may return to the second adjustment logic or the third adjustment logic at the point of time when there is an empty space at one location in the stock conveyor 40. In addition, the fourth adjustment logic may be continued until there is an empty space in the stock conveyor 40 to a certain extent.

Next, the fifth adjustment logic will be described. The stowing computation unit 33 can acquire the materials of all pieces of the hand luggage 3 inside the transportation unit as the luggage information from the first hand luggage detection unit 28. The stowing control unit 38 adjusts the stowing order such that pieces of the hand luggage 3 detected to have a soft material (pieces of the hand luggage 3 with a soft case) are stowed on an upper stage side. Specifically, in FIG. 9(*a*), it is possible to perform control such that pieces of the hand luggage 3 with a soft case are stacked at a position marked with "○".

For example, a soft case may be allowed to be stowed in the highest stage and the second highest stage. For example, it is assumed that the hand luggage 3 with a soft case has arrived at the buffer conveyor 12 when the stowing robot 15 is performing stacking in a stage on a lower stage side inside the container 2. In this case, the stowing control unit 38 stocks the hand luggage 3 with a soft case on the stock conveyor 40, and when stacking starts in a stage on an upper stage side, it takes out the hand luggage 3 with a soft case from the stock conveyor 40 and stows the hand luggage on the upper stage side in the container 2. Control may be performed such that the hand luggage 3 with a soft case is stacked in only the highest stage.

In the luggage stowing device 1B described above, pieces of the hand luggage 3 transported by the transportation unit are stowed in the containers 2 by the stowing robot 15. At this time, the stowing computation unit 33 and the stowing control unit 38 control the stowing robot 15 such that the stowing order of performing stowing by the stowing robot 15 is adjusted with respect to the order of transporting pieces of the hand luggage 3 transported from the transportation unit. For this reason, even if pieces of the hand luggage 3 are randomly transported regardless of the dimensions, the material, and the like, the stowing robot 15 can stow pieces of the hand luggage 3 in the containers 2 in the stowing order which has been suitably adjusted in accordance with the balance between the heights, the materials, and the like of pieces of the hand luggage 3 without being restrained by the transporting order. Therefore, regardless of the order of transporting pieces of the hand luggage 3, stowing can be performed in a state in which pieces of the hand luggage 3 are stable inside the containers 2.

In the present embodiment, the transportation unit has the stock conveyor 40 for temporarily stocking pieces of the transported hand luggage 3. The stowing computation unit 33 and the stowing control unit 38 adjust the stowing order by temporarily stocking pieces of the hand luggage 3 in the stock conveyor 40 and then stowing pieces of the hand luggage 3 stocked in the stock conveyor 40. In this manner, the stowing order is easily adjusted by temporarily stocking pieces of the hand luggage 3 in the stock conveyor 40.

In the present embodiment, the stowing computation unit 33 and the stowing control unit 38 adjust the stowing order such that the height difference between a plurality of pieces of the hand luggage 3 constituting the same stage inside the containers 2 becomes equal to or smaller than the predetermined threshold. Accordingly, since the height difference between pieces of the hand luggage 3 stacked on the lower stage side can be restricted, the height difference between pieces of the hand luggage 3 occurring on the upper stage side can be curbed, and thus collapse of pieces of the luggage can be curbed.

In the present embodiment, the stowing computation unit 33 and the stowing control unit 38 cause pieces of the hand luggage 3 to be taken out from the stock conveyor 40 such that the height difference between a plurality of pieces of the hand luggage 3 in the containers 2 is minimized when the stock conveyor 40 is full. Accordingly, while the height difference between pieces of the hand luggage 3 in the same stage is restricted, an empty space can be formed in the stock conveyor 40.

In the present embodiment, the stowing computation unit 33 and the stowing control unit 38 impart an order of priority to each of locations in the transportation unit and control the stowing robot 15 such that the hand luggage 3 is taken out from a location having a higher order of priority. In this manner, since the stowing robot 15 takes out luggage from a location having a higher order of priority, the cycle time of stowing work can be reduced.

In the present embodiment, the hand luggage detection units 28 and 29 detect materials of pieces of luggage as the luggage information. The stowing computation unit 33 and the stowing control unit 38 adjust the stowing order such that pieces of the hand luggage 3 detected to have a soft material are stowed on the upper stage side. Accordingly, stowing of pieces of the hand luggage 3 which are likely to collapse on the lower stage side is curbed, and thus occurrence of collapse of pieces of the luggage can be curbed.

In the present embodiment as well, various kinds of modifications similar to those of the first embodiment can be applied. In addition, in the present embodiment, the stock conveyor 40 is provided above the main conveyor 5, but the position of the stock conveyor 40 is not particularly limited, and it may be provided at a different position. In the present embodiment, the stowing order is adjusted using the stock conveyor 40, but the stock conveyor 40 may be omitted. For example, as described with the flowchart in FIG. 13, the stowing order may be adjusted by taking out the hand luggage 3 from each of locations in the transportation unit.

In the present embodiment, the flowchart shown in FIG. 13 has been exemplified as an example of control of taking out the hand luggage 3 from a location having a higher order of priority, but the embodiment is not limited to such details of control. For example, in a phase before pieces of the hand luggage 3 are actually stowed in the first stage (or the second stage) in the containers 2, the stowing control unit 38 may grasp the height dimensions of all pieces of the hand luggage 3 inside the transportation unit and plan a combination of pieces of the hand luggage 3 to be stowed in the first stage in advance. The control method shown in FIG. 13 and the control method for planning a combination in advance may be combined.

In control of taking out the hand luggage 3 from a location having a higher order of priority, the stowing control unit 38 may put emphasis on the order of priority of the location from which the hand luggage 3 is taken out or may put emphasis on reduction of the height difference between pieces of the hand luggage 3. For example, the stowing control unit 38 may adjust the stowing order on the basis of comprehensive evaluation by allocating predetermined evaluation points to ranks of the order of priority of the location from which the hand luggage 3 is taken out or allocating predetermined evaluation points to small height differences.

Third Embodiment

Figure 14:
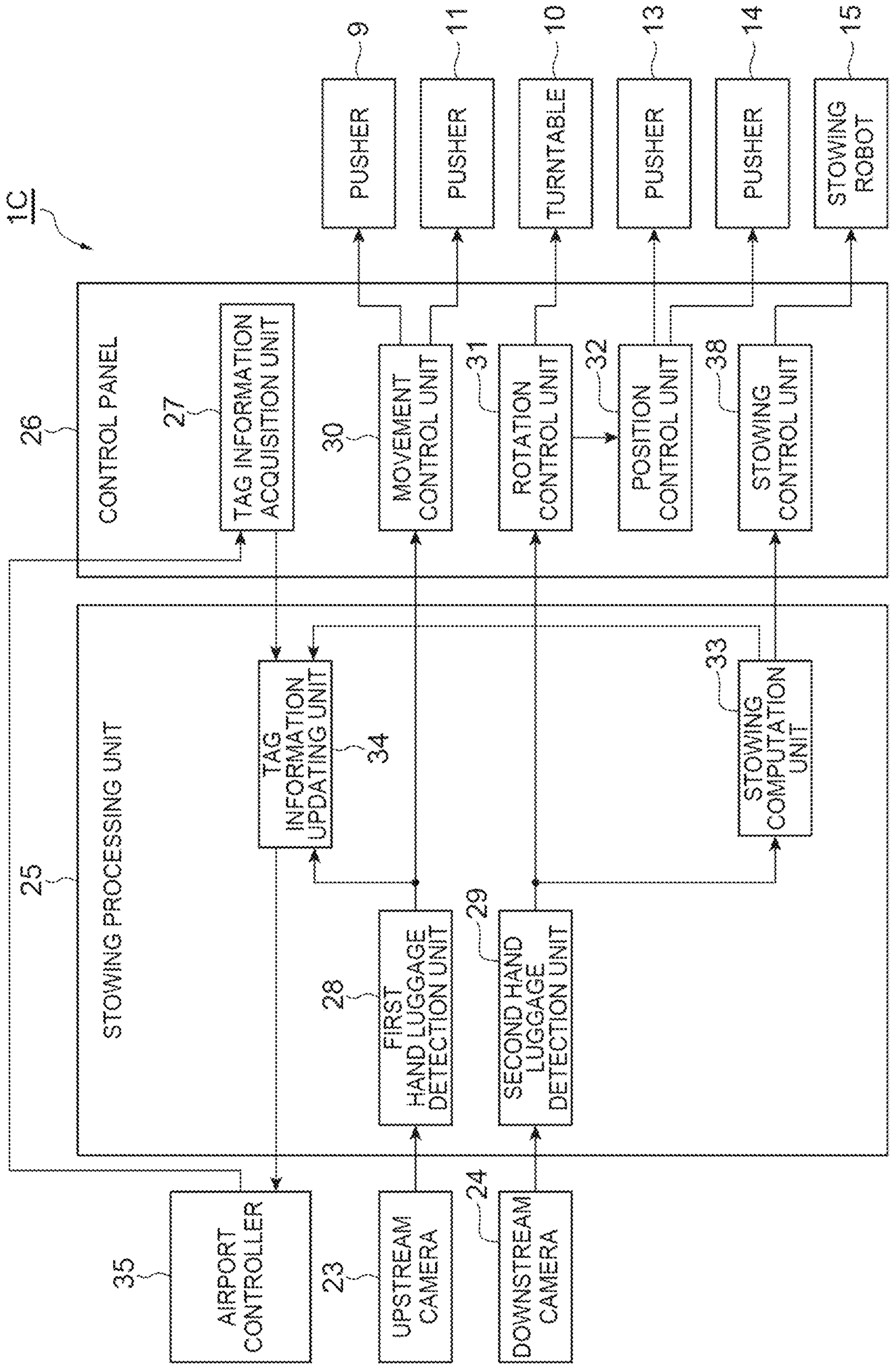
FIG. 14 is a view of a constitution of a control system of a luggage stowing device according to a third embodiment of the present disclosure.

FIG. 14 is a view of a constitution of a control system of a luggage stowing device according to a third embodiment of the present disclosure. As illustrated in FIG. 14, a luggage stowing device 1C according to the third embodiment differs from that of the first embodiment in that the control panel 26 has a tag information acquisition unit 27 and the stowing processing unit 25 has a tag information updating unit 34. Other points are similar to those of the first embodiment.

The control panel 26 is connected to an airport controller 35 which is a superordinate system. The airport controller 35 is installed in a terminal building at an airport. The airport controller 35 sends tag IDs of pieces of the hand luggage 3 to the control panel 26.

The tag information acquisition unit 27 acquires the tag IDs (tag information) of pieces of the hand luggage 3 sent from the airport controller 35. A tag ID is allocated when a boarding pass is issued at a check-in counter. Information related to a passenger, a flight number, the hand luggage 3, and the like is recorded in a tag ID.

The tag information updating unit 34 associates stowing data including a stowing position of the hand luggage 3 with a tag ID acquired by the tag information acquisition unit 27. At this time, the tag information updating unit 34 associates stowing data including an address of the stowing position of the hand luggage 3 (which will be described below) with a tag ID.

Figure 15:
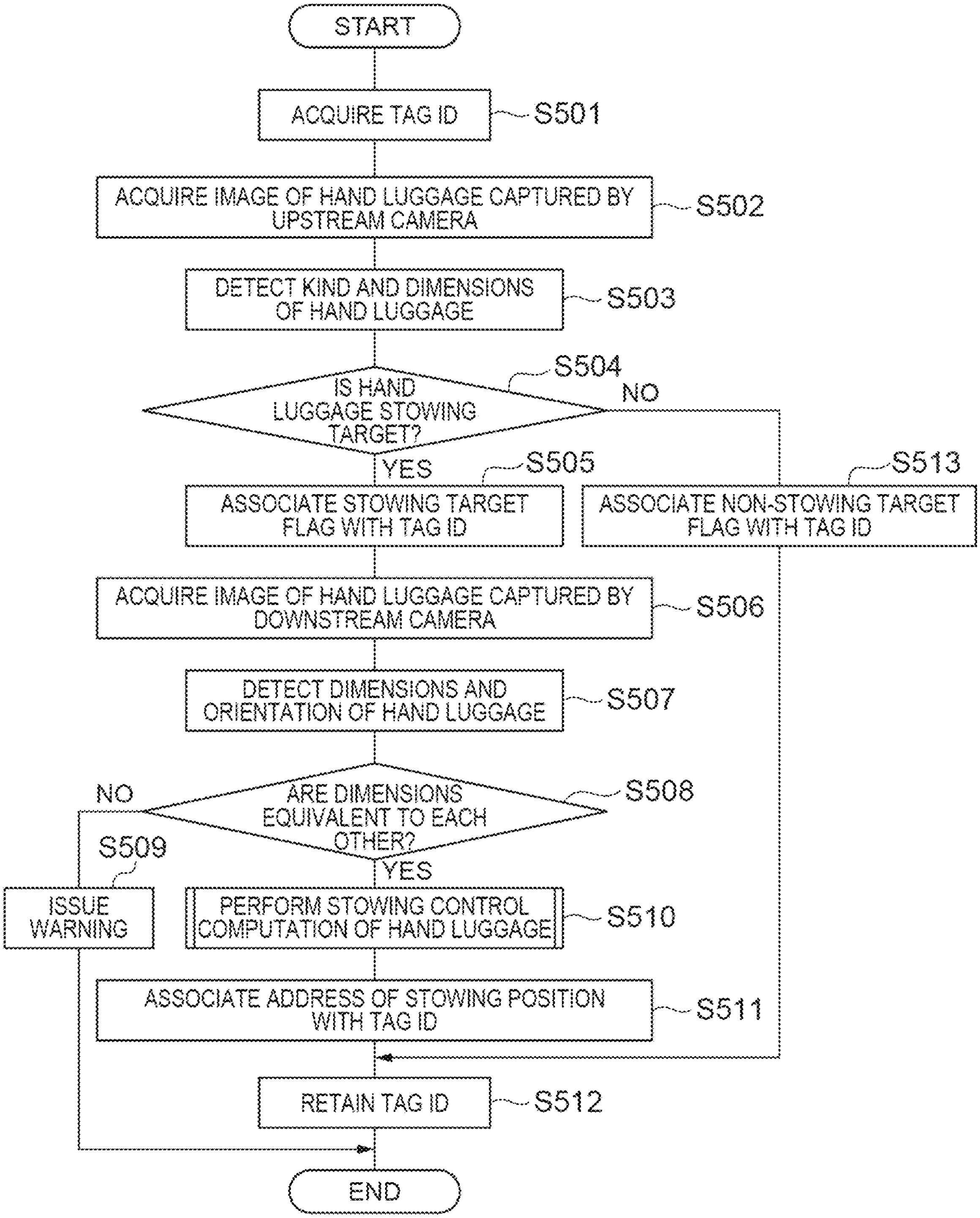
FIG. 15 is a flowchart showing details of a procedure of stowing computation processing executed by the stowing computation unit illustrated in FIG. 14.

FIG. 15 is a flowchart showing a procedure of stowing processing executed by the stowing processing unit 25. This processing shows a procedure of processing for each piece of the hand luggage 3. The stowing processing unit 25 first acquires a tag ID of the hand luggage 3 from the tag information acquisition unit 27 (Procedure S501). In addition, the stowing processing unit 25 acquires an image of the hand luggage 3 captured by the upstream camera 23 (Procedure S502). The stowing processing unit 25 detects the kind and the dimensions of the hand luggage 3 on the basis of the image of the hand luggage 3 captured by the upstream camera 23 (Procedure S503).

The stowing processing unit 25 judges whether the hand luggage 3 is a stowing target (suitcase) on the basis of the kind of the hand luggage 3 (Procedure S504). When it is judged that the hand luggage 3 is a stowing target, the stowing processing unit 25 associates a stowing target flag with the tag ID of the hand luggage 3 (Procedure S505).

Subsequently, the stowing processing unit 25 acquires an image of the hand luggage 3 captured by the downstream camera 24 (Procedure S506). The stowing processing unit 25 detects the dimensions and the orientation of the hand luggage 3 on the basis of the image of the hand luggage 3 captured by the downstream camera 24 (Procedure S507). The stowing processing unit 25 judges whether the dimensions of the hand luggage 3 are equivalent to the dimensions detected in Procedure S503 (Procedure S508). When it is judged that the dimensions of the hand luggage 3 are not equivalent thereto, the stowing processing unit 25 issues a warning (Procedure S509).

When it is judged that the dimensions of the hand luggage 3 are equivalent thereto, the stowing processing unit 25 performs stowing control computation processing of obtaining a control signal for causing the stowing robot 15 to stow the hand luggage 3 in order in the accommodation area corresponding to the dimensions of pieces of the hand luggage 3 inside the containers 2 (Procedure S510). The stowing control computation processing in Procedure S510 is similar to that of the first embodiment (refer to FIG. 5).

Subsequently, the stowing processing unit 25 associates the address of the stowing position (which will be described below) with the tag ID of the hand luggage 3 (Procedure S511). Subsequently, the stowing processing unit 25 retains the tag ID with which the stowing data including the stowing target flag and the address of the stowing position is associated in a memory (Procedure S512). At this time, the stowing processing unit 25 retains the tag ID in the memory of the stowing processing unit 25 and sends the tag ID to the airport controller 35 such that it is retained a memory of the airport controller 35.

When it is judged in Procedure S504 that the hand luggage 3 is not a stowing target, the stowing processing unit 25 associates a non-stowing target flag with the tag ID of the hand luggage 3 (Procedure S513). Subsequently, the stowing processing unit 25 retains the tag ID with which the non-stowing target flag is associated in the memory (Procedure S512).

In the above, the first hand luggage detection unit 28 executes Procedures S502 and S503. The second hand luggage detection unit 29 executes Procedures S506 and S507. The stowing computation unit 33 executes Procedure S510. The tag information updating unit 34 executes Procedures S501, S504, S505, and S511 to S513.

In the luggage stowing device 1C, the tag ID of the hand luggage 3, which has been allocated when a boarding pass is issued, is sent from the airport controller 35 to the control panel 26, and the hand luggage 3 is transported by the airport side conveyor 16. The hand luggage 3 is delivered from the airport side conveyor 16 to the main conveyor 5, and the hand luggage 3 is transported toward the container 2 by the main conveyor 5.

If the hand luggage 3 is delivered to the main conveyor 5, an image of the hand luggage 3 placed on the progressive conveyor 17 of the main conveyor 5 on the furthest upstream side is captured by the upstream camera 23. A captured image of the hand luggage 3 acquired by the upstream camera 23 is sent to the stowing processing unit 25, and the kind and the dimensions of the hand luggage 3 are detected on the basis of the captured image of the hand luggage 3. At this time, the tag ID of the hand luggage 3 is subjected to tracking in the stowing processing unit 25.

When the hand luggage 3 is a stowing target, the hand luggage 3 (stowing target) moves from the sorting conveyor 6 to the luggage reception conveyor 8 by the pusher 9, and the hand luggage 3 (stowing target) further moves from the luggage reception conveyor 8 to the turntable 10 by the pusher 11. When the hand luggage 3 is not a stowing target, the hand luggage 3 (not a stowing target) moves from the sorting conveyor 6 to the withdrawal conveyor 7.

An image of the hand luggage 3 (stowing target) placed on the turntable 10 is captured by the downstream camera 24. The captured image of the hand luggage 3 acquired by the downstream camera 24 is sent to the stowing processing unit 25, and the dimensions and the orientation of the hand luggage 3 are detected on the basis of the captured image of the hand luggage 3. At this time, the tag ID of the hand luggage 3 is subjected to tracking in the stowing processing unit 25 together with the data of the kind and the dimensions of the hand luggage 3.

When the dimensions of the hand luggage 3 detected from an image captured by the downstream camera 24 are equivalent to the dimensions of the hand luggage 3 detected from an image captured by the upstream camera 23, the turntable 10 rotates such that the handle 3*a* of the hand luggage 3 (stowing target) faces the buffer conveyor 12 side. Further, the hand luggage 3 (stowing target) moves from the turntable 10 to the buffer conveyor 12 by the pusher 13. When the hand luggage 3 (stowing target) is pushed against the wall portion 18 by the pusher 14, the hand luggage 3 is positionally set with respect to the container 2 side in the Y axis direction.

Next, the hand luggage 3 (stowing target) is stowed into the container 2 by the stowing robot 15. Specifically, when the robot arm 20 moves in the three axes directions and turns around three axes in a state in which the hand luggage 3 placed on the buffer conveyor 12 is held by the robot hand 22, the hand luggage 3 is stowed in the accommodation area corresponding to the dimensions of pieces of the hand luggage 3 inside the containers 2.

At this time, pieces of the large-sized hand luggage 3A are first stowed in a far side accommodation area S1 and an auxiliary accommodation area S3 in the preceding container 2A in the order of address and are subsequently stowed in a near side accommodation area S2 in the following container 2B in the order of address. Pieces of the medium-sized hand luggage 3B are first stowed in the far side accommodation area S1 in the following container 2B in the order of address and are subsequently stowed in the near side accommodation area S2 in the preceding container 2A in the order of address. Pieces of the small-sized hand luggage 3C are stowed in the auxiliary accommodation area S3 in the preceding container 2A and the following container 2B in the order of address.

When the hand luggage 3 is stowed in the preceding container 2A, the traveling carriage 19 remains stopping at a position in front of the preceding container 2A (refer to FIG. 1). When the hand luggage 3 is stowed in the following container 2B, in a state in which the hand luggage 3 is held by the robot hand 22, the traveling carriage 19 travels to a position in front of the following container 2B along the rails 21. The hand luggage 3 is stowed into the container 2 in a state in which the handle 3*a* faces the near side in the container 2. A stowing motion of the hand luggage 3 is performed by the stowing robot 15 in a state in which the tag ID of the hand luggage 3 is succeeded. The stowing data including the stowing position of the hand luggage 3 is associated with the tag ID of the hand luggage 3 of which stowing has been completed. The tag ID, with which the stowing data is associated, is retained in the stowing processing unit 25 and the memory of the airport controller 35.

In the luggage stowing device 1C described above, since the tag IDs of pieces of the hand luggage 3 are acquired when pieces of the hand luggage 3 are transported toward the containers 2 by the main conveyor 5, there is no need for a worker to read the tag IDs using a barcode reader or the like before pieces of the hand luggage 3 are stowed in the containers 2. In addition, since the stowing data including the stowing positions pieces of the hand luggage 3 is associated with the tag IDs, there is no need to for a worker to attach a tag sticker onto a container list, for example, after pieces of the hand luggage 3 are stowed in the containers 2. Therefore, manual work of a worker is reduced. For example, since occurrence of work mistakes of a worker, such as stowing of the hand luggage 3 in a different container 2, is curbed due to reduction of manual work, reliability related to stowing of pieces of the hand luggage 3 in the containers 2 is improved.

In the present embodiment, the stowing data including the address of the stowing position of the hand luggage 3 inside the container 2 is associated with the tag ID of the hand luggage 3. Therefore, it is easy to ascertain the position where the hand luggage 3 has been stowed inside the container 2 from the tag ID of the hand luggage 3. For this reason, for example, it is possible to easily investigate the cause when the hand luggage 3 is damaged or track the hand luggage 3 when it is missing. In addition, a passenger can be immediately informed of the location of the hand luggage 3. Moreover, when unloading work of pieces the hand luggage 3 is performed, the tag IDs can be utilized as prior data.

In the present embodiment as well, various kinds of modifications similar to those of the first embodiment can be applied. In addition, in the present embodiment, the control panel 26 has the tag information acquisition unit 27, the movement control unit 30, the rotation control unit 31, the position control unit 32, and the stowing control unit 38, but the embodiment is not particularly limited to such a form. For example, when the control panel 26 is not installed therein, the tag information acquisition unit 27, the movement control unit 30, the rotation control unit 31, the position control unit 32, and the stowing control unit 38 may be provided in the stowing processing unit 25.

Fourth Embodiment

A fourth embodiment of the present disclosure will be described. A luggage stowing device 1D (refer to FIG. 19) according to the fourth embodiment differs from that of the first embodiment in constitution of the robot hand 22. Other points are similar to those of the first embodiment.

Figure 16:
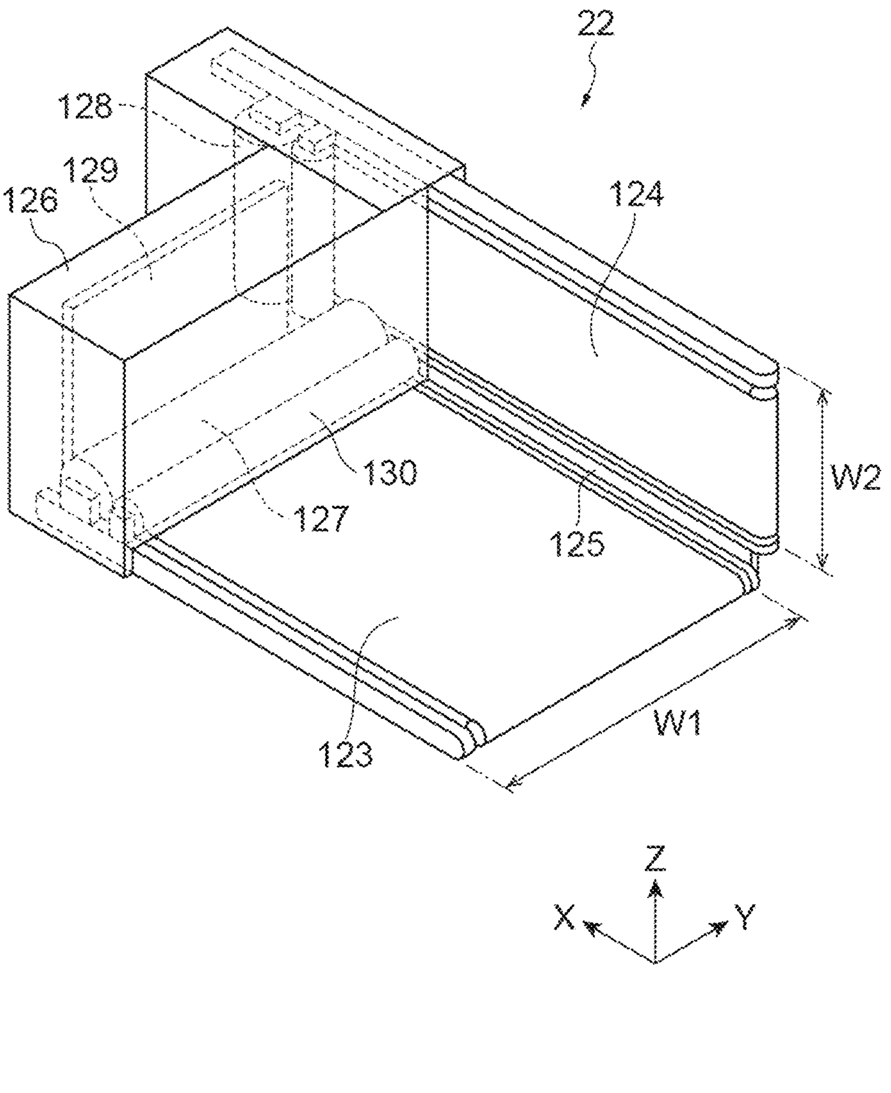
FIG. 16 is a perspective view illustrating an appearance of a robot hand applied to a luggage stowing device according to a fourth embodiment of the present disclosure.

FIG. 16 is a perspective view illustrating an appearance of a robot hand. As illustrated in FIG. 16, the robot hand 22 has a first conveyor unit 123, and a second conveyor unit 124 disposed in an L-shape with respect to this first conveyor unit 123. The second conveyor unit 124 vertically stands in one side edge portion of the first conveyor unit 123 in the width direction with a coupling portion 125 therebetween. The first conveyor unit 123 and the second conveyor unit 124 are provided in an L-shape when viewed from the front surface side of the robot hand 22. Thin conveyors are used as the first conveyor unit 123 and the second conveyor unit 124.

The first conveyor unit 123 is a horizontal placement conveyor unit on which the hand luggage 3 is placed and which moves the hand luggage 3. The first conveyor unit 123 engages with a main surface 3*a* of the hand luggage 3. The second conveyor unit 124 is a vertical placement conveyor unit on which the hand luggage 3 is placed and which moves the hand luggage 3. The second conveyor unit 124 engages with a side surface 3*d* of the hand luggage 3.

A width dimension W1 of the first conveyor unit 123 is larger than a width dimension W2 of the second conveyor unit 124. For example, the width dimension W1 of the first conveyor unit 123 is smaller than lateral dimensions of pieces of the large-sized hand luggage 3A. For example, the width dimension W2 of the second conveyor unit 124 is smaller than vertical dimensions of pieces of the large-sized hand luggage 3A. Accordingly, the robot hand 22 can be made compact.

An accommodation case 126 is provided in a base end portion of the robot hand 22. The base end portion of the robot hand 22 is an end portion in the robot hand 22 on the robot arm 20 (refer to FIG. 1) side. The accommodation case 126 is provided across the first conveyor unit 123 and the second conveyor unit 124.

The accommodation case 126 internally accommodates a motor roller 127 for driving the first conveyor unit 123, a motor roller 128 for driving the second conveyor unit 124, and a control board 129 controlling the first conveyor unit 123 and the second conveyor unit 124 by controlling the motor rollers 127 and 128.

The accommodation case 126 has a wall portion 130 for positionally setting the hand luggage 3 in a drive direction (longitudinal direction) of the first conveyor unit 123 and the second conveyor unit 124 with respect to the first conveyor unit 123 and the second conveyor unit 124. The wall portion 130 is provided on a base end side of the robot hand 22.

Figure 17A:
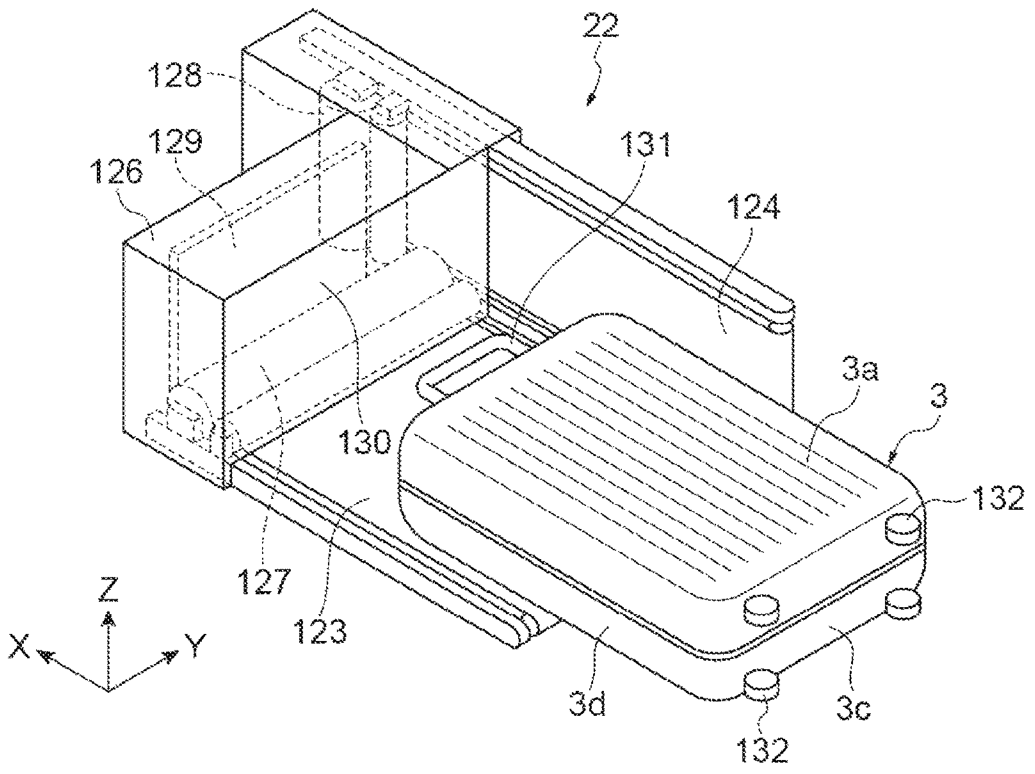
FIG. 17(*a*) and FIG. 17(*b*) are perspective views illustrating a situation in which the hand luggage is held in a horizontal placement state and a vertical placement state by the robot hand illustrated in FIG. 16.
Figure 17B:
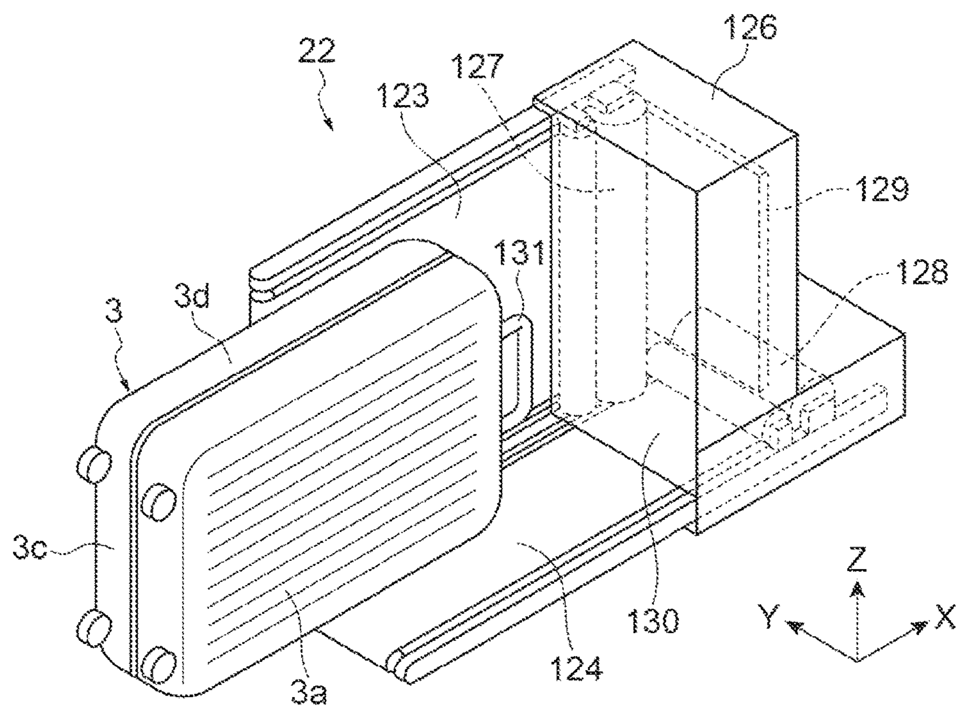

When the hand luggage 3 is held by the robot hand 22, as illustrated in FIG. 17(*a*), the hand luggage 3 is horizontally placed on the first conveyor unit 123. A state in which the hand luggage 3 is horizontally placed denotes a state in which two main surfaces 3*a* of the hand luggage 3 are positioned on upper and lower sides. At this time, the hand luggage 3 is placed on the first conveyor unit 123 such that a handle 131 faces the wall portion 130 side.

When the hand luggage 3 held by the robot hand 22 is stowed into the container 2, as illustrated in FIG. 17(*a*), the hand luggage 3 is horizontally placed on the first conveyor unit 123. Alternatively, as illustrated in FIG. 17(*b*), the hand luggage 3 is vertically placed on the second conveyor unit 124. A state in which the hand luggage 3 is vertically placed denotes a state in which two side surfaces 3*d* of the hand luggage 3 are positioned on upper and lower sides. At this time as well, the hand luggage 3 is placed on the second conveyor unit 124 such that the handle 131 faces the wall portion 130 side.

Figure 18A:
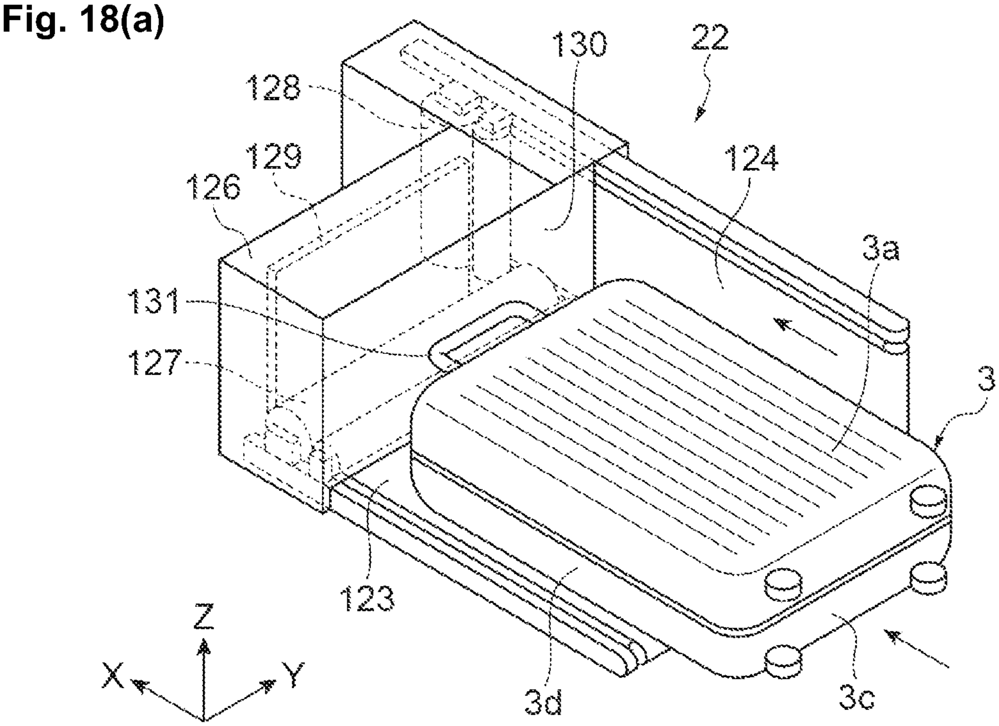
FIG. 18(*a*) and FIG. 18(*b*) are perspective views illustrating drive directions of a first conveyor unit and a second conveyor unit illustrated in FIG. 2.
Figure 18B:
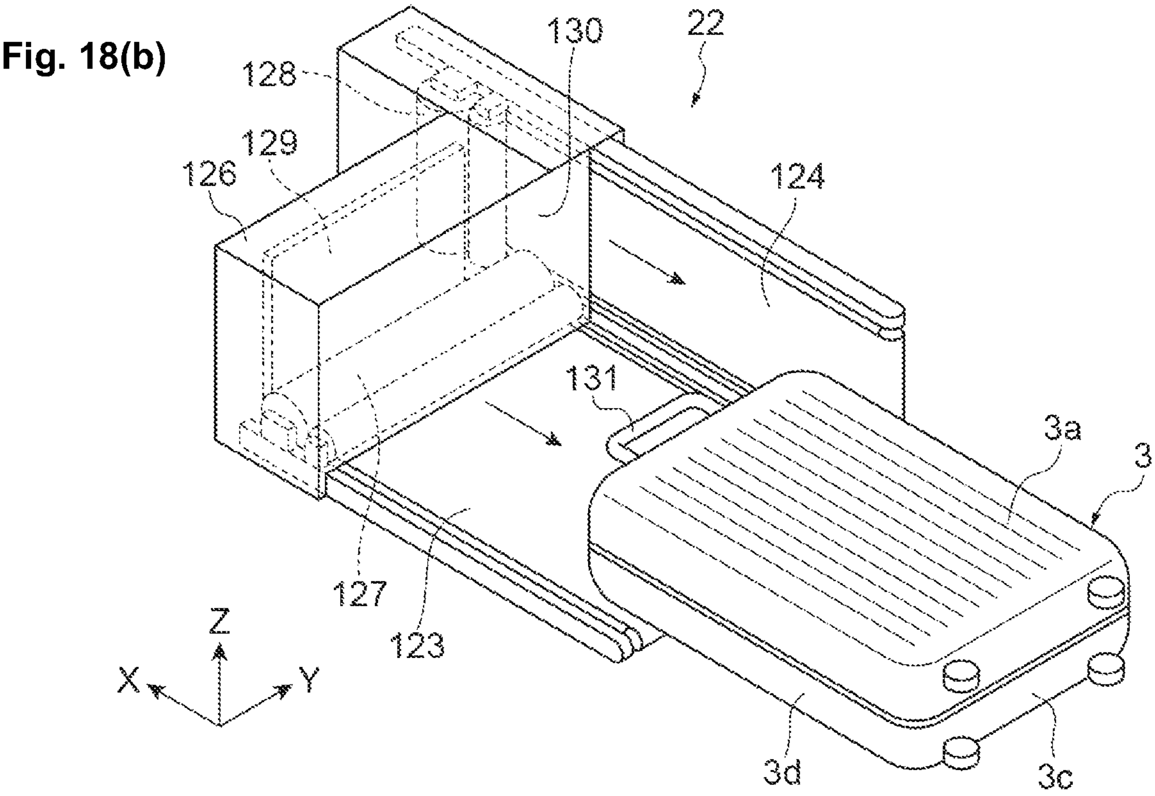

When the hand luggage 3 is held by the robot hand 22, as illustrated in FIG. 18(*a*), the first conveyor unit 123 and the second conveyor unit 124 are driven to the wall portion 130 side (the base end side of the robot hand 22). In this case, the hand luggage 3 moves toward the wall portion 130.

When the hand luggage 3 held by the robot hand 22 is stowed into the container 2, as illustrated in FIG. 18(*b*), the first conveyor unit 123 and the second conveyor unit 124 are driven to a side opposite to the wall portion 130 (the tip side of the robot hand 22). Namely, when the hand luggage 3 is stowed into the container 2, they are driven in a direction opposite to that when the hand luggage 3 is held by the robot hand 22. In this case, the hand luggage 3 moves away from the wall portion 130.

Figure 19:
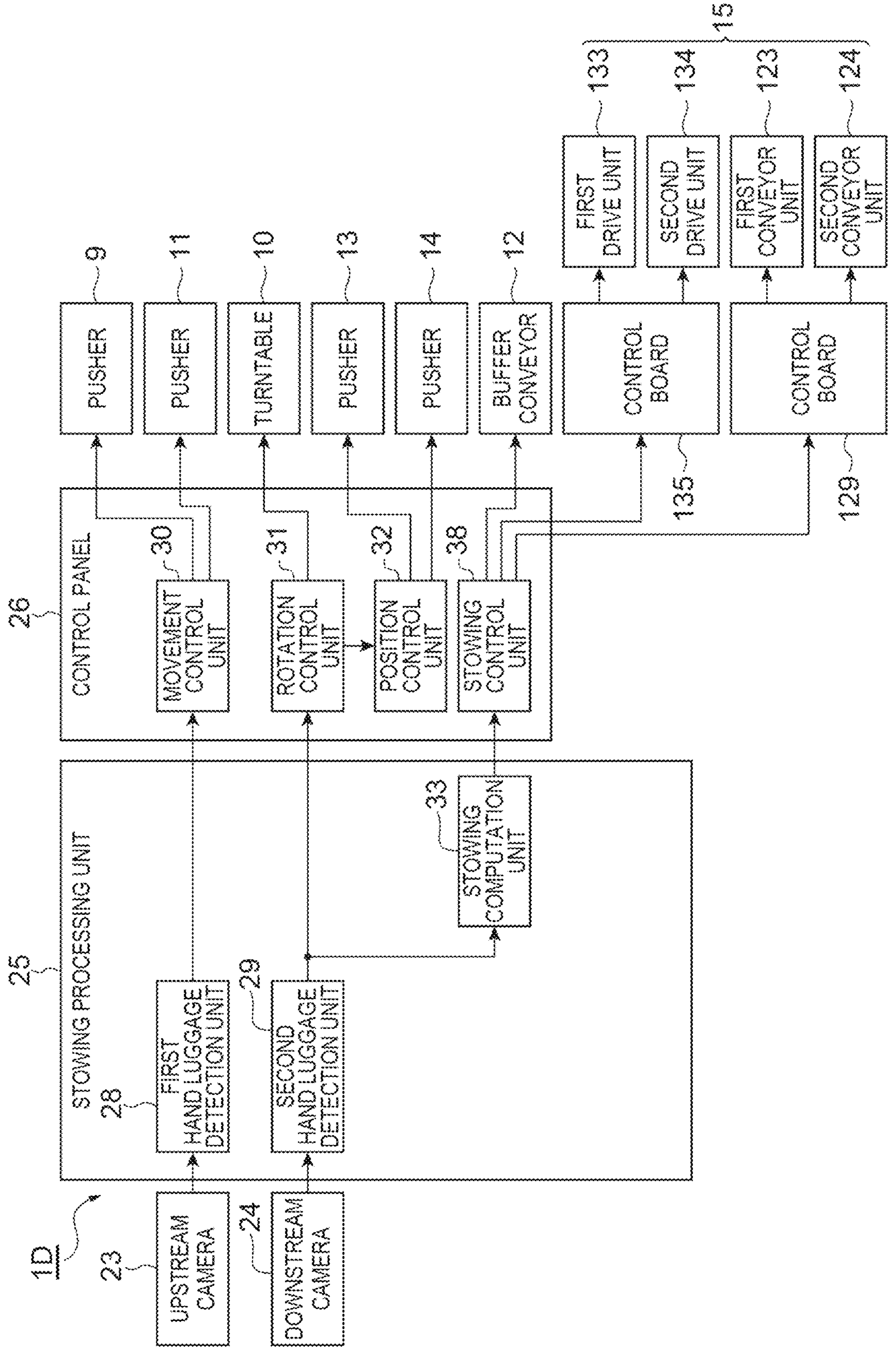
FIG. 19 is a view of a constitution of a control system of the luggage stowing device according to the fourth embodiment of the present disclosure.

The stowing robot 15 has a first drive unit 133, a second drive unit 134, and a control board 135 (refer to FIG. 19). The first drive unit 133 is a drive unit for moving the robot hand 22 in the three axes directions (the X axis direction, the Y axis direction, and the Z axis direction). The second drive unit 134 is a drive unit for turning the robot hand 22 around three axes (around the X axis, the Y axis, and the Z axis). The control board 135 controls the first drive unit 133 and the second drive unit 134.

The X axis, the Y axis, and the Z axis are expressed by a robot coordinate system having a prescribed position in the stowing robot 15 as an origin. For example, a prescribed position is a base end position in the robot arm 20. The X axis direction corresponds to a forward-rearward direction of the stowing robot 15. The front side of the stowing robot 15 is a side facing the robot arm 20. The Y axis direction corresponds to the lateral direction of the stowing robot 15. The Z axis direction corresponds to the vertical direction (height direction) of the stowing robot 15.

FIG. 19 is a view of a constitution of a control system of the luggage stowing device 1D. As illustrated in FIG. 19, the constituent elements of the control system in the luggage stowing device 1C are similar to those of the first embodiment. The stowing control unit 38 drives the buffer conveyor 12 in response to a control signal from the stowing computation unit 33 of the stowing processing unit 25. In addition, the stowing control unit 38 controls the first conveyor unit 123, the second conveyor unit 124, the first drive unit 133, and the second drive unit 134 via the control boards 129 and 135.

The stowing computation unit 33 of the stowing processing unit 25 and the stowing control unit 38 of the control panel 26 execute first control processing of controlling the buffer conveyor 12, the first conveyor unit 123, the second conveyor unit 124, and the second drive unit 134 such that the hand luggage 3 is held by the robot hand 22. The stowing computation unit 33 and the stowing control unit 38 execute second control processing of controlling the first drive unit 133 such that the robot hand 22 moves into the container 2 after the first control processing is executed.

After the second control processing is executed, the stowing computation unit 33 and the stowing control unit 38 execute third control processing of controlling the first conveyor unit 123, the second conveyor unit 124, and the second drive unit 134 such that the hand luggage 3 held by the robot hand 22 is stowed into the container 2. The stowing computation unit 33 and the stowing control unit 38 constitute a control unit executing the first control processing, the second control processing, and the third control processing in cooperation with the control boards 129 and 135.

Figure 20:
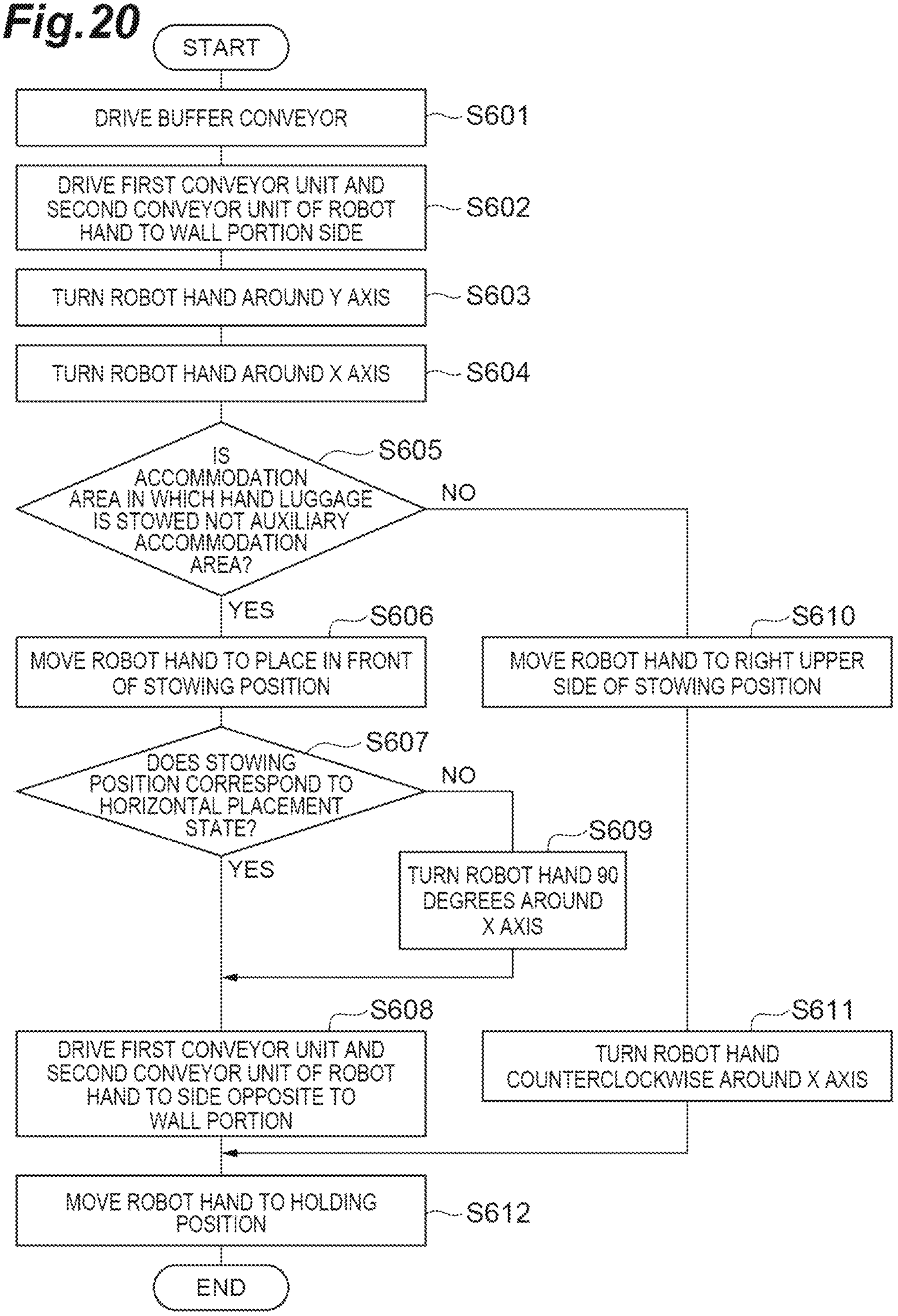
FIG. 20 is a flowchart showing details of a procedure of stowing computation processing executed by the stowing computation unit illustrated in FIG. 19.

FIG. 20 is a flowchart showing details of a procedure of stowing computation processing executed by the stowing computation unit 33. This processing shows a procedure of computation processing for each piece of the hand luggage 3.

When this processing is executed, the robot hand 22 of the stowing robot 15 is at a holding position where the hand luggage 3 placed on the buffer conveyor 12 is held. The holding position is a position where the hand luggage 3 can be delivered from the buffer conveyor 12 to the first conveyor unit 123 of the robot hand 22 on the downstream side of the buffer conveyor 12. At this time, the first conveyor unit 123 may be disposed in a manner of tilting such that it is slightly inclined toward the wall portion 130 side.

While being at the holding position, the robot hand 22 is in an initial state in which the hand luggage 3 can be received from the buffer conveyor 12. In addition, the first conveyor unit 123 and the second conveyor unit 124 of the robot hand 22 are in a standstill state.

In FIG. 20, the stowing computation unit 33 first sends a control signal to the stowing control unit 38 such that the buffer conveyor 12 is driven for a prescribed time (Procedure S601). In addition, the stowing computation unit 33 sends a control signal to the stowing control unit 38 such that the first conveyor unit 123 and the second conveyor unit 124 are simultaneously driven to the wall portion 130 side for a prescribed time (Procedure S602). Accordingly, since the buffer conveyor 12 is driven and the first conveyor unit 123 and the second conveyor unit 124 are driven to the wall portion 130 side, the hand luggage 3 is transferred from the buffer conveyor 12 to the first conveyor unit 123.

Figure 21:
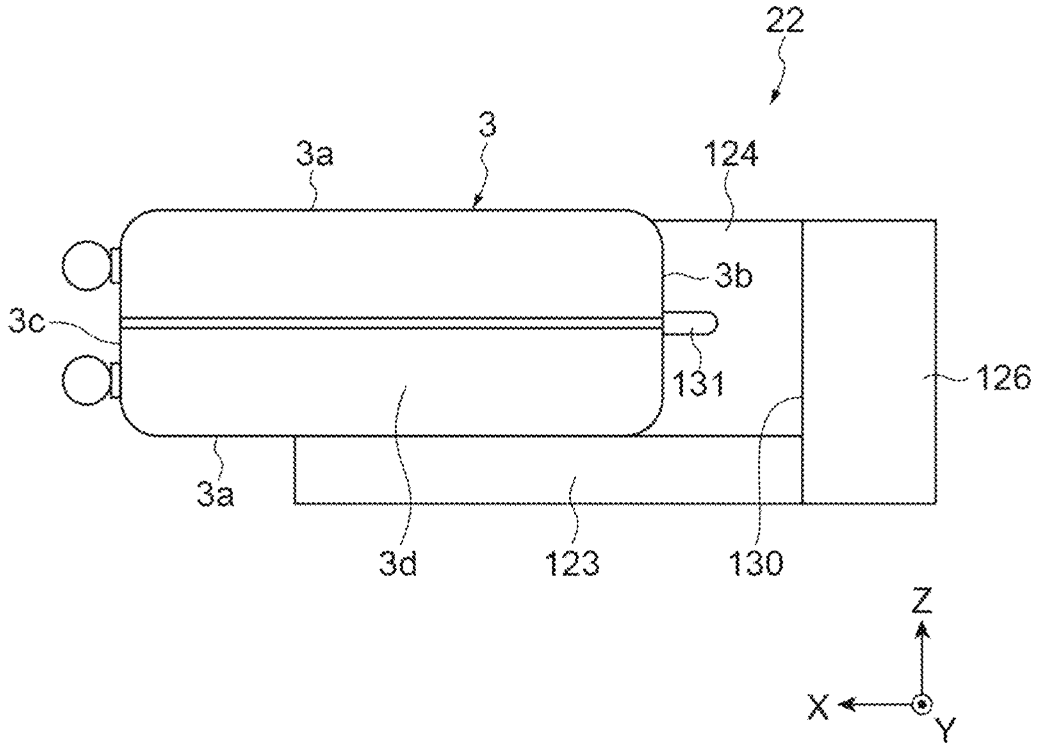
FIG. 21 is a side view illustrating a situation in which the hand luggage held by the robot hand is positionally set with respect to the first conveyor unit and the second conveyor unit by a wall portion.
Figure 21:
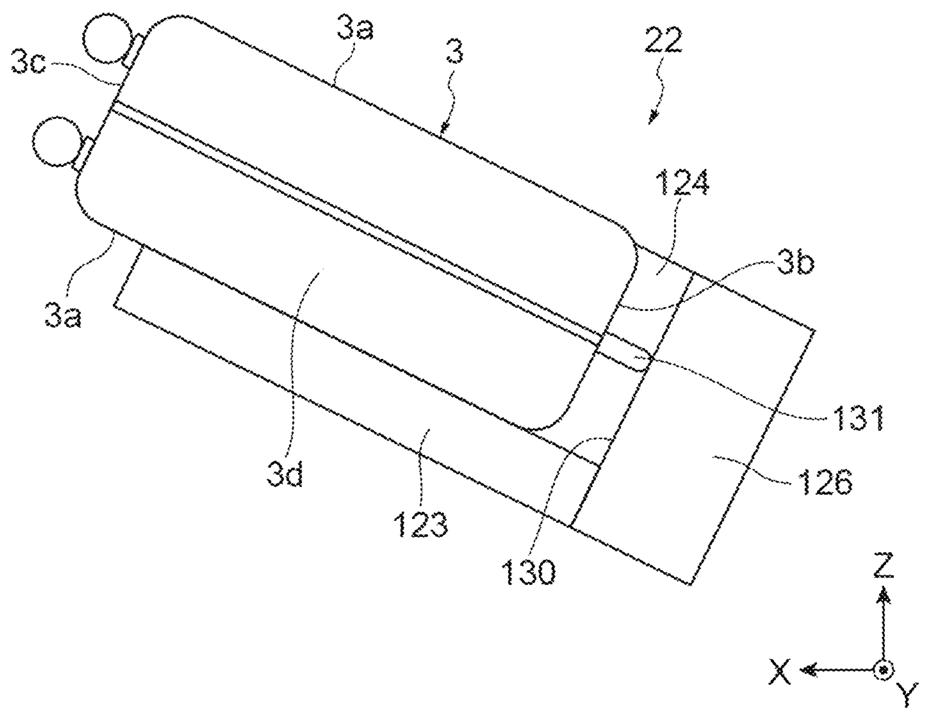

Subsequently, as illustrated in FIG. 21, the stowing computation unit 33 sends a control signal to the stowing control unit 38 such that the robot hand 22 is turned around the Y axis in a state in which the wall portion 130 is positioned on the lower side (Procedure S603). Accordingly, the robot hand 22 turns around the Y axis, and the robot hand 22 is in a tilt state such that the wall portion 130 is positioned on the lower side.

The stowing computation unit 33 sends a control signal to the stowing control unit 38 such that the robot hand 22 is turned around the X axis in a state in which the hand luggage 3 placed on the first conveyor unit 123 hits the second conveyor unit 124 (Procedure S604). Accordingly, the robot hand 22 turns around the X axis, and the hand luggage 3 hits the second conveyor unit 124.

Next, the stowing computation unit 33 judges whether the accommodation area in which the hand luggage 3 is stowed is not the auxiliary accommodation area Sa3 in the preceding container 2A and the auxiliary accommodation area Sb3 in the following container 2B (Procedure S605). When it is judged that the accommodation area in which the hand luggage 3 is stowed is not the auxiliary accommodation areas Sa3 and Sb3, the stowing computation unit 33 sends a control signal to the stowing control unit 38 such that the robot hand 22 moves to a place in front of the stowing position of the hand luggage 3 (Procedure S606). Accordingly, the robot hand 22 moves to a place in front of the stowing position of the hand luggage 3.

The stowing computation unit 33 judges whether the stowing position of the hand luggage 3 corresponds to the address where stowing is performed in a horizontal placement state (Procedure S607). When it is judged that the stowing position of the hand luggage 3 corresponds to the address where stowing is performed in a horizontal placement state, the stowing computation unit 33 sends a control signal to the stowing control unit 38 such that the first conveyor unit 123 and the second conveyor unit 124 are simultaneously driven to a side opposite to the wall portion 130 for a prescribed time (Procedure S608). Accordingly, the hand luggage 3 is transferred from the first conveyor unit 123 to the stowing position inside the container 2 in a horizontal placement state.

When it is judged that the stowing position of the hand luggage 3 is an address which does not correspond to the address where stowing is performed in a horizontal placement state, namely, the stowing position of the hand luggage 3 corresponds to the address where stowing is performed in a vertical placement state, the stowing computation unit 33 sends a control signal to the stowing control unit 38 such that the robot hand 22 is turned 90 degrees around the X axis (Procedure S609). Accordingly, the posture of the robot hand 22 changes from a horizontal placement state to a vertical placement state. Further, the stowing computation unit 33 executes the foregoing Procedure S608. Accordingly, the hand luggage 3 is transferred from the first conveyor unit 123 to the stowing position inside the container 2 in a vertical placement state.

Figure 22A:
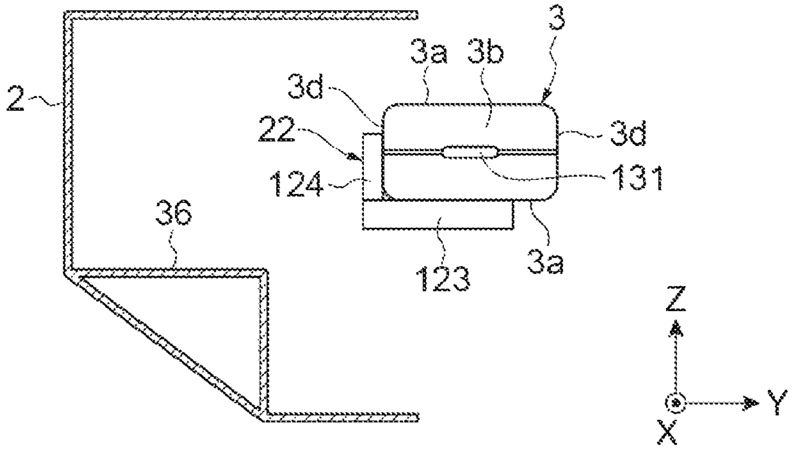
FIG. 22(*a*), FIG. 22(*b*) and FIG. 22(*c*) are schematic side views illustrating a situation in which the hand luggage is stowed in an auxiliary accommodation area inside the container.
Figure 22B:
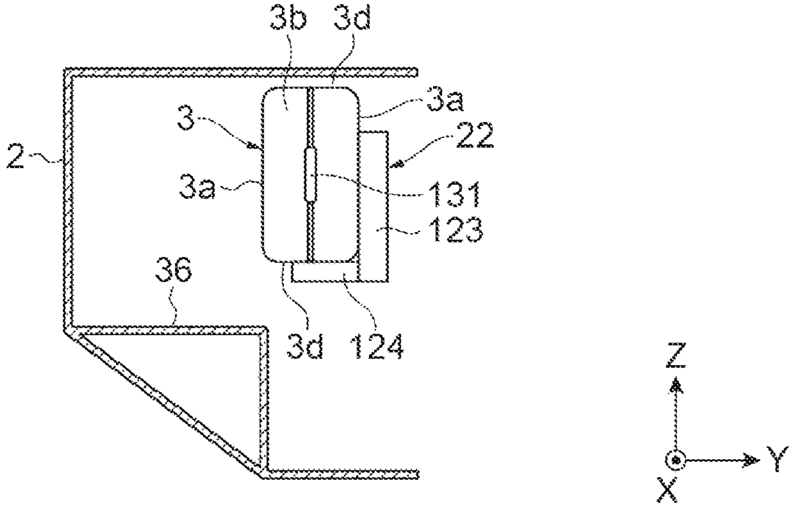
Figure 22C:
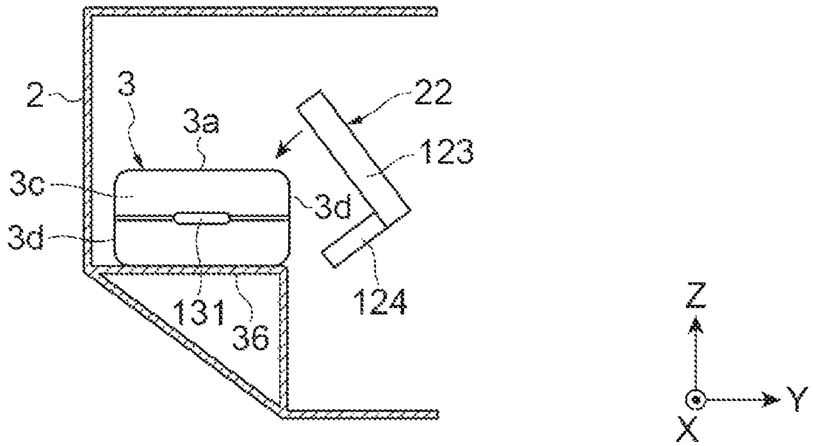

When it is judged in Procedure S105 that the accommodation area in which the hand luggage 3 is stowed is the auxiliary accommodation areas Sa3 and Sb3, as illustrated in FIG. 22(*a*), the stowing computation unit 33 sends a control signal to the stowing control unit 38 such that the robot hand 22 moves to the right upper side at the stowing position of the hand luggage 3 (Procedure S610). Accordingly, the robot hand 22 moves to the right upper side at the stowing position of the hand luggage 3.

As illustrated in FIGS. 22(*b*) and 22(*c*), the stowing computation unit 33 sends a control signal to the stowing control unit 38 such that the robot hand 22 is turned counterclockwise around the X axis when viewed in the forward direction of the stowing robot 15 (Procedure S611). Accordingly, the hand luggage 3 is transferred from the robot hand 22 to the stowing position inside the container 2 in a horizontal placement state. In FIG. 22, the accommodation case 126 of the robot hand 22 is omitted.

After the foregoing Procedure S608 or Procedure S611 is executed, the stowing computation unit 33 sends a control signal to the stowing control unit 38 such that the robot hand 22 returns to the initial state and moves to the holding position (Procedure S612). Accordingly, since the robot hand 22 moves to the holding position, the hand luggage 3 which will be subsequently transported can be stowed.

The Procedures S601 to S604 and S612 correspond to the foregoing first control processing. The Procedures S605, S606, and S610 correspond to the foregoing second control processing. The Procedures S607 to S609 and S611 correspond to the foregoing third control processing.

In the luggage stowing device 1D, when the hand luggage 3 (stowing target) is stowed in the container 2, the hand luggage 3 is first held by the robot hand 22 of the stowing robot 15. Specifically, in a state in which the robot hand 22 is at the holding position, the buffer conveyor 12 is driven, and as illustrated in FIG. 18(*a*), the first conveyor unit 123 and the second conveyor unit 124 of the robot hand 22 are driven to the wall portion 130 side. Therefore, the hand luggage 3 is transferred from the buffer conveyor 12 to the first conveyor unit 123 of the robot hand 22.

Further, as illustrated in FIG. 21, when the robot hand 22 turns around the Y axis and tilts such that the hand luggage 3 is positioned on the lower side, the hand luggage 3 goes down along the first conveyor unit 123 due to the dead weight thereof, and the handle 131 of the hand luggage 3 bumps into the wall portion 130. Therefore, the hand luggage 3 is in a positionally set state in the drive direction of the first conveyor unit 123 based on the wall portion 130 with respect to the first conveyor unit 123.

In addition, when the robot hand 22 turns around the X axis such that the hand luggage 3 hits the second conveyor unit 124, the side surface 3*d* of the hand luggage 3 bumps into the second conveyor unit 124. Therefore, the hand luggage 3 is also in a positionally set state in a direction perpendicular to the drive direction of the first conveyor unit 123 with respect to the first conveyor unit 123. In this state, when the robot hand 22 moves in the three axes directions and turns around three axes, the hand luggage 3 held by the robot hand 22 is stowed in the accommodation area corresponding to the dimensions of pieces of the hand luggage 3 inside the containers 2.

The stowing control computation processing is similar to that of the first embodiment (refer to FIG. 5). When the large-sized hand luggage 3A is stowed in the far side accommodation area Sa1 and the near side accommodation area Sb2, the robot hand 22 moves to a place in front of the stowing position of the hand luggage 3A. At this time, when the stowing position of the hand luggage 3A corresponds to the address where stowing is performed in a horizontal placement state, as illustrated in FIGS. 17(*a*) and 18(*b*), the first conveyor unit 123 and the second conveyor unit 124 of the robot hand 22 are driven to a side opposite to the wall portion 130. Therefore, the hand luggage 3A is transferred from the robot hand 22 to the stowing position in a horizontal placement state.

When the stowing position of the hand luggage 3A corresponds to the address where stowing is performed in a vertical placement state, as illustrated in FIG. 17(*b*), the robot hand 22 turns 90 degrees around the X axis in front of the stowing position of the hand luggage 3A. Therefore, the posture of the robot hand 22 changes from a horizontal placement state to a vertical placement state. The addresses where stowing is performed in a vertical placement state are No. 5, No. 8, No. 23, and No. 28 (refer to FIG. 4). In this state, when the first conveyor unit 123 and the second conveyor unit 124 are driven to a side opposite to the wall portion 130, the hand luggage 3A is transferred from the robot hand 22 to the stowing position in a vertical placement state.

When pieces of the hand luggage 3A are stowed in the auxiliary accommodation areas Sa3 and Sb3, as illustrated in FIG. 22(*a*), the robot hand 22 moves to the right upper side at the stowing position of the hand luggage 3A. Further, as illustrated in FIGS. 22(*b*) and 22(*c*), when the robot hand 22 turns counterclockwise around the X axis when viewed from the robot arm 20 side, the hand luggage 3A is separated from the robot hand 22. The hand luggage 3A is placed at the stowing position while rolling in a horizontal placement state.

When pieces of the medium-sized hand luggage 3B are stowed in the far side accommodation area Sb1 and the near side accommodation area Sa2, the robot hand 22 moves to a place in front of the stowing position of the hand luggage 3B. Further, as illustrated in FIG. 18(*b*), when the first conveyor unit 123 and the second conveyor unit 124 are driven to a side opposite to the wall portion 130, the hand luggage 3B is transferred from the robot hand 22 to the stowing position in a horizontal placement state.

When pieces of the small-sized hand luggage 3C are stowed in the auxiliary accommodation areas Sa3 and Sb3, as illustrated in FIG. 22(*a*), the robot hand 22 moves to the right upper side at the stowing position of the hand luggage 3C. Further, as illustrated in FIGS. 22(*b*) and 22(*c*), when the robot hand 22 turns counterclockwise around the X axis when viewed from the robot arm 20 side, the hand luggage 3C is separated from the robot hand 22, and the hand luggage 3C is placed at the stowing position while rolling in a horizontal placement state.

In the luggage stowing device 1D described above, pieces of the hand luggage 3 can be easily stowed into the containers 2 from a lateral side of the containers 2 by the first conveyor unit 123 and the second conveyor unit 124 transferring pieces of the hand luggage 3 from the robot hand 22 to the containers 2. In addition, the second conveyor unit 124 is disposed in an L-shape with respect to the first conveyor unit 123. For this reason, the postures of pieces of the hand luggage 3 can be changed by 90 degrees by the second drive unit 134 turning the robot hand 22 around the X axis parallel to the drive directions of the first conveyor unit 123 and the second conveyor unit 124. Therefore, pieces of the hand luggage 3 can be stowed not only in a horizontal placement state, but pieces of the hand luggage 3 can also be stowed in a vertical placement state. Accordingly, empty spaces inside the containers 2 can be reduced, and thus the hand luggage stowage factors inside the containers 2 can be improved.

In the present embodiment, the robot hand 22 having the first conveyor unit 123 and the second conveyor unit 124 is used. For this reason, it is possible to handle pieces of the hand luggage 3 having diverse sizes and shapes, such as hard suitcases, soft suitcases, and cardboard boxes. Therefore, the stowing robot 15 can be handled without replacing it with a dedicated robot hand corresponding to the size, the shape, and the like of the hand luggage 3.

In the present embodiment, the posture of the hand luggage 3 can be changed by 90 degrees by the second drive unit 134 turning the robot hand 22 around an axis parallel to the drives direction of the first conveyor unit 123 and the second conveyor unit 124. Therefore, pieces of the hand luggage 3 can be easily and reliably stowed in any of the horizontal placement state and the vertical placement state.

In the present embodiment, the wall portion 130 for positionally setting pieces of the hand luggage 3 in the drive directions of the first conveyor unit 123 and the second conveyor unit 124 with respect to the first conveyor unit 123 and the second conveyor unit 124 is provided on the base end side of the robot hand 22. For this reason, pieces of the hand luggage 3 held by the robot hand 22 are positionally set based on the wall portion 130 with respect to the first conveyor unit 123 and the second conveyor unit 124 by causing pieces of the hand luggage 3 placed on the first conveyor unit 123 to bump into the wall portion 130. Accordingly, pieces of the hand luggage 3 can be stowed at the stowing positions inside the containers 2 with high accuracy.

In the present embodiment, the robot hand 22 is turned by the second drive unit 134 in a state in which the wall portion 130 is positioned on the lower side. For this reason, even in a state in which pieces of the hand luggage 3 are roughly placed on the first conveyor unit 123, since the robot hand 22 tilts such that the wall portion 130 is positioned on the lower side, pieces of the hand luggage 3 reliably bump into the wall portion 130 due to the dead weights of pieces of the hand luggage 3. Therefore, pieces of the hand luggage 3 held by the robot hand 22 are easily positionally set in the drive directions of the first conveyor unit 123 and the second conveyor unit 124.

In the present embodiment, the robot hand 22 is turned by the second drive unit 134 in a state in which pieces of the hand luggage 3 placed on the first conveyor unit 123 hit the second conveyor unit 124. For this reason, pieces of the hand luggage 3 are positionally set not only in the drive directions of the first conveyor unit 123 and the second conveyor unit 124 but also in a direction perpendicular to the drive direction with respect to the first conveyor unit 123 and the second conveyor unit 124. Accordingly, pieces of the hand luggage 3 can be stowed at the stowing positions inside the containers 2 with higher accuracy.

In the present embodiment, the first conveyor unit 123 and the second conveyor unit 124 are simultaneously driven in the same direction. For this reason, when pieces of the hand luggage 3 placed on the first conveyor unit 123 move in a state of abutting the second conveyor unit 124, pieces of the hand luggage 3 are prevented from being scratched by the second conveyor unit 124.

In the present embodiment, the width dimension W1 of the first conveyor unit 123 is larger than the width dimension W2 of the second conveyor unit 124. For this reason, while the robot hand 22 is miniaturized, pieces of the hand luggage 3 having rectangular parallelepiped shapes can be easily stowed into the containers 2 in a horizontal placement state and a vertical placement state.

In the present embodiment as well, various kinds of modifications similar to those of the first embodiment can be applied. In addition, in the present embodiment, when the hand luggage 3 is held by the robot hand 22, the first conveyor unit 123 and the second conveyor unit 124 are simultaneously driven to the wall portion 130 side, but the embodiment is not particularly limited to this form. Only the first conveyor unit 123 may be driven to the wall portion 130 side.

In the present embodiment, when pieces of the hand luggage 3 are stowed in the far side accommodation areas Sa1 and Sb1 and the near side accommodation areas Sa2 and Sb2 inside the containers 2, the first conveyor unit 123 and the second conveyor unit 124 are simultaneously driven to a side opposite to the wall portion 130, but the embodiment is not particularly limited to such a form. When pieces of the hand luggage 3 are stowed in the far side accommodation areas Sa1 and Sb1 and the near side accommodation areas Sa2 and Sb2 inside the containers 2 in a horizontal placement state, only the first conveyor unit 123 may be driven to a side opposite to the wall portion 130. When pieces of the hand luggage 3 are stowed in the far side accommodation areas Sa1 and Sb1 and the near side accommodation areas Sa2 and Sb2 inside the containers 2 in a vertical placement state, only the second conveyor unit 124 may be driven to a side opposite to the wall portion 130.

In the present embodiment, the width dimension W1 of the first conveyor unit 123 is larger than the width dimension W2 of the second conveyor unit 124, but the embodiment is not particularly limited to this form. The width dimensions of the first conveyor unit 123 and the second conveyor unit 124 may be equivalent to each other. In this case, shapes of pieces of the hand luggage 3 to be stowed in the containers 2 are not particularly limited to rectangular parallelepiped shapes and may be cube shapes. Namely, shapes of pieces of the hand luggage 3 need only be quadrangular prism shapes. Quadrangular prism shapes may include complete quadrangular prism shapes and substantial quadrangular prism shapes.

In the present embodiment, motions of the first drive unit 133 and the second drive unit 134 are separately performed, but the embodiment is not particularly limited to this form. Motions of the first drive unit 133 and the second drive unit 134 may be simultaneously performed. The stowing robot 15 may have only the first drive unit 133. In this case, for example, a worker may manually turn the robot hand 22.

Alternative Examples of Fourth Embodiment

Figure 23:
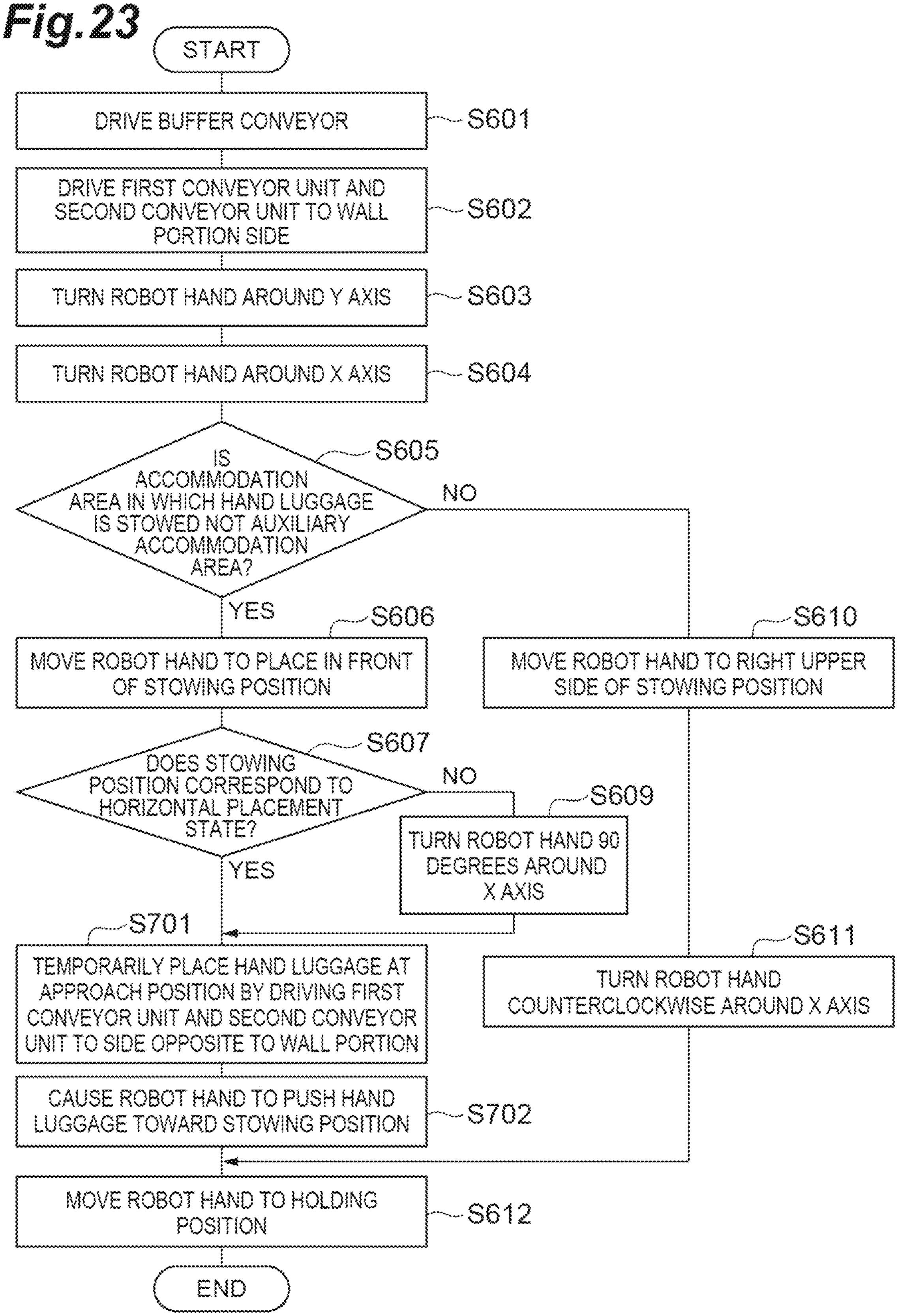
FIG. 23 is a flowchart showing an alternative example of details of a procedure of stowing computation processing executed by the stowing computation unit illustrated in FIG. 19.

Alternative examples of the fourth embodiment of the present disclosure will be described. The alternative examples differ from the fourth embodiment in a part of the procedure of stowing computation processing executed by the stowing computation unit 33. FIG. 23 is a flowchart showing an alternative example of details of a procedure of stowing computation processing executed by the stowing computation unit 33. As shown in FIG. 23, in the procedure of the present embodiment, Procedures S701 and S702 are executed in place of Procedure S608. Other procedures are similar to those of the fourth embodiment. Procedures S606, S607, S609, and S701 correspond to the first control processing. Procedure S702 corresponds to the second control processing.

When it is judged in Procedure S607 that the stowing position of the hand luggage 3 corresponds to the address where stowing is performed in a horizontal placement state, the stowing computation unit 33 sends a control signal to the stowing control unit 38 such that the first conveyor unit 123 and the second conveyor unit 124 are simultaneously driven to a side opposite to the wall portion 130 for a prescribed time, and therefore the hand luggage 3 is temporarily placed at an approach position (Procedure S701). Accordingly, the hand luggage 3 is transferred from the first conveyor unit 123 to the approach position in a horizontal placement state.

Figure 24A:
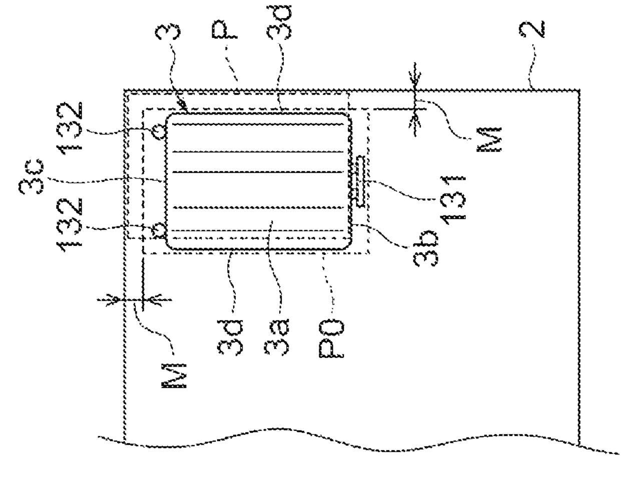
FIG. 24(*a*), FIG. 24(*b*) and FIG. 24(*c*) are schematic plan views illustrating a situation in which the hand luggage temporarily placed at an approach position inside the container is pushed through the processing shown in FIG. 23.
Figure 24B:
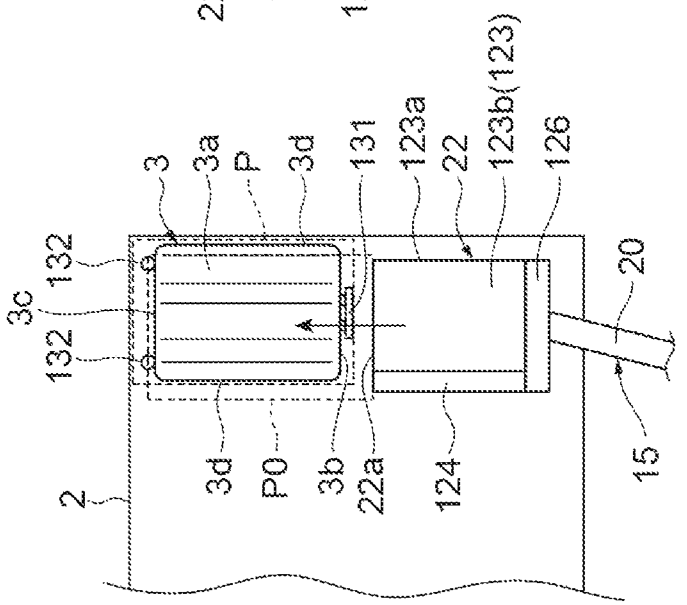
Figure 24C:
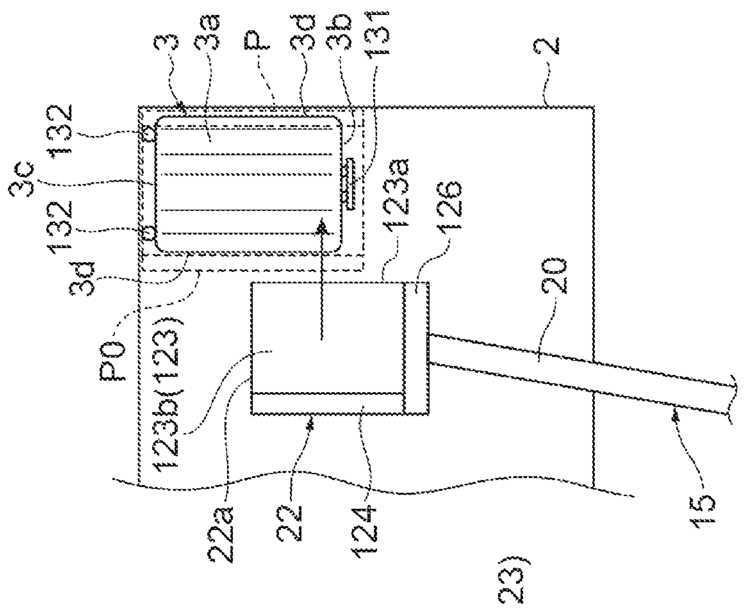

For example, when the stowing position of the hand luggage 3 is a position in the first row or the second row from the right end of the container 2, as illustrated in FIG. 24(*a*), an approach position P0 is a position offset from a stowing position P to the near side and the left side in the container 2 (one side in the lateral direction) by an arbitrary amount M. When the stowing position of the hand luggage 3 is a position in the third row from the right end of the container 2, although it is not particularly illustrated, the approach position P0 is a position offset from the stowing position P to the near side in the container 2 by the arbitrary amount M.

When it is judged that the stowing position of the hand luggage 3 is an address which does not correspond to the address where stowing is performed in a horizontal placement state, namely, the stowing position of the hand luggage 3 corresponds to the address where stowing is performed in a vertical placement state, the stowing computation unit 33 sends a control signal to the stowing control unit 38 such that the robot hand 22 is turned 90 degrees around the X axis (Procedure S609). Accordingly, the posture of the robot hand 22 changes from a horizontal placement state to a vertical placement state. Thereafter, the stowing computation unit 33 executes the foregoing Procedure S701. Accordingly, the hand luggage 3 is transferred from the first conveyor unit 123 to the approach position in a vertical placement state.

After Procedure S701 is executed, as illustrated in FIG. 24, the stowing computation unit 33 sends a control signal to the stowing control unit 38 such that the hand luggage 3 is pushed toward the stowing position by the robot hand 22 (Procedure S702). Accordingly, the hand luggage 3 arrives at the stowing position P (final target position) from the approach position P0.

Figure 25:
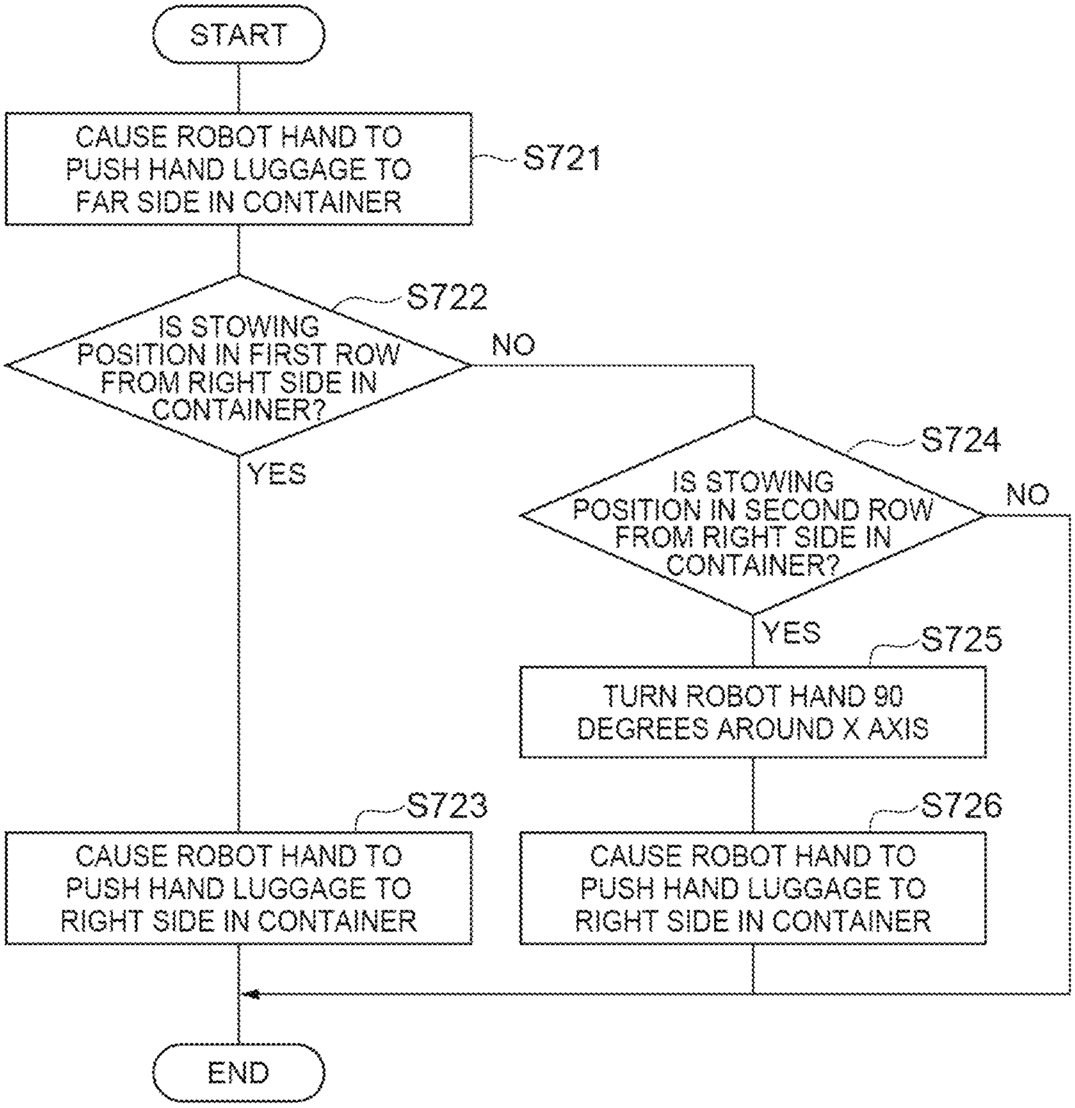
FIG. 25 is a flowchart showing an example of details of a procedure 702 shown in FIG. 23.

FIG. 25 is a flowchart showing an example of details of Procedure S702 shown in FIG. 23. As shown in FIG. 25, the stowing computation unit 33 first sends a control signal to the stowing control unit 38 such that the hand luggage 3 is pushed to the far side (arrow side) in the container 2 by the robot hand 22 as illustrated in FIG. 24(*b*) (Procedure S721). At this time, the stowing computation unit 33 sends a control signal such that a flat part on an upper surface 3*b* of the hand luggage 3 is pushed by a tip surface 22*a* of the robot hand 22. Accordingly, the hand luggage 3 is smoothly pushed toward the far side in the container 2 by the robot hand 22.

Figure 26A:
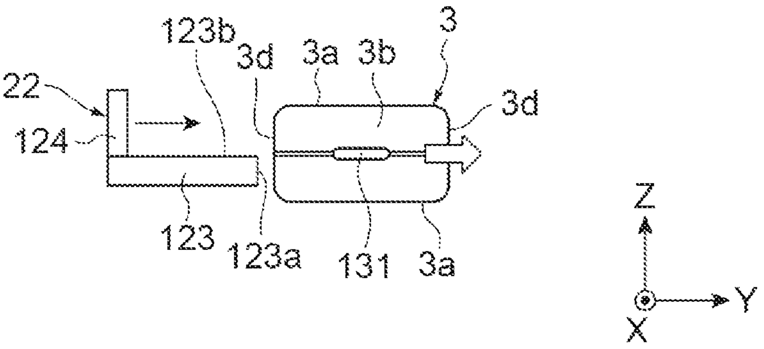
FIG. 26(*a*) and FIG. 26(*b*) are schematic side views illustrating a situation in which the hand luggage is pushed to the right side in the container by the robot hand.
Figure 26B:
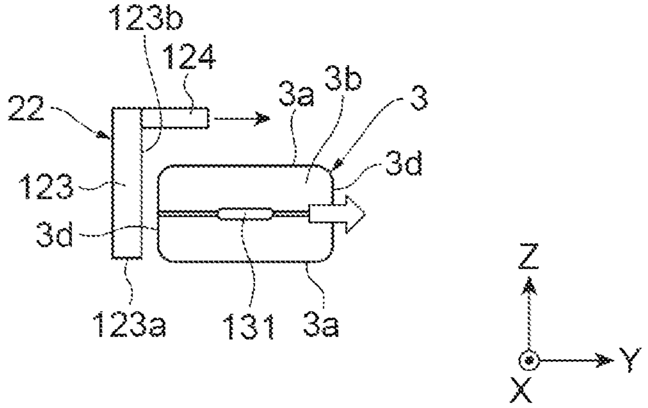

Subsequently, the stowing computation unit 33 judges whether the stowing position of the hand luggage 3 is a position in the first row from the right end of the container 2 (Procedure S722). When it is judged that the stowing position of the hand luggage 3 is a position in the first row from the right end of the container 2, as illustrated in FIG. 24(*c*), the stowing computation unit 33 sends a control signal to the stowing control unit 38 such that the hand luggage 3 is pushed to the right side in the container 2 (the other side in the lateral direction) by the robot hand 22 (Procedure S723). At this time, as illustrated in FIG. 26(*a*) as well, the stowing computation unit 33 sends a control signal such that a flat part on the side surface 3*d* of the hand luggage 3 is pushed by a side surface 123*a* of the first conveyor unit 123 of the robot hand 22. Accordingly, the hand luggage 3 is smoothly pushed toward the right side in the container 2 by the robot hand 22.

When it is judged that the stowing position of the hand luggage 3 is not a position in the first row from the right end of the container 2, the stowing computation unit 33 judges whether the stowing position of the hand luggage 3 is a position in the second row from the right end of the container 2 (Procedure S724).

When it is judged that the stowing position of the hand luggage 3 is a position in the second row from the right end of the container 2, as illustrated in FIG. 26(*b*), the stowing computation unit 33 sends a control signal to the stowing control unit 38 such that the robot hand 22 is turned 90 degrees around the X axis in a state in which the second conveyor unit 124 is positioned on the upper side (Procedure S725). In FIG. 26, for the sake of convenience, the accommodation case 126 of the robot hand 22 is omitted.

As illustrated in FIG. 26(*b*), the stowing computation unit 33 sends a control signal to the stowing control unit 38 such that the hand luggage 3 is pushed to the right side in the container 2 by the robot hand 22 (Procedure S726). At this time, the stowing computation unit 33 sends a control signal such that a flat part on the side surface 3*d* of the hand luggage 3 is pushed by a placement surface 123*b* of the first conveyor unit 123 of the robot hand 22. Accordingly, the hand luggage 3 is smoothly pushed toward the right side in the container 2 by the robot hand 22.

The stowing computation unit 33 does not execute Procedures S723 and S726 when it is judged that the stowing position of the hand luggage 3 is not a position in the second row from the right end of the container 2, namely, when it is judged that the stowing position of the hand luggage 3 is a position in the third row from the right end of the container 2.

In this processing, when the stowing position of the hand luggage 3 is a position in the second row from the right end of the container 2, regardless of the dimensions of pieces of the hand luggage 3, the robot hand 22 is turned 90 degrees around the X axis, but the embodiment is not particularly limited to such a form. When the stowing position of the large-sized hand luggage 3A is a position in the second row from the right end of the container 2, the robot hand 22 is turned 90 degrees around the X axis, when the stowing position of the medium-sized hand luggage 3B is a position in the second row from the right end of the container 2, since there is a wide stowing space in the lateral direction in the container 2, the hand luggage 3B may be pushed to the right side in the container 2 without turning the robot hand 22 90 degrees around the X axis.

In this aspect, when the robot hand 22 moves in the three axes directions and turns around three axes in a state in which the hand luggage 3 is held by the robot hand 22 of the stowing robot 15, the hand luggage 3 held by the robot hand 22 is stowed in the accommodation area corresponding to the dimensions of pieces of the hand luggage 3 inside the containers 2.

When pieces of the hand luggage 3 are stowed in the far side accommodation areas Sa1 and Sb1 and the near side accommodation areas Sa2 and Sb2 in the containers 2, the robot hand 22 first moves to a place in front of the stowing position of the hand luggage 3. Further, a stowing motion corresponding to the stowing position of the hand luggage 3 is performed.

When the stowing position of the hand luggage 3 is a position in the first row from the right end of the container 2, the first conveyor unit 123 and the second conveyor unit 124 of the robot hand 22 are first driven to a side opposite to the wall portion 130. Therefore, as illustrated in FIG. 24(*a*), the hand luggage 3 is transferred from the robot hand 22 to the approach position P0. Further, as illustrated in FIG. 24(*b*), the hand luggage 3 is pushed to the far side in the container 2 by the tip surface 22*a* of the robot hand 22. Thereafter, as illustrated in FIGS. 24(*c*) and 26(*a*), the hand luggage 3 is pushed to the right side in the container 2 by the side surface 123*a* of the first conveyor unit 123 of the robot hand 22. Accordingly, pieces of the hand luggage 3 are aligned at the stowing position P (final target position).

When the stowing position of the hand luggage 3 is a position in the second row from the right end of the container 2, the hand luggage 3 is transferred from the robot hand 22 to the approach position P0. In addition, the hand luggage 3 is pushed to the far side in the container 2 by the tip surface 22*a* of the robot hand 22. Further, for example, as illustrated in FIG. 26(*b*), in a state in which the robot hand 22 has turned 90 degrees around the X axis, the hand luggage 3 is pushed to the right side in the container 2 by the placement surface 123*b* of the first conveyor unit 123 of the robot hand 22. Accordingly, pieces of the hand luggage 3 are aligned at the stowing position P (final target position).

When the stowing position of the hand luggage 3 is a position in the third row from the right end of the container 2, the hand luggage 3 is transferred from the robot hand 22 to the approach position P0. Further, the hand luggage 3 is pushed to the far side in the container 2 by the tip surface 22*a* of the robot hand 22. Accordingly, pieces of the hand luggage 3 are aligned at the stowing position P (final target position).

When pieces of the hand luggage 3 are stowed in the auxiliary accommodation areas Sa3 and Sb3, the robot hand 22 first moves to the right upper side at the stowing position of the hand luggage 3 (refer to FIG. 22(*a*)). Further, when the robot hand 22 turns around the X axis, the hand luggage 3 is separated from the robot hand 22, and the hand luggage 3 is placed at the stowing position while rolling (refer to FIGS. 22(*b*) and 22(*c*)).

As in the above, in the present embodiment, first, the hand luggage 3 held by the robot hand 22 is temporarily placed at the approach position offset from the stowing position inside the container 2. Further, when the hand luggage 3 temporarily placed at the approach position is pushed toward the stowing positions by the robot hand 22, the hand luggage 3 arrives at the stowing position. Accordingly, pieces of the hand luggage 3 are accurately stowed at the stowing positions inside the containers 2. As a result, there is no need to use any special device or any additional device in order to accurately stow pieces of the hand luggage 3 at the stowing positions inside the containers 2, and this leads to cost reduction.

In the present embodiment, since the hand luggage 3 is pushed to the far side in the container 2 by the robot hand 22, pieces of the hand luggage 3 are accurately stowed at the stowing positions inside the containers 2 with respect to the depth direction of the containers 2.

In the present embodiment, depending on the stowing position of the hand luggage 3, since pieces of the hand luggage 3 are pushed to the far side and the right side in the containers 2 by the robot hand 22, pieces of the hand luggage 3 are accurately stowed at the stowing positions inside the containers 2 with respect to the depth direction and the lateral direction of the containers 2.

In the present embodiment, after the hand luggage 3 is pushed to the far side in the container 2 by the robot hand 22, the hand luggage 3 is pushed to the right side by the robot hand 22. For this reason, in a state in which a caster 132 of the hand luggage 3 interferes with an inner wall surface on the far side in the container 2 or the existing hand luggage 3 positioned next thereto on the far side, the hand luggage 3 is pushed to the right side. Therefore, in a state in which the side surface 3*d* of the hand luggage 3 interferes with the inner wall surface on the right side in the container 2 or the existing hand luggage 3 positioned next thereto on the right side, the hand luggage 3 is prevented from being pushed to the far side in the container 2 by the robot hand 22. Accordingly, damage to the side surface 3*d* of the hand luggage 3 can be prevented.

In the present embodiment, after the posture of the robot hand 22 is changed by 90 degrees in accordance with spaces in the lateral direction in the containers 2 around the stowing position, pieces of the hand luggage 3 are pushed to the right side by the robot hand 22. For this reason, the position to which the robot hand 22 pushes pieces of the hand luggage 3 varies in accordance with the spaces in the lateral direction in the containers 2 around the stowing position. Therefore, even when the spaces in the lateral direction in the containers 2 around the stowing position are narrow, pieces of the hand luggage 3 can be accurately stowed with respect to the lateral direction in the containers 2 at the stowing positions inside the containers 2.

Figure 27:
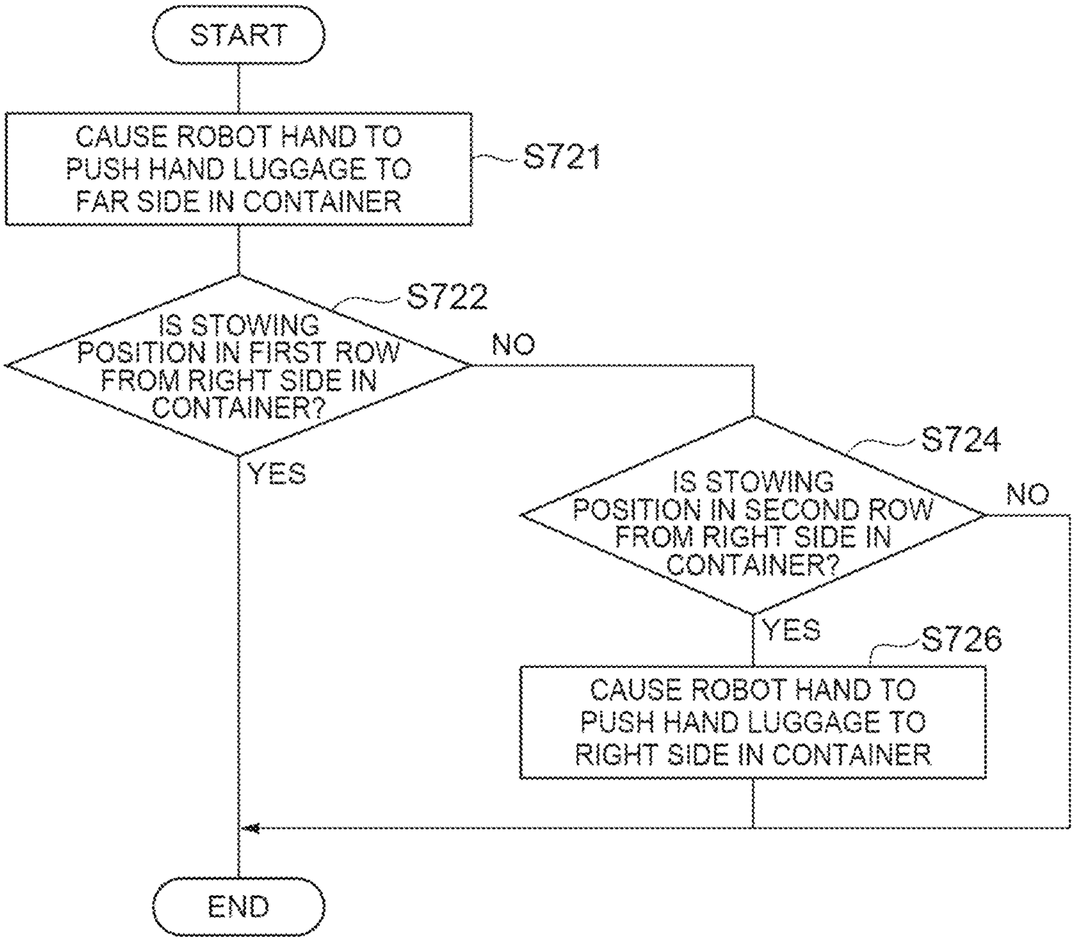
FIG. 27 is a flowchart showing an alternative example of details of the procedure 702 shown in FIG. 23.

FIG. 27 is a flowchart showing an alternative example of details of Procedure S702 shown in FIG. 23. This processing shows a procedure of stowing pieces of the medium-sized hand luggage 3B in the containers 2. As shown in FIG. 27, the stowing computation unit 33 first executes the foregoing Procedure S721. Accordingly, the hand luggage 3B is pushed toward the far side in the container 2 by the robot hand 22. Subsequently, the stowing computation unit 33 executes the foregoing Procedure S722.

When it is judged that the stowing position of the hand luggage 3B is a position in the first row from the right end of the container 2, the stowing computation unit 33 does not execute the foregoing Procedure S723. In this case, the hand luggage 3B is not pushed toward the right side in the container 2 by the robot hand 22.

When it is judged that the stowing position of the hand luggage 3B is not a position in the first row from the right end of the container 2, the stowing computation unit 33 executes the foregoing Procedure S724. When it is judged that the stowing position of the hand luggage 3B is a position in the second row from the right end of the container 2, the stowing computation unit 33 executes the foregoing Procedure S726. Accordingly, the hand luggage 3B is pushed toward the right side in the container 2 by the robot hand 22 together with the hand luggage 3B in the first row from the right end of the container 2. When it is judged that the stowing position of the hand luggage 3B is a position in the third row from the right end of the container 2, the stowing computation unit 33 does not execute Procedure S726.

Figure 28A:
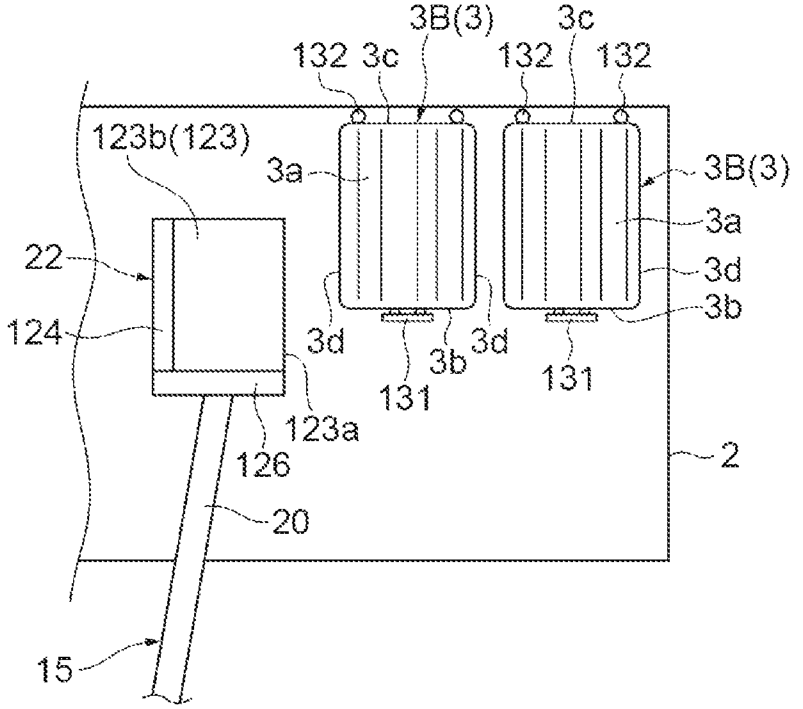
FIG. 28(*a*) and FIG. 28(*b*) are schematic plan views illustrating a situation in which pieces of the hand luggage temporarily placed at the approach position inside the container are pushed through the processing shown in FIG. 27.
Figure 28B:
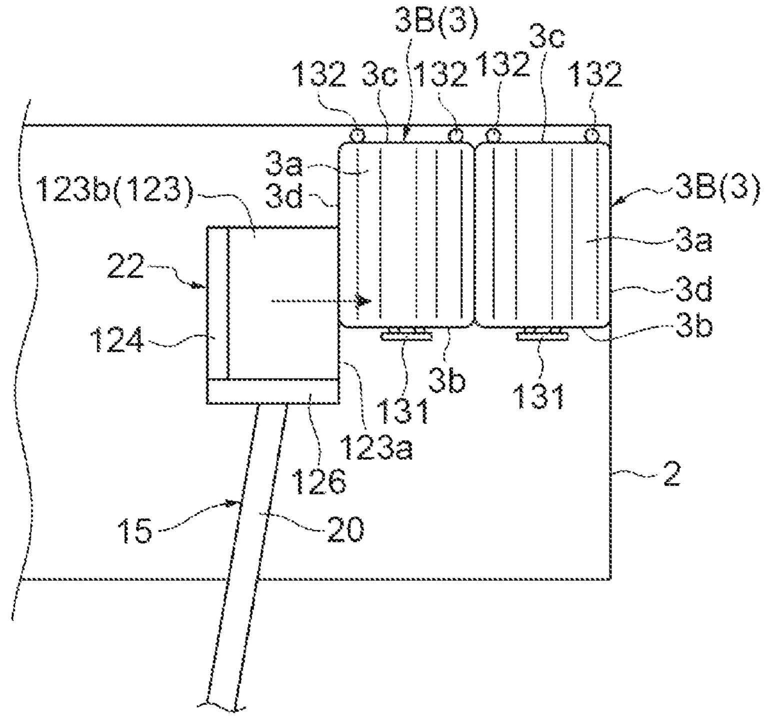

In the above, when the hand luggage 3B is stowed in the first row from the right end of the container 2, as illustrated in FIG. 28(*a*), after the hand luggage 3B is temporarily placed at the approach position, the hand luggage 3B is pushed to the far side in the container 2 by the robot hand 22.

Thereafter, when the hand luggage 3B is stowed in the second row from the right end of the container 2, as illustrated in FIG. 28(*a*), after the hand luggage 3B is temporarily placed at the approach position, the hand luggage 3B is pushed to the far side in the container 2 by the robot hand 22. Further, as illustrated in FIG. 28(*b*), two pieces of the hand luggage 3B are collectively pushed to the right side in the container 2 by the robot hand 22. Accordingly, two pieces of the hand luggage 3 are simultaneously aligned at the stowing position P.

In this alternative example, since a plurality of (here, two) pieces of the hand luggage 3B are simultaneously pushed to the right side in the container 2, a part of control processing of pushing the hand luggage 3B to the right side in the container 2 is omitted. Therefore, a time for stowing the hand luggage 3B into the container 2 is shortened.

Figure 29:
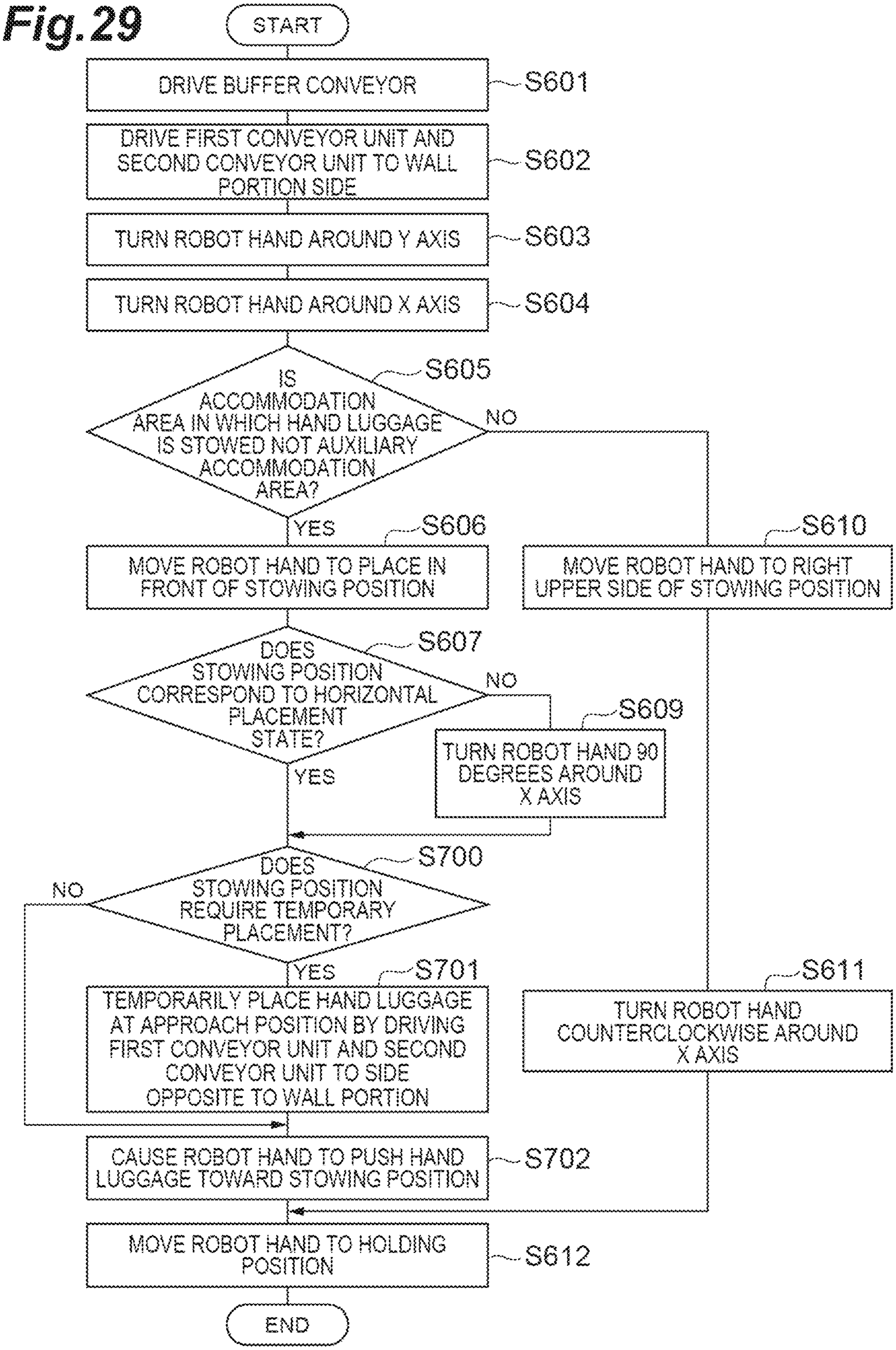
FIG. 29 is a flowchart showing another alternative example of details of a procedure of the stowing computation processing executed by the stowing computation unit illustrated in FIG. 19.

FIG. 29 is a flowchart showing another alternative example of details of stowing computation processing. In FIG. 29, after Procedure S607 or S609 is executed, the stowing computation unit 33 judges whether the stowing position of the hand luggage 3 corresponds to an address requiring temporary placement of the hand luggage 3 at the approach position (Procedure S700).

There is no need for the medium-sized hand luggage 3B stowed in the third row from the right end of the container 2 to be temporarily placed at the approach position. Therefore, the position at the address corresponding to the medium-sized hand luggage 3B stowed in the third row from the right end of the container 2 is a position not requiring temporary placement at the approach position. The positions at the addresses corresponding to other pieces of the medium-sized hand luggage 3B and the large-sized hand luggage 3A are positions requiring temporary placement at the approach position.

When it is judged that the stowing position of the hand luggage 3 corresponds to the address requiring temporary placement of the hand luggage 3 at the approach position, the stowing computation unit 33 executes the foregoing Procedure S701. When it is judged that the stowing position of the hand luggage 3 does not correspond to the address requiring temporary placement of the hand luggage 3 at the approach position, the stowing computation unit 33 does not execute the foregoing Procedure S701 and executes the foregoing Procedure S702.

Figure 30:
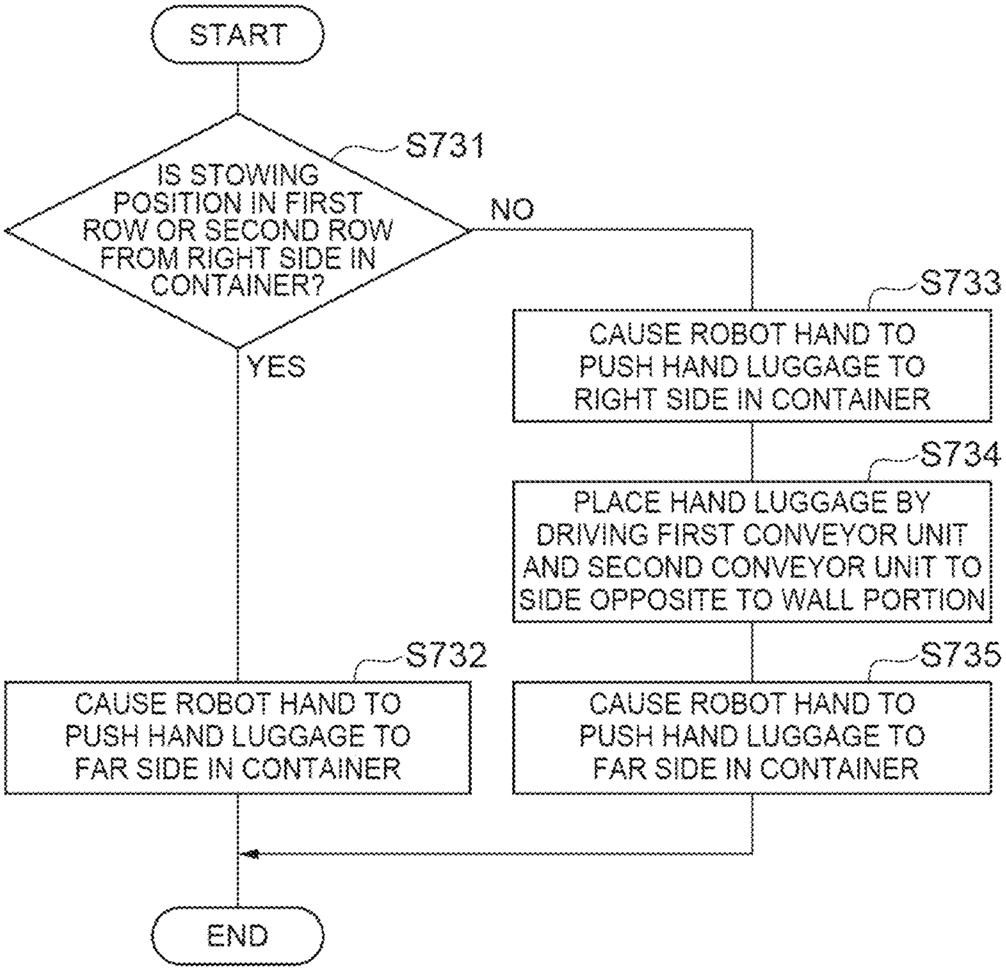
FIG. 30 is a flowchart showing details of the procedure 702 shown in FIG. 29.

FIG. 30 is a flowchart showing details of Procedure S702 shown in FIG. 29. This processing shows a procedure of stowing pieces of the medium-sized hand luggage 3B in the containers 2.

In FIG. 30, the stowing computation unit 33 first judges whether the stowing position of the hand luggage 3B is a position in any of the first row and the second row from the right end of the container 2 (Procedure S731). When it is judged that the stowing position of the hand luggage 3B is a position in any of the first row and the second row from the right end of the container 2, the stowing computation unit 33 sends a control signal to the stowing control unit 38 such that the hand luggage 3B is pushed to the far side in the container 2 by the robot hand 22 (Procedure S732). Accordingly, the hand luggage 3B is pushed toward the far side in the container 2 by the robot hand 22.

Figure 31A:
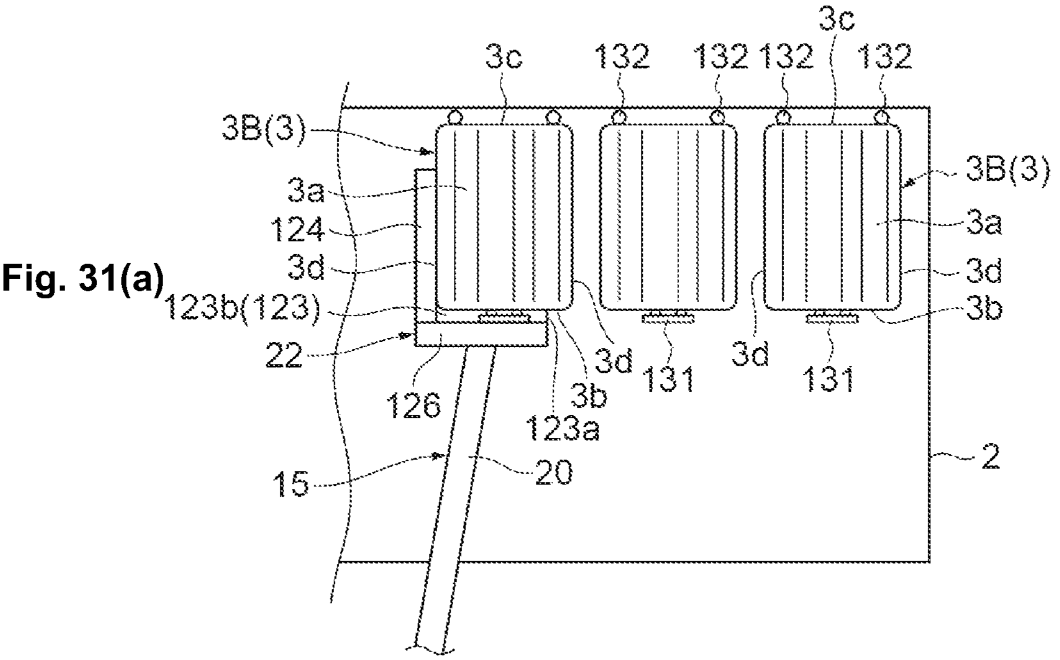
FIG. 31(*a*) and FIG. 31(*b*) are schematic plan views illustrating a situation in which pieces of the hand luggage temporarily placed at the approach position inside the container are pushed through the processing shown in FIG. 30.
Figure 31B:
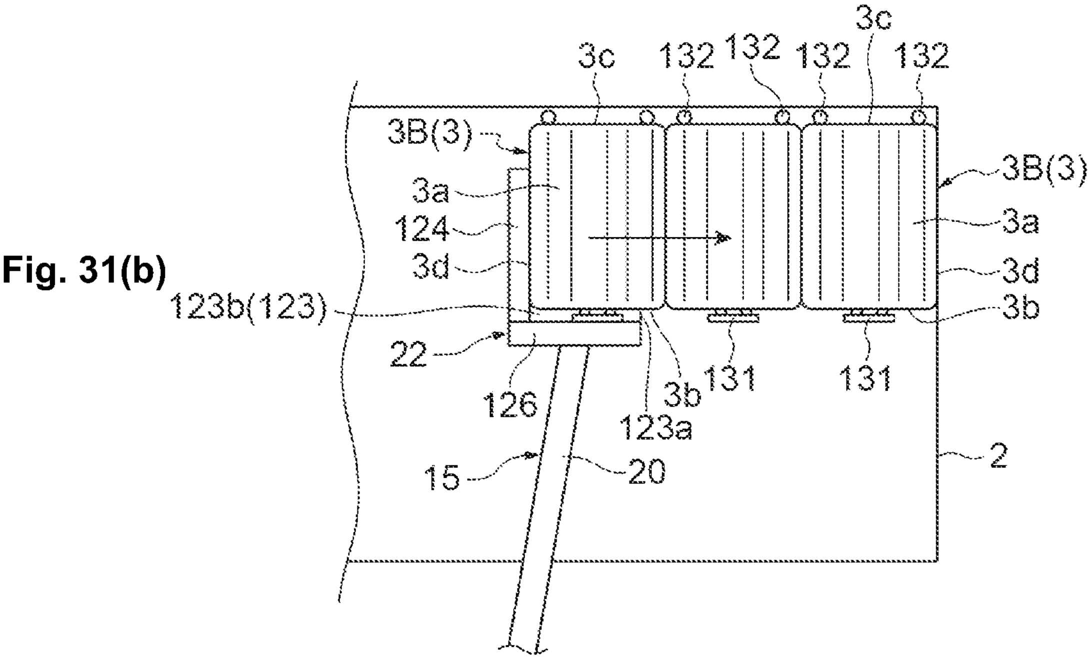

When it is judged that the stowing position of the hand luggage 3B is not a position in the first row and the second row from the right end of the container 2, namely, the stowing position of the hand luggage 3B is a position in the third row from the right end of the container 2, the stowing computation unit 33 sends a control signal to the stowing control unit 38 such that the hand luggage 3B is pushed to the right side in the container 2 by the robot hand 22 (Procedure S733). Accordingly, as illustrated in FIG. 31, in a state in which the hand luggage 3 is held by the robot hand 22, two pieces of the hand luggage 3B placed in the first row and the second row from the right end of the container 2 are pushed to the right side in the container 2 by the robot hand 22.

Subsequently, when the stowing computation unit 33 sends a control signal to the stowing control unit 38 such that the first conveyor unit 123 and the second conveyor unit 124 are simultaneously driven to a side opposite to the wall portion 130 for a prescribed time, the hand luggage 3 is placed in the container 2 (Procedure S734). Specifically, after a control signal is sent to the stowing control unit 38 such that the robot hand 22 moves to the left side and the near side in the container 2, the stowing computation unit 33 sends a control signal to the stowing control unit 38 such that the first conveyor unit 123 and the second conveyor unit 124 are driven to a side opposite to the wall portion 130.

After the robot hand 22 is continuously pushed to the right side in the container 2, for example, using a torque limit function of the stowing robot 15, the stowing computation unit 33 may move the robot hand 22 to the left side in the container 2 at the point of time when a reaction force to a certain extent has been generated.

The stowing computation unit 33 sends a control signal to the stowing control unit 38 such that the hand luggage 3B is pushed to the far side in the container 2 by the robot hand 22 (Procedure S735). Accordingly, the hand luggage 3B is pushed toward the far side in the container 2 by the robot hand 22.

In the above, when the hand luggage 3B is stowed in the first row and the second row from the right end of the container 2, as illustrated in FIG. 31(*a*), after the hand luggage 3B is temporarily placed at the approach position, the hand luggage 3B is pushed to the far side in the container 2 by the robot hand 22.

Thereafter, when the hand luggage 3B is stowed in the third row from the right end of the container 2, as illustrated in FIG. 31(*b*), in a state in which the hand luggage 3B is held by the robot hand 22, two pieces of the hand luggage 3B placed in the first row and the second row from the right end of the container 2 are collectively pushed to the right side in the container 2 by the robot hand 22. Accordingly, two pieces of the hand luggage 3 are simultaneously aligned at the stowing position P.

In the present alternative example, regarding pieces of the hand luggage 3B held by the robot hand 22 when a plurality of pieces of the hand luggage 3B are collectively pushed by the robot hand 22, pieces of the hand luggage 3B do not have to be temporarily placed at the approach position. Therefore, a time for stowing pieces of the hand luggage 3B into the containers 2 is further shortened.

In the present embodiment as well, various kinds of modifications similar to those of the first embodiment can be applied. For example, in the present embodiment, the stowing position of the hand luggage 3 is a position where the hand luggage 3 abuts the inner wall surface of the container 2 or the existing hand luggage 3, but the embodiment is not particularly limited to such a form. The stowing position of the hand luggage 3 may be a position separated from the inner wall surface of the container 2 or the existing hand luggage 3. In this case, for example, the first drive unit 133 may be controlled in accordance with a press amount of the hand luggage 3 by the robot hand 22 by detecting the distance from the hand luggage 3 temporarily placed at the approach position to the stowing position, and determining the press amount of the hand luggage 3 on the basis of this detection value.

In the present embodiment, when the stowing position of the hand luggage 3 is a position in the first row or the second row from the right end of the container 2, after the hand luggage 3 is pushed to the far side in the container 2 by the robot hand 22, the hand luggage 3 is pushed to the right side in the container 2 by the robot hand 22, but the embodiment is not particularly limited to such a form. After the hand luggage 3 is pushed to the right side in the container 2 by the robot hand 22, the hand luggage 3 may be pushed to the far side in the container 2 by the robot hand 22. In this case, as in the foregoing alternative example, a plurality of pieces of the hand luggage 3 may be collectively pushed to the far side in the container 2 by the robot hand 22.

In the present embodiment, when the stowing position of the hand luggage 3 is a position in the second row from the right end of the container 2, in a state in which the robot hand 22 is turned 90 degrees around the X axis, the hand luggage 3 is pushed to the right side in the container 2 by the placement surface 123*b* of the first conveyor unit 123 of the robot hand 22, but the embodiment is not particularly limited to such a form. For example, if there are spaces in the lateral direction in the containers 2 around the stowing position, the hand luggage 3 may be pushed to the right side in the container 2 by the side surface 123*a* of the first conveyor unit 123 of the robot hand 22 without turning the robot hand 22 90 degrees around the X axis.

In the present embodiment, the robot hand 22 has the first conveyor unit 123 and the second conveyor unit 124 for moving the hand luggage 3, but the embodiment is not particularly limited to such a form. For example, if the hand luggage 3 can be held by the robot hand 22 by only driving the buffer conveyor 12, the robot hand may not be particularly equipped with a conveyor unit for moving the hand luggage 3. In this case, the robot hand may have a structure with an L-shaped holding wall portion, for example.

REFERENCE SIGNS LIST

1A to 1D Luggage stowing device
2 Container
2A Preceding container (first container)
2B Following container (second container)
2*f* Cut portion
3 Hand luggage (luggage)
3A Hand luggage (first luggage)
3B Hand luggage (second luggage)
3C Hand luggage (third luggage)
5 Main conveyor (transportation unit)
9 Pusher (first drive unit)
10 Turntable (rotary table)
11 Pusher (first drive unit)
12 Buffer conveyor (placement unit)
13 Pusher (second drive unit)
14 Pusher (position setting unit)
15 Stowing robot (stowing unit)
18 Wall portion (position setting unit)
22 Robot hand (holding unit)
23 Upstream camera (luggage detection unit)
24 Downstream camera (luggage detection unit)
25 Stowing processing unit (control unit)
26 Control panel (control unit)
27 Tag information acquisition unit

28 First hand luggage detection unit (luggage detection unit)

29 Second hand luggage detection unit (luggage detection unit)

30 Movement control unit

31 Rotation control unit

32 Position control unit

33 Stowing computation unit (control unit/stowing control unit)

34 Tag information updating unit

38 Stowing control unit (control unit)

40 Stock conveyor

Sa1 Far side accommodation area (first far side accommodation area)

Sa2 Near side accommodation area (first near side accommodation area)

Sa3 Auxiliary accommodation area (first auxiliary accommodation area)

Sb1 Far side accommodation area (second far side accommodation area)

Sb2 Near side accommodation area (second near side accommodation area)

Sb3 Auxiliary accommodation area (second auxiliary accommodation area)

123 First conveyor unit

124 Second conveyor unit

129 Control board (control unit)

130 Wall portion

133 First drive unit (movement drive unit)

134 Second drive unit (rotation drive unit)

135 Control board (control unit)

W1, W2 Width dimension

P Stowing position

P0 Approach position

The invention claimed is:

1. A luggage stowing device comprising:

a luggage detection unit detecting information of pieces of luggage transported by a transportation unit;

a stowing unit stowing pieces of the luggage transported by the transportation unit with respect to a plurality of containers; and a control unit controlling the stowing unit such that at least one of: (i) the order of the containers for stowing the pieces of luggage, and (ii) the order of the pieces of luggage to be stored in the containers is adjusted on the basis of the information detected by the luggage detection unit with respect to the order of transporting the pieces of the luggage, wherein the containers include a first container and a second container, and wherein the control unit controls the stowing unit such that first luggage is stowed in the first container and controls the stowing unit such that second luggage having smaller dimensions than the first luggage is stowed in the second container.

2. The luggage stowing device according to claim 1, wherein the information is information related to dimensions of pieces of the luggage, and wherein the control unit controls the stowing unit such that pieces of the luggage are stowed in different containers on the basis of the dimensions of pieces of the luggage detected by the luggage detection unit.

3. The luggage stowing device according to claim 2, wherein a first far side accommodation area and a first near side accommodation area positioned on a near side with respect to the first far side accommodation area in the first container are set inside the first container, wherein a second far side accommodation area and a second near side accommodation area positioned on a near side with respect to the second far side accommodation area in the second container are set inside the second container, and wherein the control unit controls the stowing unit such that the first luggage is stowed in the first far side accommodation area and then the second near side accommodation area in that order and controls the stowing unit such that the second luggage is stowed in the second far side accommodation area and then the first near side accommodation area in that order.

4. The luggage stowing device according to claim 3, wherein a cut portion having a structure realized by cutting a lower side corner portion of the container is provided on one of left and right sides of the first container and the second container, wherein a first auxiliary accommodation area adjacent to the first far side accommodation area and the first near side accommodation area in a lateral direction of the first container is set at a position corresponding to the cut portion inside the first container, wherein a second auxiliary accommodation area adjacent to the second far side accommodation area and the second near side accommodation area in a lateral direction of the second container is set at a position corresponding to the cut portion inside the second container, and wherein the control unit controls the stowing unit such that third luggage having smaller dimensions than the second luggage is stowed in the first auxiliary accommodation area and the second auxiliary accommodation area.

5. The luggage stowing device according to claim 4, wherein the control unit controls the stowing unit such that the first luggage is stowed from a side opposite to the cut portion toward the cut portion side when the first luggage is stowed in the first far side accommodation area and the second near side accommodation area, and controls the stowing unit such that the second luggage is stowed from a side opposite to the cut portion toward the cut portion side when the second luggage is stowed in the second far side accommodation area and the first near side accommodation area.

6. The luggage stowing device according to claim 1, wherein the transportation unit has a stock conveyor for temporarily stocking pieces of the luggage transported by the transportation unit, and wherein the control unit adjusts the order of stowing pieces of the luggage in the containers by temporarily stocking pieces of the luggage in the stock conveyor and then stowing pieces of the luggage stocked in the stock conveyor.

7. The luggage stowing device according to claim 6, wherein the control unit adjusts the order of stowing pieces of the luggage in the containers such that a height difference between pieces of the luggage constituting the same stage inside the containers becomes equal to or smaller than a predetermined threshold.

8. The luggage stowing device according to claim 6, wherein the control unit causes pieces of the luggage to be taken out from the stock conveyor such that a height difference between a plurality of pieces of the luggage in the containers is minimized when the stock conveyor is full.

9. The luggage stowing device according to claim 6, wherein the control unit imparts an order of priority to each of locations in the transportation unit and controls the stowing unit such that the luggage is taken out from a location having a higher order of priority.

10. The luggage stowing device according to claim 6, wherein the luggage detection unit detects materials of pieces of the luggage as the information, wherein the pieces of luggage includes first pieces of luggage and second pieces luggage, wherein a detected material of the first pieces of luggage is softer than a detected material of the second pieces of luggage and wherein the control unit adjusts the order of stowing pieces of the luggage in the containers such that first pieces of the luggage are stowed on an upper stage side.

11. The luggage stowing device according to claim 1 further comprising:

a tag information acquisition unit acquiring tag information of pieces of the luggage; and a tag information updating unit associating stowing data including stowing positions of pieces of the luggage with the tag information acquired by the tag information acquisition unit.

12. The luggage stowing device according to claim 11, wherein an address is set in advance inside the containers, and wherein the tag information updating unit associates stowing data including addresses of the stowing positions of pieces of the luggage with the tag information.

13. The luggage stowing device according to claim 12, wherein a plurality of accommodation areas corresponding to dimensions of pieces of the luggage are set inside the containers, wherein the address is set for each of the accommodation areas, and wherein the control unit controls the stowing unit such that pieces of the luggage are stowed in the accommodation area corresponding to the dimensions of pieces of the luggage.

14. The luggage stowing device according to claim 11 further comprising:

a rotary table disposed on a downstream side of the transportation unit and having pieces of the luggage placed thereon;

a first drive unit moving pieces of the luggage transported by the transportation unit to the rotary table;

a movement control unit controlling driving of the first drive unit; and a rotation control unit controlling rotation of the rotary table, wherein the luggage detection unit detects orientations of pieces of the luggage placed on the rotary table, and wherein the rotation control unit controls the rotary table such that the orientations of pieces of the luggage become uniform on the basis of the orientations of pieces of the luggage detected by the luggage detection unit.

15. The luggage stowing device according to claim 14 further comprising:

a placement unit disposed on a downstream side of the rotary table and having pieces of the luggage placed thereon;

a second drive unit moving pieces of the luggage from the rotary table to the placement unit;

a position setting unit positionally setting pieces of the luggage placed on the placement unit with respect to a direction perpendicular to an array direction of the rotary table and the placement unit; and a position control unit controlling the second drive unit and the position setting unit such that pieces of the luggage are positionally set on the placement unit after the rotary table is controlled such that the orientations of pieces of the luggage become uniform.

16. The luggage stowing device according to claim 14, wherein the luggage detection unit detects kinds of pieces of the luggage, and wherein the movement control unit controls the first drive unit such that pieces of the luggage move to the rotary table when it is judged that pieces of the luggage are stowing targets to be stowed into the containers by the stowing unit on the basis of the kinds of pieces of the luggage detected by the luggage detection unit.

17. A luggage stowing device comprising:

a luggage detection unit detecting information of pieces of luggage transported by a transportation unit;

a stowing unit stowing pieces of the luggage transported by the transportation unit with respect to a plurality of containers;

a control unit controlling the stowing unit such that at least one of: (i) the order of the containers for stowing the pieces of luggage, and (ii) the order of the pieces of luggage to be stored in the containers is adjusted on the basis of the information detected by the luggage detection unit with respect to the order of transporting the pieces of the luggage, a stowing robot having a robot hand for holding pieces of the luggage;

a drive unit performing at least one of a motion of moving the robot hand in three axes directions and a motion of turning the robot hand around three axes; and a control unit executing first control processing of controlling the robot hand such that the robot hand holds pieces of the luggage, executing second control processing of controlling the drive unit such that the robot hand moves into the containers after the first control processing is executed, and executing third control processing of controlling the robot hand such that pieces of the luggage held by the robot hand are stowed into the containers after the second control processing is executed, wherein the robot hand has a first conveyor unit having pieces of the luggage placed thereon and moving pieces of the luggage, and a second conveyor unit disposed in an L-shape with respect to the first conveyor unit, having pieces of the luggage placed thereon, and moving pieces of the luggage, and wherein the control unit performs control such that at least one of the first conveyor unit and the second conveyor unit is driven to a base end side of the robot hand when the first control processing is executed, and performs control such that at least one of the first conveyor unit and the second conveyor unit is driven to a tip side of the robot hand when the third control processing is executed.

18. The luggage stowing device according to claim 17, wherein the drive unit has a first drive unit moving the robot hand in three axes directions, and a second drive unit turning the robot hand around three axes, and wherein the control unit controls the first drive unit such that the robot hand moves into the containers when the second control processing is executed, and controls the second drive unit such that the robot hand turns around an axis parallel to drive directions of the first conveyor unit and the second conveyor unit in a case of changing postures of pieces of the luggage when the third control processing is executed.

19. The luggage stowing device according to claim 18, wherein a wall portion for positionally setting pieces of the luggage in the drive directions of the first conveyor unit and the second conveyor unit with respect to the first conveyor unit and the second conveyor unit is provided on the base end side of the robot hand, and wherein the control unit performs control such that at least one of the first conveyor unit and the second conveyor unit is driven to the wall portion side when the first control processing is executed, and performs control such that at least one of the first conveyor unit and the second conveyor unit is driven to a side opposite to the wall portion when the third control processing is executed.

20. The luggage stowing device according to claim 19, wherein the control unit controls the second drive unit such that the robot hand turns in a state in which the wall portion is positioned on a lower side when the first control processing is executed.

21. The luggage stowing device according to claim 20, wherein the control unit controls the second drive unit such that the robot hand turns in a state in which pieces of the luggage placed on one of the first conveyor unit and the second conveyor unit hit the other of the first conveyor unit and the second conveyor unit when the first control processing is executed.

22. The luggage stowing device according to claim 17, wherein the control unit performs control such that the first conveyor unit and the second conveyor unit are simultaneously driven in the same direction when the first control processing and the third control processing are executed.

23. The luggage stowing device according to claim 17, wherein a width dimension of the first conveyor unit is larger than a width dimension of the second conveyor unit.

24. A luggage stowing device comprising:

a luggage detection unit detecting information of pieces of luggage transported by a transportation unit;

a stowing unit stowing pieces of the luggage transported by the transportation unit with respect to a plurality of containers;

a control unit controlling the stowing unit such that at least one of: (i) the order of the containers for stowing the pieces of luggage, and (ii) the order of the pieces of luggage to be stored in the containers is adjusted on the basis of the information detected by the luggage detection unit with respect to the order of transporting the pieces of the luggage, a stowing robot having an L-shaped robot hand for holding pieces of the luggage;

a movement drive unit moving the robot hand in three axes directions; and a control unit executing first control processing of controlling the movement drive unit such that pieces of the luggage held by the robot hand are temporarily placed at an approach position offset from stowing positions inside the containers, and executing second control processing of controlling the movement drive unit such that pieces of the luggage temporarily placed at the approach position are pushed toward the stowing positions by the robot hand after the first control processing is executed.

25. The luggage stowing device according to claim 24, wherein the approach position is a position offset from the stowing positions to a near side in the containers, and wherein the control unit controls the movement drive unit such that pieces of the luggage are pushed to a far side in the containers by the robot hand when the second control processing is executed.

26. The luggage stowing device according to claim 24, wherein the approach position is a position offset from the stowing positions to a near side in the containers and one side in the lateral direction, and wherein the control unit controls the movement drive unit such that pieces of the luggage are pushed to the far side in the containers and the other side in the lateral direction by the robot hand when the second control processing is executed.

27. The luggage stowing device according to claim 26, wherein the control unit first controls the movement drive unit such that pieces of the luggage are pushed to the far side in the containers by the robot hand when the second control processing is executed and then controls the movement drive unit such that pieces of the luggage are pushed to the other side in the lateral direction by the robot hand.

28. The luggage stowing device according to claim 27 further comprising:

a turning drive unit turning the robot hand around three axes, wherein the control unit controls the movement drive unit such that pieces of the luggage are pushed to the other side in the lateral direction by the robot hand after controlling the turning drive unit such that a posture of the robot hand is changed by 90 degrees in accordance with spaces in the lateral direction in the containers around the stowing position when the second control processing is executed.

29. The luggage stowing device according to claim 26, wherein the control unit controls the movement drive unit such that a plurality of pieces of the luggage are collectively pushed to the far side in the containers or the other side in the lateral direction by the robot hand when the second control processing is executed.

30. The luggage stowing device according to claim 29, wherein the control unit controls the movement drive unit such that a plurality of pieces of the luggage are collectively pushed to the far side in the containers or the other side in the lateral direction by the robot hand in a state in which pieces of the luggage are held by the robot hand when the second control processing is executed.

* * * * *